(12) United States Patent
Yan et al.

(10) Patent No.: US 11,512,156 B2
(45) Date of Patent: Nov. 29, 2022

(54) POLY(ARYL PIPERIDINIUM) POLYMERS INCLUDING THOSE WITH STABLE CATIONIC PENDANT GROUPS FOR USE AS ANION EXCHANGE MEMBRANES AND IONOMERS

(71) Applicant: University of Delaware, Newark, DE (US)

(72) Inventors: Yushan Yan, Hockessin, DE (US); Keda Hu, Newark, DE (US); Junhua Wang, Newark, DE (US); Lan Wang, Newark, DE (US); Bingjun Xu, West Chester, PA (US); Yun Zhao, Newark, DE (US)

(73) Assignee: University of Delaware, Newark, DE (US)

( * ) Notice: Subject to any disclaimer, the term of this patent is extended or adjusted under 35 U.S.C. 154(b) by 256 days.

(21) Appl. No.: 16/651,622

(22) PCT Filed: Sep. 28, 2018

(86) PCT No.: PCT/US2018/053651
§ 371 (c)(1),
(2) Date: Mar. 27, 2020

(87) PCT Pub. No.: WO2019/068051
PCT Pub. Date: Apr. 4, 2019

(65) Prior Publication Data
US 2021/0009726 A1 Jan. 14, 2021

Related U.S. Application Data

(60) Provisional application No. 62/565,076, filed on Sep. 28, 2017, provisional application No. 62/568,755, filed on Oct. 5, 2017.

(51) Int. Cl.
*C08F 26/08* (2006.01)
*B01J 41/14* (2006.01)
*H01M 8/10* (2016.01)

(52) U.S. Cl.
CPC ............... *C08F 26/08* (2013.01); *B01J 41/14* (2013.01); *H01M 8/10* (2013.01); *H01M 2008/1095* (2013.01)

(58) Field of Classification Search
CPC ........... C08F 26/08; B01J 41/14; H01M 8/10; H01M 2008/1095
(Continued)

(56) References Cited

U.S. PATENT DOCUMENTS 3,480,626 A * 11/1969 Pfleger ................. C07D 498/20
544/231
5,393,432 A * 2/1995 Tsuyumoto ............ B01D 71/80
210/500.37
(Continued)

FOREIGN PATENT DOCUMENTS

CN 104829814 A * 8/2015
CN 104829814 A 8/2015
(Continued)

OTHER PUBLICATIONS

International Search Report issued for PCT/US2017/024615 dated Aug. 28, 2017, 4 pages.
(Continued)

*Primary Examiner* — Michael M. Bernshteyn
(74) *Attorney, Agent, or Firm* — Lewis Rice LLC

(57) ABSTRACT

Poly(aryl piperidinium) polymers with pendant cationic groups are provided which have an alkaline-stable cation, piperidinium, introduced into a rigid aromatic polymer backbone free of ether bonds. Hydroxide exchange membranes or hydroxide exchange ionomers formed from these
(Continued)

polymers exhibit superior chemical stability, hydroxide conductivity, decreased water uptake, good solubility in selected solvents, and improved mechanical properties in an ambient dry state as compared to conventional hydroxide exchange membranes or ionomers. Hydroxide exchange membrane fuel cells comprising the poly(aryl piperidinium) polymers with pendant cationic groups exhibit enhanced performance and durability at relatively high temperatures.

36 Claims, 33 Drawing Sheets

(58) Field of Classification Search
USPC .......................................................... 524/99
See application file for complete search history.

(56) References Cited

U.S. PATENT DOCUMENTS

| | | | | |
|---|---|---|---|---|
| 5,869,655 | A * | 2/1999 | Puckett | C08G 18/2081 546/186 |
| 10,046,319 | B2 * | 8/2018 | Meier-Haack | C08F 26/06 |
| 2017/0203289 | A1 | 7/2017 | Bae et al. | |
| 2017/0252707 | A1 | 9/2017 | Bahar et al. | |
| 2019/0036143 | A1 | 1/2019 | Yan et al. | |

FOREIGN PATENT DOCUMENTS

| | | |
|---|---|---|
| JP | 2012033367 A | 2/2012 |
| JP | 2012049111 A | 3/2012 |
| WO | 2010055889 A1 | 5/2010 |
| WO | 2017/172824 A1 | 10/2017 |

OTHER PUBLICATIONS

Written Opinion issued for PCT/US2017/024615 dated Aug. 28, 2017, 5 pages.
Extended European Search Report for EP 17776496 dated Jul. 4, 2019, 7 pages.
Hansen et al., "Nitroxide radical polymers—a versatile material class for high-tech applications," Polymer Chemistry, Jan. 2018, vol. 9, Issue 13, pp. 1479-1516.
International Search Report and Written Opinion in PCT/US2022/015189, dated Apr. 28, 2022, 10 pages.
Olsson et al., "Functionalizing Polystyrene with N-Alicyclic Piperidine-Based Cations via Friedel-Crafts Alkylation for Highly Alkali-Stable Anion-Exchange Membranes," Macromolecules, Jun. 2020, vol. 53, No. 12, pp. 4722-4732.
Extended European Search Report, European Patent Application No. 18863766.4, dated Jan. 14, 2022 (8 pages).

\* cited by examiner

Figure 18  ¹H-NMR of MQN-I

Figure 19  ¹H-NMR of MQN-Br

Figure 20 ¹H-NMR of PAP-2-85-MQN-I

Figure 22 $^1$H-NMR of PAP-2-85-MQN-Cl before alkaline test

Figure 23  ¹H-NMR of PAP-2-85-MQN-Cl after 120 h alkaline

Figure 24  $^1$H-NMR of PAP-2-85-MQN-Cl after 240 h alkaline test

Figure 26. Comparison of 1H-NMR of PAP-2-85-MQN-Cl alkaline test

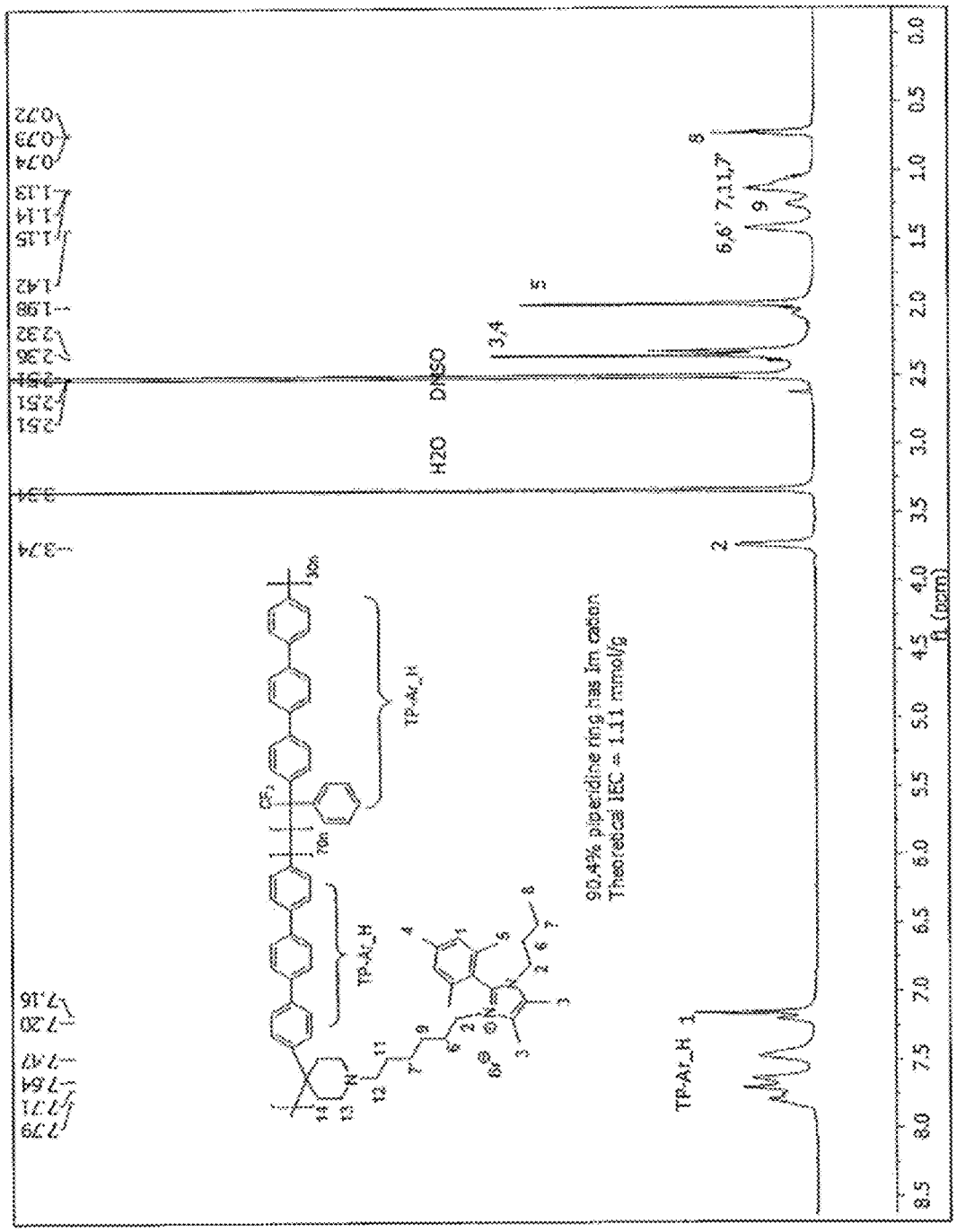
Figure 29  ¹H NMR of PAP-TP70-C6-IM in DMSO-d6

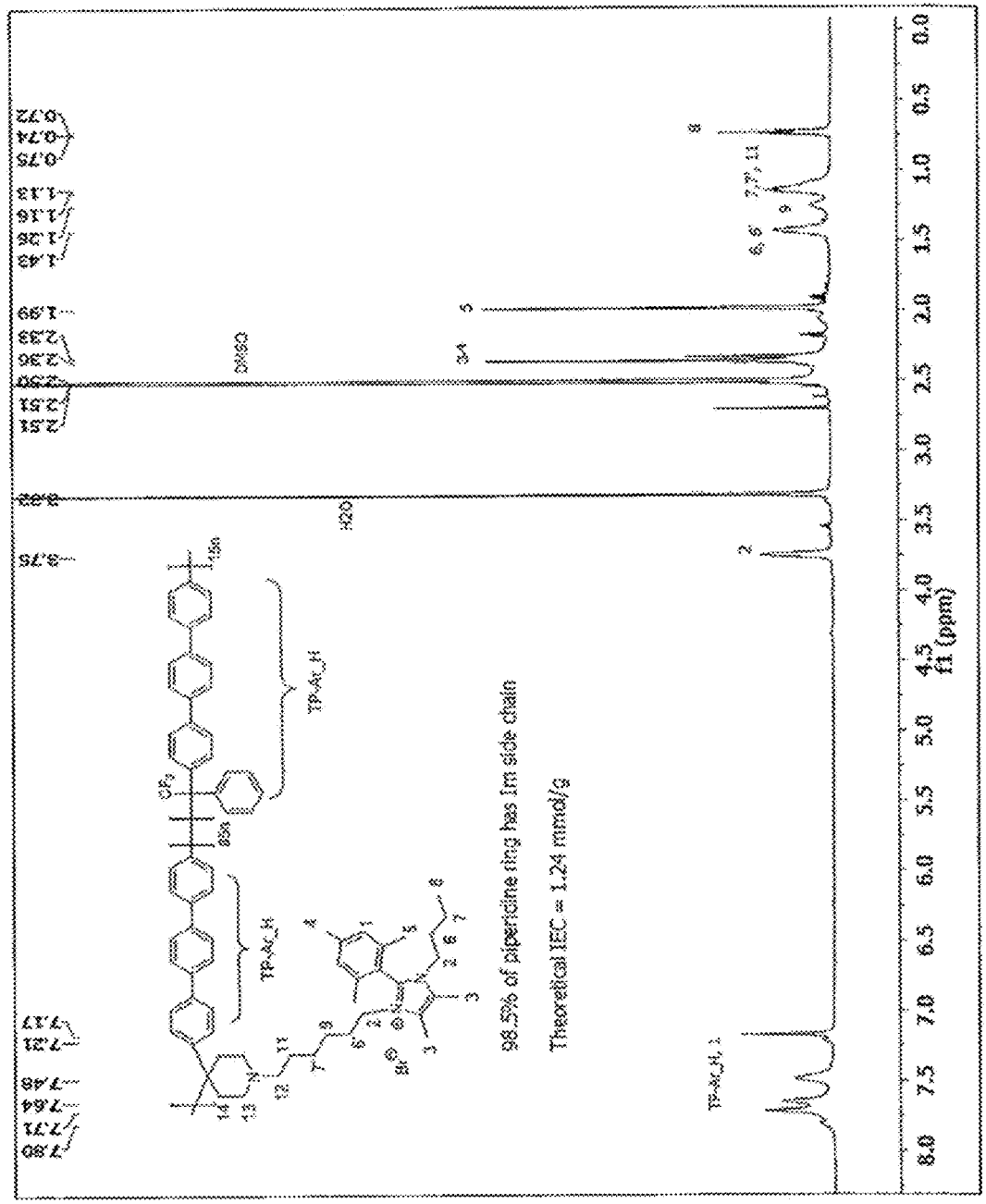
Figure 30   $^1$H NMR of PAP-TP85-C6-IM in DMSO-d6

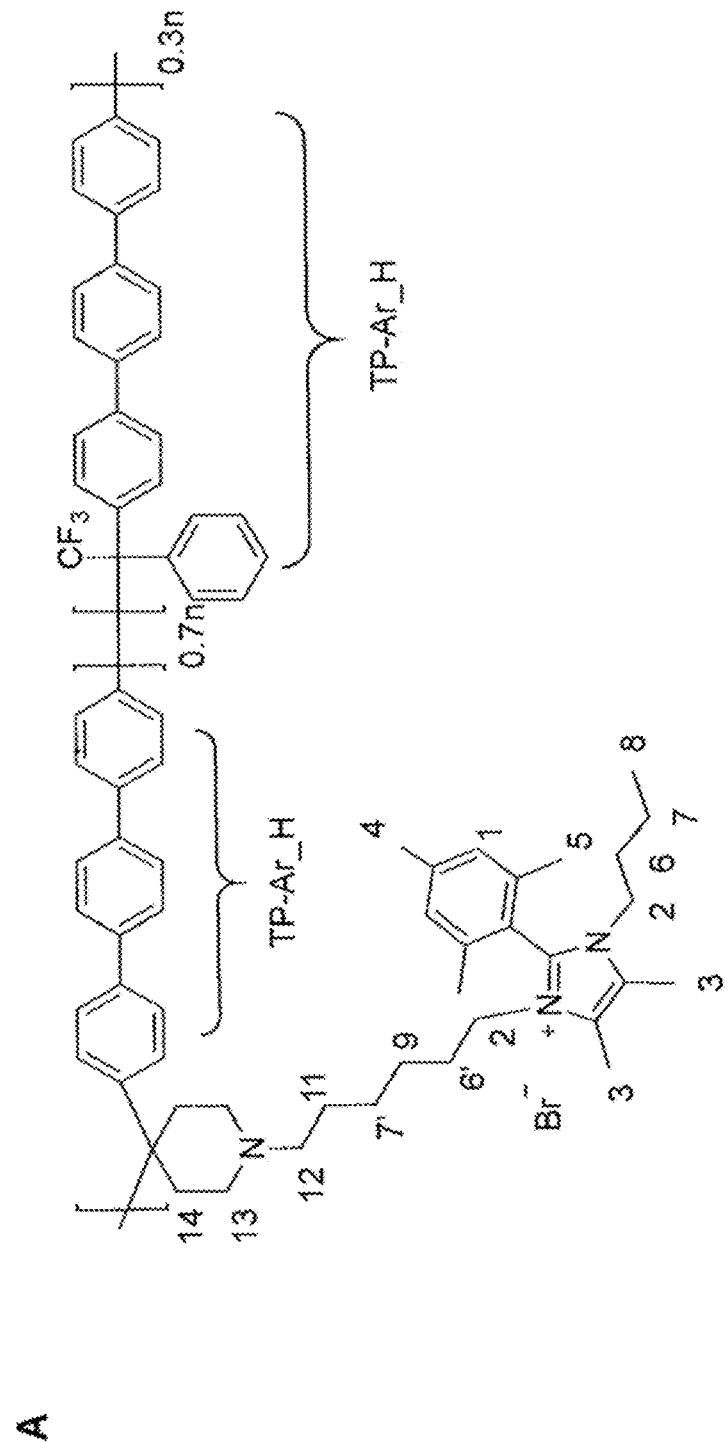
Figure 31 $^1$H NMR of PAP-TP70-IM-OH- after immersion in 1M KOH at 100 °C up to 500 h

Figure 32 Water uptake of PAP-TP70-IM-HCO$_3^-$ at different temperatures
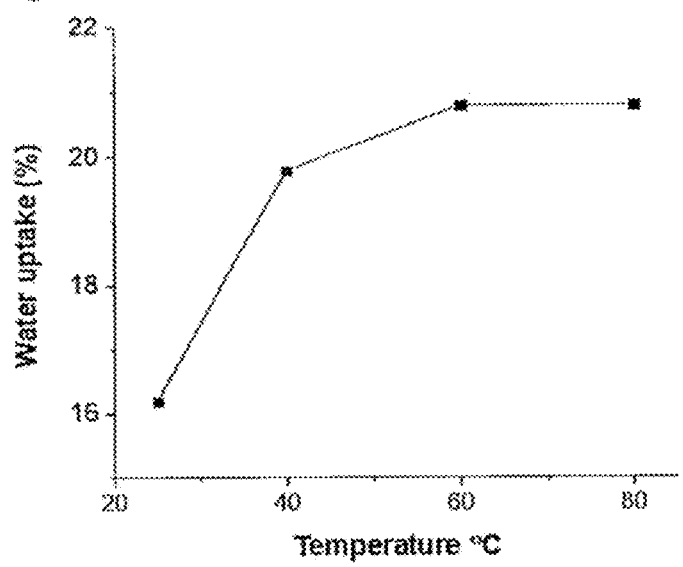
Figure 33 Dimensional swelling ratio of PAP-TP70-IM-HCO$_3^-$ at different temperatures
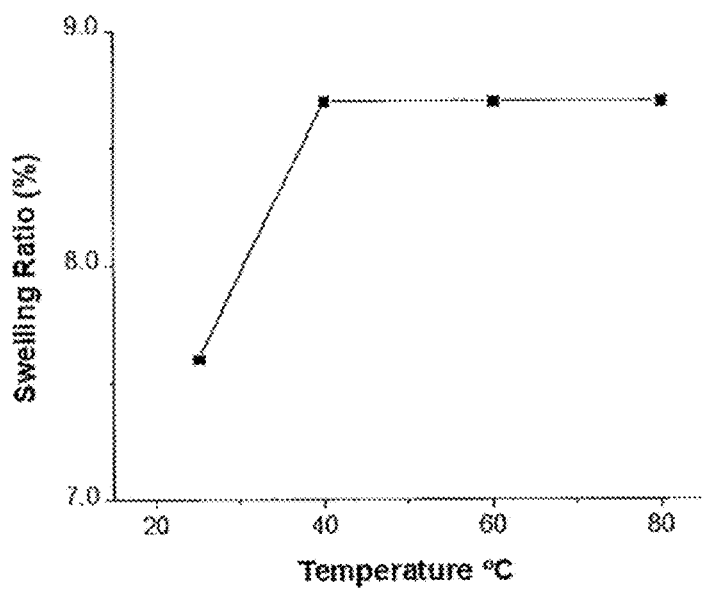

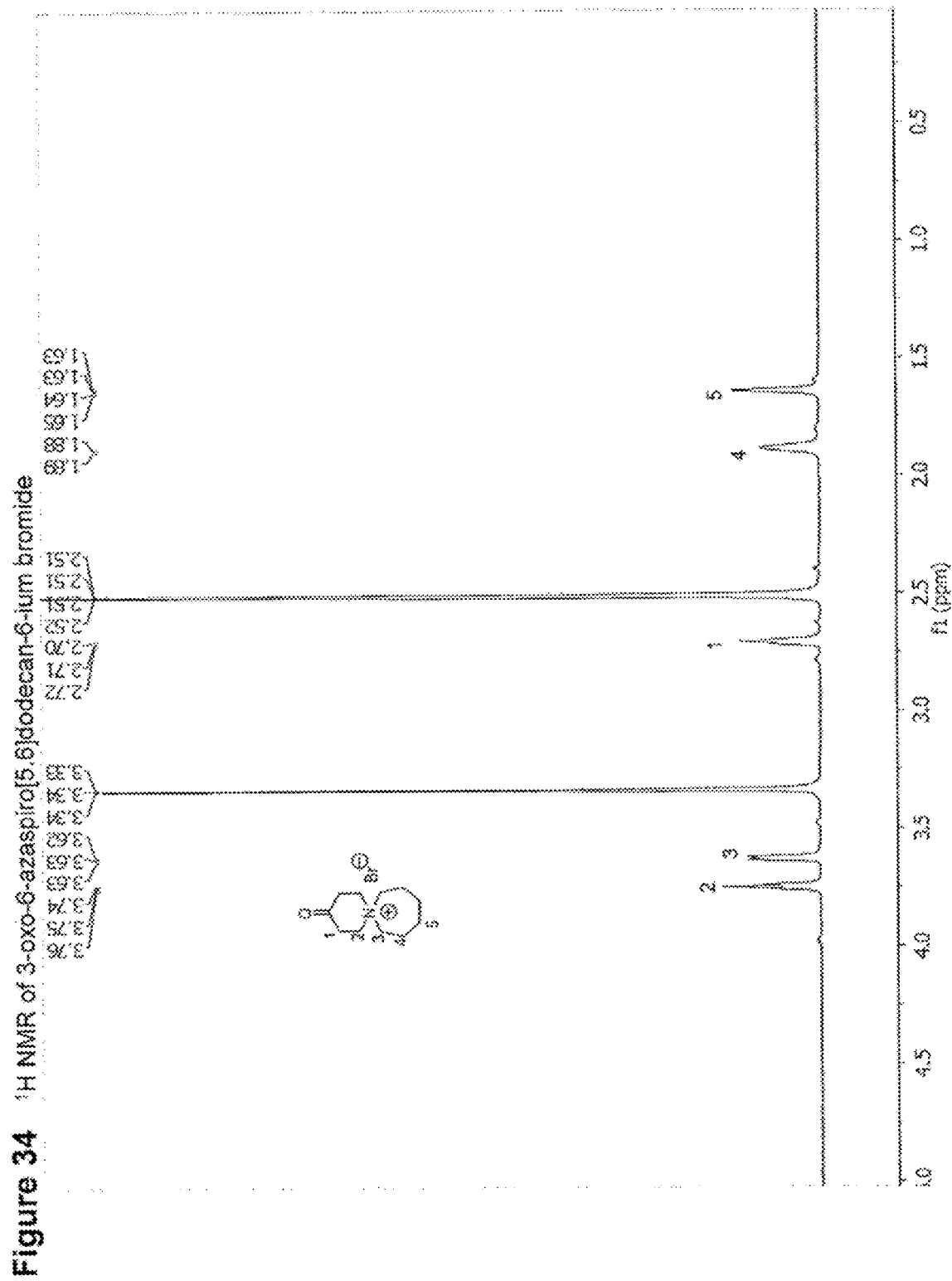
Figure 34  ¹H NMR of 3-oxo-6-azaspiro[5.6]dodecan-6-ium bromide

POLY(ARYL PIPERIDINIUM) POLYMERS INCLUDING THOSE WITH STABLE CATIONIC PENDANT GROUPS FOR USE AS ANION EXCHANGE MEMBRANES AND IONOMERS

CROSS REFERENCE TO RELATED APPLICATION(S)

This application is a § 371 U.S. National Phase of International Application No. PCT/US2018/053651 filed Sep. 28, 2018, which claims to the benefit of U.S. Provisional Patent Application Ser. Nos. 62/565,076, filed Sep. 28, 2017 and 62/568,755, filed Oct. 5, 2017. The entire disclosure of all the above documents is herein incorporated by reference.

GOVERNMENT LICENSE RIGHTS

This invention was partly made with Government support under grant DE-0006964 awarded by Office of Energy Efficiency and Renewable Energy of the United States Department of Energy. The Government has certain rights in the invention.

FIELD OF THE INVENTION

Anion exchange polymers capable of forming anion-exchange membranes (AEMs) and ionomers (AEIs) are provided for use in anion exchange membrane fuel cells (AEMFCs). More specifically, hydroxide exchange polymers are provided which are capable of forming hydroxide-exchange membranes (HEMs), hydroxide exchange membrane electrolyzers (HEMEL), and ionomers (HEIs) for use in hydroxide exchange membrane fuel cells (HEMFCs).

BACKGROUND OF THE INVENTION

Proton exchange membrane fuel cells (PEMFCs) are considered to be clean and efficient power sources. Steele et al., *Nature* 2001, 414, 345. However, the high cost and unsatisfactory durability of catalysts are major barriers for large-scale commercialization of PEMFCs. Borup et al., *Chem Rev* 2007, 107, 3904. By switching the polymer electrolyte from an "acidic" condition to a "basic" one, HEMFCs are able to work with non-precious metal catalysts and the catalysts are expected to be more durable. Other cheaper fuel cell components are also possible such as metal bipolar plates. Varcoe, et al., *Fuel Cells* 2005, 5, 187; Gu et al., *Angew Chem Int Edit* 2009, 48, 6499; Gu et al., *Chem Commun* 2013, 49, 131. However, currently available HEMs and HEIs exhibit low alkaline/chemical stability, low hydroxide conductivity, high water uptake, and low mechanical integrity under dry conditions, especially after wet-dry cycles.

The biggest challenge for HEMs/HEIs at present is achieving a high chemical stability at desired operation temperatures of 80° C. or more, and ideally 95° C. or more (e.g., in the presence of nucleophilic hydroxide ions). Varcoe et al., *Energ Environ Sci* 2014, 7, 3135. The most commonly encountered cationic functional groups (e.g., benzyl trimethyl ammonium and alkyl chain ammonium) can undergo a number of degradation processes in the presence of hydroxide ions nucleophiles by direct nucleophilic substitution and Hofmann elimination. Moreover, the polymer backbone of most base polymers for HEM/HEI applications (e.g., polysulfone and poly(phenylene oxide)) unavoidably contains ether linkages along the backbone, which makes the HEMs/HEIs potentially labile under high pH conditions. Lee et al., *Acs Macro Left* 2015, 4, 453; Lee et al., *Acs Macro Left* 2015, 4, 814. The strongly nucleophilic hydroxide ions attack these weak bonds and degrade the polymer backbone. Thus, alternative cationic groups, organic tethers, and polymer backbones are needed to enhance chemical stability of HEMs/HEIs.

Another concern regarding current HEMs/HEIs is their hydroxide conductivity. In comparison to Nafion, HEMs have intrinsically lower ionic conductivities under similar conditions, because the mobility of $OH^-$ is lower than that of $H^+$. Hibbs et al., *Chem Mater* 2008, 20, 2566. Greater ion-exchange capacity (IEC) is needed for HEMs/HEIs to achieve greater hydroxide conductivity. However, high IEC usually leads to a membrane having high water uptake (i.e., a high swelling ratio), decreasing the morphological stability and mechanical strength of the membrane, especially after repeated wet-dry cycles. This highly swollen state when wet is a major reason for decreased flexibility and brittleness of HEMs when dry. The removal of the trade-off between high hydroxide conductivity and low water uptake has been a major setback in designing high-performance HEMs/HEIs. Pan et al., *Energ Environ Sci* 2013, 6, 2912. Chemical cross-linking, physical reinforcement, side-chain polymerization, and block-copolymer architecture have been tried to reduce water uptake while maintaining acceptable hydroxide conductivity, but these techniques bring challenging problems, e.g., reduced mechanical flexibility, decreased alkaline stability, and/or increased cost. Gu et al., *Chem Commun* 2011, 47, 2856; Park et al., *Electrochem Solid St* 2012, 15, B27; Wang et al., *Chemsuschem* 2015, 8, 4229; Ran et al., *Sci Rep-Uk* 2014, 4; Tanaka et al., *J Am Chem Soc* 2011, 133, 10646. Additionally, almost all side-chain or block-copolymer HEMs are based on flexible aliphatic polymer chains due to limited available synthesis methods. As a result, the membranes still cannot provide morphological stability (low swell ratio) at high IECs and high temperature. Wang et al., *Chemsuschem* 2015, 8, 4229; Ran et al., *Sci Rep-Uk* 2014, 4; Marino et al., *Chemsuschem* 2015, 8, 513; Li et al, *M. Macromolecules* 2015, 48, 6523.

An additional obstacle to using HEMs is achievement of mechanical flexibility and strength in an ambient dry state. Most HEMs exhibit low mechanical strength and are very brittle in a completely dry state especially after being completely swollen. It is difficult to obtain and handle thin membranes that are large in size as needed for commercial use of HEMs. Without good mechanical properties, the ionomers cannot form and keep an adequate triple phase structure in the fuel cell electrode at high temperature, such as at or above 80° C. Li et al., *J Am Chem Soc* 2013, 135, 10124.

Another highly desirable feature of an HEI is that the polymer be soluble in a mixture of lower boiling alcohol and water but insoluble in pure alcohol or water so that the HEIs can be readily incorporated into an electrode catalyst layer yet not be dissolved away by water or alcohol.

PEMFCs have recently been deployed as zero-emission power sources in commercially sold automobiles, with demonstrated long driving range and short refueling time, which are two features preferred for customer acceptance. However, PEMFCs use platinum electrocatalysts and are not yet cost competitive with gasoline engines. Major approaches to PEMFC cost reduction include development of low-platinum-loading, high power density membrane electrode assemblies (MEAs), and platinum-group-metal-free (PGM-free) cathode catalysts. A fundamentally different pathway to low cost fuel cells is to switch from PEMFCs to hydroxide exchange membrane fuel cells (HEMFCs) that, due to their basic operating environment, can work with PGM-free anode and cathode catalysts, and thus are potentially economically viable. To replace PEMFCs, however, HEMFCs have to provide a performance that matches PEMFC's, performance which in turn requires highly active anode and cathode catalysts as well as the highly chemically stable, ionically conductive, and mechanically robust hydroxide exchange membranes (HEMs)/hydroxide exchange ionomers (HEIs) to build an efficient triple phase boundary and thus drastically improve the utilization of the catalyst particles and reduce the internal resistance.

HEMs/HEIs are typically composed of organic cations tethered on a polymer backbone, with OH⁻ being the balancing anion. A chemically stable HEM/HEI requires a stable organic cation and a stable polymer backbone. These hydroxide conductive organic cations have been obtained by introducing quaternary ammonium, imidazolium, guanidinium, phosphonium, sulfonium, ruthenium and cobaltocenium using chloromethylation of aromatic rings or bromination on the benzylic methyl groups of the polymers. Various polymer backbone structures—poly(olefin)s, poly(styrene)s poly(phenylene oxide)s, poly(phenylene)s, poly(arylene ether)s—have been investigated recently. So far, most of HEMs/HEIs based on traditional cation groups (such as benzyl trimethyl ammonium) and aromatic polymer backbones (such as polysulfone) have low alkaline/chemical stability, low hydroxide conductivity, high water uptake, and poor mechanical properties when dry.

SUMMARY OF THE INVENTION

A polymer comprises a reaction product of a polymerization mixture comprising (i) a piperidone monomer or salt or hydrate thereof having the formula:

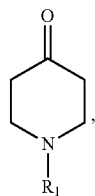

(1)

or an azoniaspiro salt monomer having the formula:

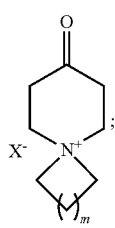

(2)

(ii) an aromatic monomer having the formula:

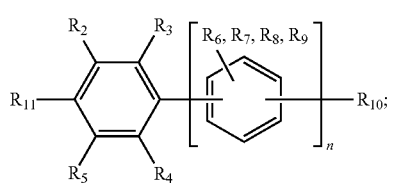

(3)

and (iii) optionally, a trifluoromethyl ketone monomer having the formula:

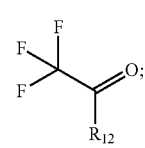

(4)

wherein:
$R_1, R_2, R_3, R_4, R_5, R_6, R_7, R_8, R_9, R_{10}, R_{11}, R_{13}, R_{15}, R_{16}$ and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or

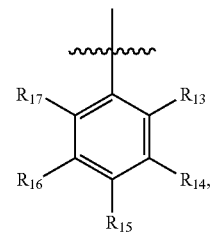

and the alkyl, alkenyl, or alkynyl are optionally substituted with fluoride;

m is 1, 2, 3, 4, 5, 6, 7 or 8;

n is 0, 1, 2 or 3; and

X is an anion.

A polymer comprising a reaction product of an alkylating agent and the polymer as described above comprising the reaction product of the polymerization mixture comprising the piperidone monomer.

A method of making the polymer as described above comprises:

reacting the piperidone monomer or salt or hydrate thereof, the optional trifluoromethyl ketone monomer, and the aromatic monomer in the presence of an organic solvent and a polymerization catalyst to form a piperidine-functionalized intermediate polymer;

alkylating the piperidine-functionalized intermediate polymer in the presence of an organic solvent to form a piperidinium-functionalized intermediate polymer; and reacting the piperidinium-functionalized intermediate polymer with a base to form the polymer.

A method of making an anion exchange polymer membrane comprises the polymer as described above, the method comprising:

reacting the piperidone monomer or salt or hydrate thereof, the optional trifluoromethyl ketone monomer, and the aromatic monomer in the presence of an organic solvent and a polymerization catalyst to form a piperidine-functionalized intermediate polymer;

reacting the piperidine-functionalized intermediate polymer with an alkylating agent in the presence of an organic solvent to form a piperidinium-functionalized intermediate polymer;

dissolving the piperidinium-functionalized intermediate polymer in a solvent to form a polymer solution;

casting the polymer solution to form a polymer membrane; and exchanging anions of the polymer membrane with hydroxide, bicarbonate, or carbonate ions or a combination thereof to form the anion exchange polymer membrane.

A polymer comprising a reaction product of a base and either of the polymers described above, or a polymer as described above comprising the reaction product of the polymerization mixture comprising the azoniaspiro salt monomer. An anion exchange polymer comprising structural units of Formulae 1A or 2A, 3A, and optionally 4A, wherein the structural units of Formulae 1A, 2A, 3A and 4A have the structures:

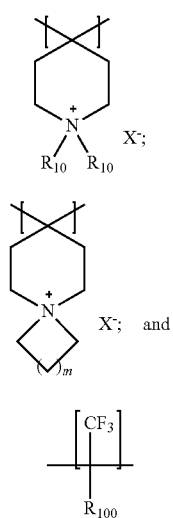

(1A)

(2A)

(4A)

wherein:

$R_{10}$, $R_{20}$, $R_{30}$, $R_{40}$, $R_{50}$, $R_{60}$, $R_{70}$, $R_{80}$, $R_{90}$, $R_{110}$, $R_{120}$, $R_{130}$, $R_{140}$, and $R_{150}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

each $R_{100}$ is independently alkyl, alkenyl, alkynyl, or

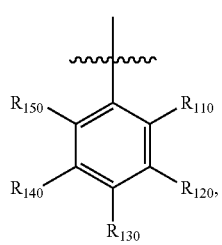

and the alkyl, alkenyl, or alkynyl are optionally substituted with fluoride;

m is 1, 2, 3, 4, 5, 6, 7 or 8;

n is 0, 1, 2 or 3; and $X^-$ is an anion.

An hydroxide exchange polymer comprising a poly(aryl piperidinium) backbone free of ether linkages, and having water uptake not more than 60% based on the dry weight of the polymer when immersed in pure water at 95° C., or having hydroxide conductivity in pure water at 95° C. of at least 100 mS/cm, wherein at least one of the following:

the polymer is stable to degradation (as evidenced by no change in the $^1$H NMR spectra) when immersed in 1 M potassium hydroxide at 100° C. for 2,000 hours; or the polymer has a tensile strength of at least 40 MPa and/or elongation at break of at least 100%; or the polymer has a tensile strength of at least 60 MPa and/or elongation at break of at least 150%.

An hydroxide exchange polymer comprising a poly(aryl piperidinium) backbone free of ether linkages, and having:

a peak power density of at least 350 mW/cm$^2$ when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having a 50% Pt/C catalyst and catalyst loading of 0.4 mg Pt/cm$^2$, and test conditions being hydrogen and oxygen flow rates of 0.6 L/min, back pressure of 0.1 MPa$_g$, cell temperature of 95° C., and anode and cathode humidifiers at 95° C. and 98° C., respectively; or a decrease in voltage over 5.5 hours of operation of not more than 20% and an increase in resistance over 5.5 hours of operation of not more than 20% when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having a 50% Pt/C catalyst and catalyst loading of 0.4 mg Pt/cm$^2$, and test conditions being constant current density of 400 mA/cm$^2$, hydrogen and oxygen flow rates of 0.2 L/min, back pressure of 0.05 MPa$_g$, cell temperature of 90° C., and anode and cathode humidifiers at 95° C. and 98° C., respectively.

A piperidinium polymer is provided which comprises a second reaction product of a second polymerization mixture comprising a piperidine-functionalized polymer and either a quaternary ammonium or phosphonium compound or a nitrogen-containing heterocycle, the quaternary ammonium or phosphonium compound having the formula:

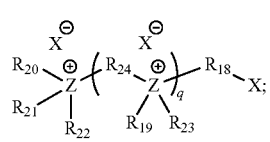

(5)

the nitrogen-containing heterocycle comprising an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

the piperidine-functionalized polymer comprising a second reaction product of a second polymerization mixture comprising (i) a piperidone monomer or salt or hydrate thereof having the formula:

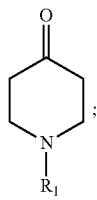

(1)

(ii) an aromatic monomer having the formula:

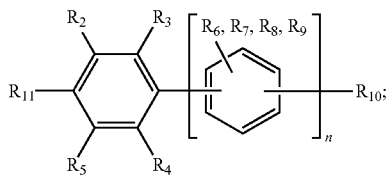

(3)

and (iii) optionally, a trifluoromethyl ketone monomer having the formula:

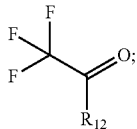

(4)

wherein:

$R_1$, $R_2$, $R_3$, $R_4$, $R_5$, $R_6$, $R_7$, $R_8$, $R_9$, $R_{10}$, $R_{11}$, $R_{13}$, $R_{14}$, $R_{15}$, $R_{16}$ and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or

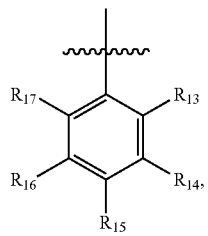

and the alkyl, alkenyl, or alkynyl are optionally substituted with fluoride;

$R_{18}$ and $R_{24}$ are each independently alkylene;

$R_{19}$, $R_{20}$, $R_{21}$, $R_{22}$, and $R_{23}$ are each independently alkyl, alkenyl, aryl, or alkynyl;

q is 0, 1, 2, 3, 4, 5, or 6;

n is 0, 1, 2 or 3;

X is an anion; and

Z is N or P.

An anion exchange polymer is provided which comprises a reaction product of a base and any of the polymers or piperidinium polymers as described above.

An anion exchange polymer is provided comprising structural units of Formulae 1A, 3A, and optionally 4A, wherein the structural units of Formulae 1A, 3A and 4A have the structures:

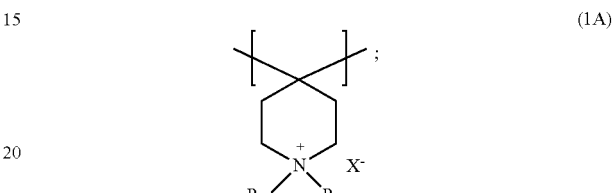

(1A)

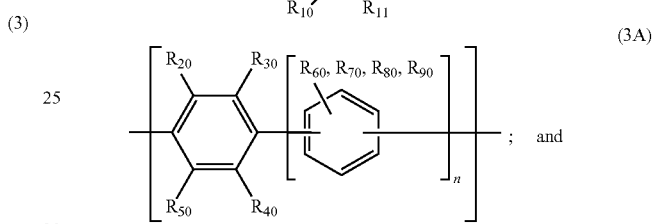

(3A)

and

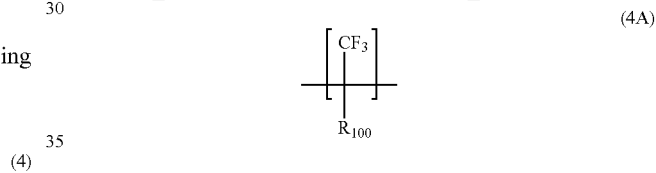

(4A)

wherein:

$R_{11}$ are each independently a quaternary ammonium or phosphonium group or a nitrogen-containing heterocyclic group, the quaternary ammonium or phosphonium group having the formula:

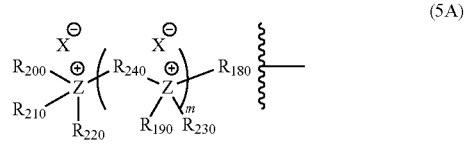

(5A)

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_{10}$, $R_{20}$, $R_{30}$, $R_{40}$, $R_{50}$, $R_{60}$, $R_{70}$, $R_{80}$, $R_{90}$, $R_{110}$, $R_{120}$, $R_{130}$, $R_{140}$, and $R_{150}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

each $R_{100}$ is independently alkyl, alkenyl, alkynyl, or

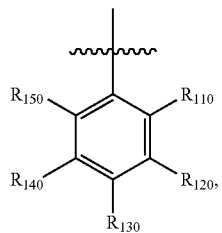

and the alkyl, alkenyl, or alkynyl are optionally substituted with fluoride;

$R_{180}$ and $R_{240}$ are each independently alkylene;

$R_{190}$, $R_{200}$, $R_{210}$, $R_{220}$, and $R_{230}$ are each independently alkyl, alkenyl, aryl, or alkynyl;

q is 0, 1, 2, 3, 4, 5, or 6;

n is 0, 1, 2 or 3;

$X^-$ is an anion; and

Z is N or P.

A method of making the anion exchange polymer as described directly above is provided, the method comprising:

reacting the piperidone monomer or salt or hydrate thereof, the optional trifluoromethyl ketone monomer, the optional azoniaspiro salt monomer, and the aromatic monomer in the presence of an organic solvent and a polymerization catalyst to form a piperidine-functionalized polymer;

reacting the piperidine-functionalized polymer and the quaternary ammonium or phosphonium compound or the nitrogen-containing heterocycle in the presence of an organic solvent to form a piperidinium-functionalized polymer; and reacting the piperidinium-functionalized polymer with a base to form the anion exchange polymer.

A method of making an anion exchange polymer membrane comprising an anion exchange polymer as described directly above is also provided, the method comprising:

reacting the piperidone monomer, the optional trifluoromethyl ketone monomer, the optional azoniaspiro salt monomer, and the aromatic monomer in the presence of an organic solvent and a polymerization catalyst to form the piperidine-functionalized polymer;

reacting the piperidine-functionalized polymer with the quaternary ammonium or phosphonium compound or the nitrogen-containing heterocycle in the presence of an organic solvent to form the piperidinium-functionalized polymer;

dissolving the piperidinium-functionalized polymer in a solvent to form a polymer solution;

casting the polymer solution to form a polymer membrane; and exchanging anions of the polymer membrane with hydroxide ions to form the anion exchange polymer membrane.

An anion exchange membrane is provided which is configured and sized to be suitable for use in a fuel cell and comprises an anion exchange polymer as described above.

An anion exchange membrane fuel cell is provided which comprises an anion exchange polymer as described above.

A reinforced electrolyte membrane is provided which is configured and sized to be suitable for use in a fuel cell, the membrane comprising a porous substrate impregnated with an anion exchange polymer as described above.

Other objects and features will be in part apparent and in part pointed out hereinafter.

BRIEF DESCRIPTION OF THE DRAWINGS

FIGS. 28-30 show an 1H NMR spectrum of PAP-TP70-NH in DMSO-d6 (added 10% volume of TFA); PAP-TP70-C6-IM in DMSO-d6; and PAP-TP85-C6-IM in DMSO-d6, respectively.

FIG. 32 shows water uptake of PAP-TP70-4M-HCO3- at different temperatures.

FIG. 33 shows Dimensional swelling ratio of PAP-TP70-IM-HCO3- at different temperatures.

FIG. 34 depicts 1H NMR spectrum of 3-oxo-6-azaspiro[5.6]dodecan-6-ium bromide.

Corresponding reference characters indicate corresponding parts throughout the drawings.

DESCRIPTION OF THE PREFERRED EMBODIMENTS

Figure 1:
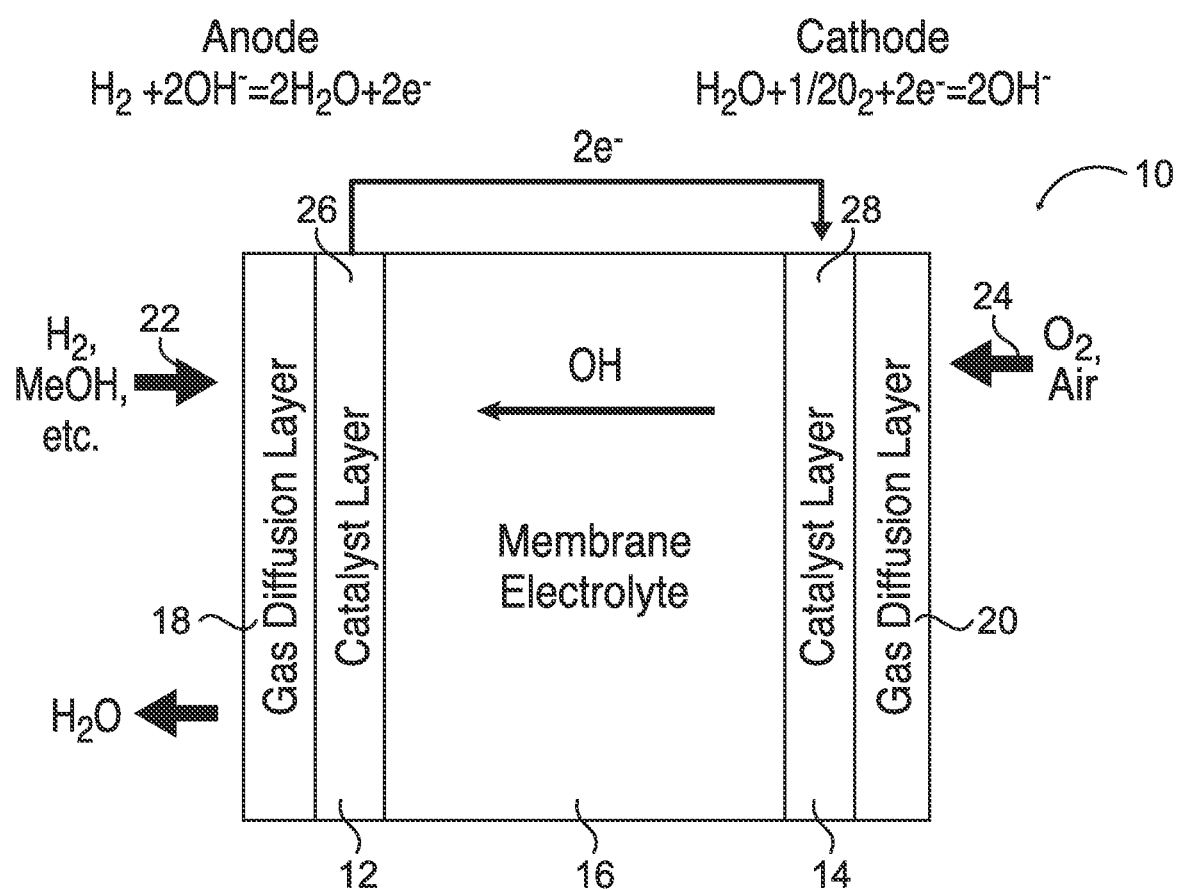
FIG. 1 illustrates an exemplary hydroxide exchange membrane fuel cell.

HEMs/HEIs formed from poly(aryl piperidinium) or poly(aryl piperidine) polymers with various pendant cationic groups and having intrinsic hydroxide conduction channels have been discovered which simultaneously provide improved chemical stability, conductivity, water uptake, good solubility in selected solvents, mechanical properties, and other attributes relevant to HEM/HEI performance. The poly(aryl piperidinium) polymers have an alkaline-stable cation, piperidinium, introduced into a rigid aromatic polymer backbone free of ether bonds. The attachment of the pendant side chains to the rigid aromatic polymer backbone of the polymer allows fine tuning of the mechanical properties of the membrane and incorporation of alkaline stable cations, such as imidazoliums, phosphoniums and ammoniums, provides enhanced stability to the polymer. HEMs/HEIs formed from these polymers exhibit superior chemical stability, anion conductivity, decreased water uptake, good solubility in selected solvents, and improved mechanical properties in an ambient dry state as compared to conventional HEM/HEIs. The inventive HEMFCs exhibit enhanced performance and durability at relatively high temperatures.

A polymer is provided which comprises a reaction product of a polymerization mixture comprising (i) a piperidone monomer or salt or hydrate thereof, (ii) an aromatic monomer, and (iii) optionally, a trifluoromethyl ketone monomer. This polymer is also referred to herein as a piperidine-functionalized polymer, or as a polymer intermediate.

The piperidone monomer or salt or hydrate thereof has the formula:

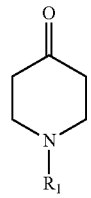

(1)

wherein $R_1$ is alkyl, alkenyl, or alkynyl, and the alkyl, alkenyl or alkynyl are optionally substituted with halide. Preferably, $R_1$ is alkyl such as methyl, ethyl, propyl, butyl, pentyl, hexyl, heptyl, octyl, nonyl, decyl, undecyl, or dodecyl optionally substituted with halide. Preferably, the piperidone monomer or salt or hydrate thereof comprises N-methyl-4-piperidone or 4-piperidone.

The salt of the piperidone monomer can comprise hydrochloride, hydrofluoride, hydrobromide, hydroiodide, trifluoroacetate, acetate, triflate, methanesulfonate, sulfate, nitrate, tetrafluoroborate, hexafluorophosphate, formate, benzenesulfonate, toluate, perchlorate, or benzoate, or any hydrate of the salt, or any combination thereof. For example, the salt of the piperidone monomer can comprise 4-piperidone hydrofluoride, 4-piperidone hydrochloride, 4-piperidone hydrobromide, 4-piperidone hydroiodide, 4-piperidone trifluoroacetate, 4-piperidone tetrafluoroborate, 4-piperidone hexafluorophosphate, 4-piperidone acetate, 4-piperidone triflate, 4-piperidone methanesulfonate, 4-piperidone formate, 4-piperidone benzenesulfonate, 4-piperidone toluate, 4-piperidone sulfate, 4-piperidone nitrate, 4-piperidone perchlorate, 4-piperidone benzoate, N-methy-4-piperidone hydrofluoride, N-methy-4-piperidone hydrochloride, N-methyl-4-piperidone hydrobromide, N-methyl-4-piperidone hydroiodide, N-methyl-4-piperidone trifluoroacetate, N-methyl-4-piperidone tetrafluoroborate, N-methyl-4-piperidone hexafluorophosphate, N-methyl-4-piperidone acetate, N-methyl-4-piperidone triflate, N-methyl-4-piperidone methanesulfonate, N-methyl-4-piperidone formate, N-methyl-4-piperidone benzenesulfonate, N-methyl-4-piperidone toluate, N-methyl-4-piperidone sulfate, N-methyl-4-piperidone nitrate, N-methyl-4-piperidone perchlorate, N-methyl-4-piperidone benzoate or any hydrate of the salt, or any combination thereof.

The aromatic monomer has the formula:

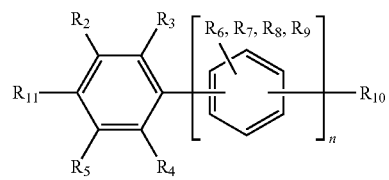

(3)

wherein: $R_2$, $R_3$, $R_4$, $R_5$, $R_6$, $R_7$, $R_8$, $R_9$, $R_{10}$, and $R_{11}$ are each independently hydrogen, halide, alkyl, alkenyl, alkynyl or aryl, and the alkyl, alkenyl, alkynyl or aryl are optionally substituted with halide, and wherein $R_3$ and Re are optionally linked to form a five membered ring optionally substituted with halide or alkyl; and n is 0, 1, 2 or 3. Preferably, $R_2$, $R_3$, $R_4$, $R_5$, $R_6$, $R_7$, $R_8$, $R_9$, $R_{10}$, and $R_{11}$ are each independently hydrogen, or alkyl optionally substituted with fluoride, such as methyl, ethyl, propyl, butyl, pentyl, hexyl, heptyl, octyl, nonyl, decyl, undecyl, or dodecyl optionally substituted with halide or methyl, ethyl, propyl, butyl, pentyl, hexyl, heptyl, octyl, nonyl, decyl, undecyl, or dodecyl substituted with fluoride. Preferably, the aromatic monomer comprises biphenyl, para-terphenyl, meta-terphenyl, para-quaterphenyl, 9,9-dimethyl-9H-fluorene, or benzene.

The trifluoromethyl ketone monomer has the formula:

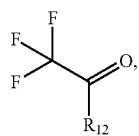

(4)

wherein each $R_{12}$ is independently alkyl, alkenyl, alkynyl, or

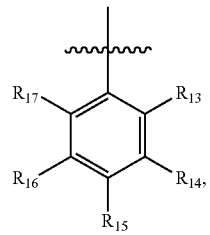

and the alkyl, alkenyl, or alkynyl are optionally substituted with fluoride; and $R_{13}$, $R_{14}$, $R_{15}$, $R_{16}$ and $R_{17}$ are each independently hydrogen, halide, alkyl, alkenyl, alkynyl or aryl, and the alkyl, alkenyl, alkynyl or aryl are optionally substituted with halide. The trifluoromethyl ketone monomer can be, for example, a trifluoroacetophenone monomer such as 2,2,2-trifluoroacetophenone, or 1,1,1-trifluoroacetone. Preferably, $R_{13}$, $R_{14}$, $R_{15}$, $R_{16}$ and $R_{17}$ are each independently hydrogen, or alkyl optionally substituted with fluoride, such as methyl, ethyl, propyl, butyl, pentyl or hexyl or methyl, ethyl, propyl, butyl, pentyl, or hexyl optionally substituted with fluoride. Preferably, the 2,2,2-trifluoroacetophenone monomer comprises 2,2,2-trifluoroacetophenone.

The piperidine-functionalized polymer can optionally include an azoniaspiro salt monomer having the formula:

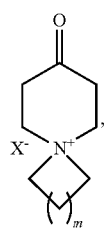

(2)

such as a 3-oxo-6-azoniaspiro[5.5]undecane salt monomer having the formula:

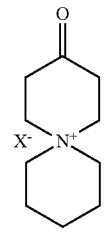

(2)

wherein m is 1, 2, 3, 4, 5, 6, 7 or 8; and X is an anion. Preferably, $X^-$ is a halide such as chloride, fluoride, bromide, or iodide, $BF_4^-$, $PF_6^-$, $CO_3^{2-}$ or $HCO_3^-$. Preferably, the 3-oxo-6-azoniaspiro[5.5]undecane salt monomer comprises 3-oxo-6-azoniaspiro[5.5]undecane halide, such as 3-oxo-6-azoniaspiro[5.5]undecane iodide.

Also provided is a piperidinium polymer which comprises a reaction product of the piperidine-functionalized polymer as described above and either a quaternary ammonium or phosphonium compound or a nitrogen-containing heterocycle. This polymer is referred to herein as a piperidinium polymer or a piperidinium-functionalized polymer.

The quaternary ammonium or phosphonium compound has the formula:

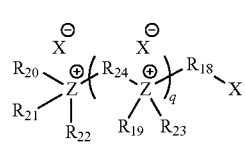

(5)

wherein:
$R_{18}$ and $R_{24}$ are each independently alkylene;
$R_{19}$, $R_{20}$, $R_{21}$, $R_{22}$, and $R_{23}$ are each independently alkyl, alkenyl, aryl, or alkynyl;
m is 0, 1, 2, 3, 4, 5, or 6;
$X^-$ is an anion; and
Z is N or P.

Preferably, $R_{18}$ and $R_{24}$ are each independently $C_1$-$C_{22}$ alkylene, such as $C_1$-$C_6$ alkylene (e.g., ethylene, n-propylene, n-pentylene or n-hexylene), or $C_8$-$C_{22}$ alkylene; $R_{19}$, $R_{20}$, $R_{21}$, $R_{22}$, and $R_{23}$ are each independently $C_1$-$C_6$ alkyl such as methyl, ethyl, n-propyl, n-butyl, isobutyl, tert-butyl, pentyl and hexyl; m is 1, 2, 3, 4, 5, or 6; $X^-$ is a halide; and Z is N. For example, the quaternary ammonium or phosphonium compound can be N-(6-iodohexyl)-$N^1$, $N^1$, $N^6$, $N^6$, $N^6$-pentamethylhexane-1,6-diaminium iodide having the formula:

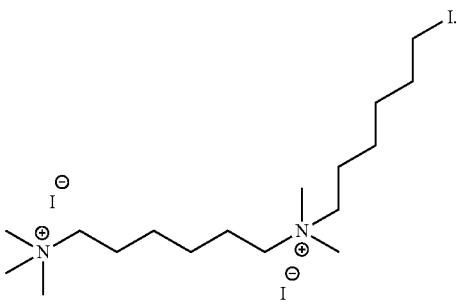

The nitrogen-containing heterocycle comprises an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl. Preferably, the nitrogen-containing heterocycle is unsaturated such as pyrrole, pyrroline, pyrazole, pyrazoline, imidazole, imidazoline, triazole, pyridine, triazine, pyrazine, pyridazine, pyrimidine, azepine, or quinoline, and each substitutable position of the heterocycle is substituted independently with alkyl (e.g., methyl, ethyl, propyl, n-butyl) or aryl groups (e.g., phenyl with alkyl substituents). For example, the nitrogen-containing heterocycle can comprise an imidazole having the formula:

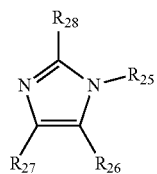

(6)

wherein $R_{25}$, $R_{26}$, $R_{27}$, and $R_{28}$ are each independently optionally substituted alkyl, alkenyl, alkynyl, or aryl. An example of such as imidazole is 1-butyl-2-mesityl-4,5-dimethyl-1H-imidazole-imidazole which has the formula:

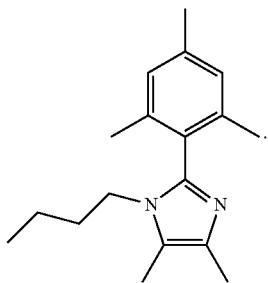

Another polymer is provided which comprises a reaction product of a base and the piperidinium-functionalized polymer. This polymer is referred to herein as a poly(aryl piperidinium) polymer.

Preferably, the base comprises an hydroxide-containing base such as sodium hydroxide or potassium hydroxide; a bicarbonate-containing base such as sodium bicarbonate or potassium bicarbonate; or a carbonate-containing base such as sodium carbonate or potassium carbonate.

The poly(aryl piperidinium) polymer can also be an anion exchange polymer which comprises structural units of Formulae 1A, 3A, and optionally 4A, wherein the structural units of Formulae 1A, 3A and 4A have the structures:

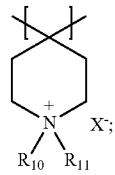

(1A)

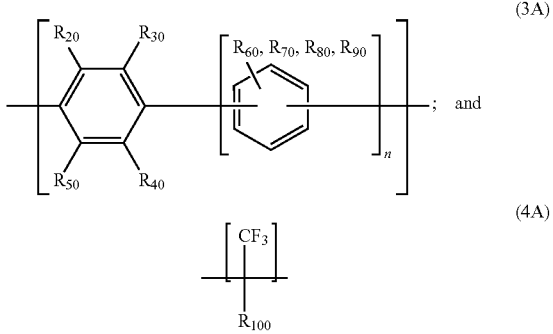

(3A)

(4A)

wherein:

$R_{11}$ are each independently a quaternary ammonium or phosphonium group or a nitrogen-containing heterocyclic group, the quaternary ammonium or phosphonium group having the formula:

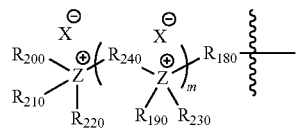

(5A)

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_{10}$, $R_{20}$, $R_{30}$, $R_{40}$, $R_{50}$, $R_{60}$, $R_{70}$, $R_{80}$, $R_{90}$, $R_{110}$, $R_{120}$, $R_{130}$, $R_{140}$, and $R_{150}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

each $R_{100}$ is independently alkyl, alkenyl, alkynyl, or

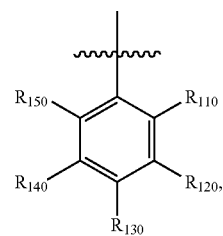

and the alkyl, alkenyl, or alkynyl are optionally substituted with fluoride;

$R_{186}$ and $R_{240}$ are each independently alkylene;

$R_{190}$, $R_{200}$, $R_{210}$, $R_{220}$, and $R_{230}$ are each independently alkyl, alkenyl, or alkynyl;

q is 0, 1, 2, 3, 4, 5, or 6;

n is 0, 1, 2 or 3;

$X^-$ is an anion; and

Z is N or P.

In the anion exchange polymer, the sum of the mole fractions of the structural unit of Formulae 1A, 2A and 4A is about equal to the mole fraction of of the structural unit of Formula 3A in the polymer, and the ratio of the mole fraction of the structural unit of Formulae 1A and 2A in the polymer to the mole fraction of the structural unit of Formula 3A in the polymer is from about 0.01 to 1.

Representative anion exchange polymers include the following wherein x is 1-100:

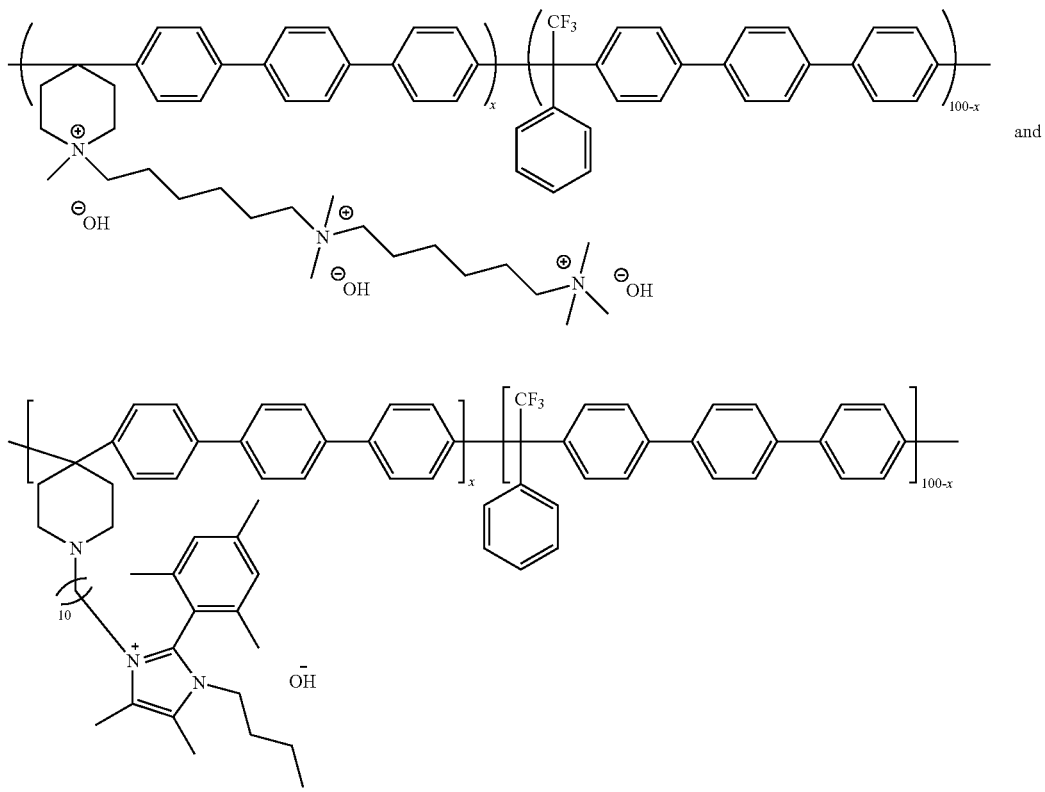

and

The poly(aryl piperidinium) polymer can also be an anion exchange polymer which comprises structural units of Formulae 1A, 3A, and optionally 2A and/or 4A, wherein the structural unit of Formulae 2A, has the structure:

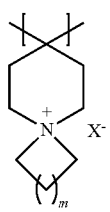

(2A)

wherein m is 1, 2, 3, 4, 5, 6, 7 or 8, and $X^-$ is an anion.

In the anion exchange polymer, the sum of the mole fractions of the structural unit of Formulae 1A and 4A is about equal to the mole fraction of of the structural unit of Formula 3A in the polymer, and the ratio of the mole fraction of the structural unit of Formula 1A in the polymer to the mole fraction of the structural unit of Formula 3A in the polymer is from about 0.01 to 1.

The poly(aryl piperidinium) polymer can be an hydroxide exchange polymer which comprises a poly(aryl piperidinium) backbone free of ether linkages, has water uptake not more than 60% based on the dry weight of the polymer when immersed in pure water at 95° C., or has hydroxide conductivity in pure water at 95° C. of at least 100 mS/cm. Also, this polymer can be stable to degradation (as evidenced by no change in peak position on its $^1$H NMR spectra) when immersed in 1 M potassium hydroxide at 100° C. for 2,000 hours; be insoluble in pure water and isopropanol at 100° C., but is soluble in a 50/50 mixture by weight of water and isopropanol at 100° C.; and have a tensile strength of at least 100 MPa and elongation at break of at least 7%.

The poly(aryl piperidinium) polymer can be an hydroxide exchange polymer which comprises a poly(aryl piperidinium) backbone free of ether linkages, has water uptake not more than 200% based on the dry weight of the polymer when immersed in pure water at 95° C., or has hydroxide conductivity in pure water at 95° C. of at least 150 mS/cm. Also, this polymer can be stable to degradation (as evidenced by no change in peak position on its 1H NMR spectra) when Immersed in 1 M potassium hydroxide at 90°

C. for 1,000 hours; be insoluble in pure water and isopropanol at 100° C., but is soluble in a 50/50 mixture by weight of water and isopropanol at 25° C.; and have a tensile strength of at least 65 MPa and elongation at break of at least 40%.

Water uptake of PAP-TP70-IM-HCO$_3^-$ is no more than 20.8% up to 80 C. The dimensional swelling ratio of PAP-TP70-IM-HCO$_3^-$ is no more than 8.6% up to 80° C. The conductivity of PAP-TP70-IM-OH is 8.7 mS/cm at room temperature.

The poly(aryl piperidinium) polymer can be an hydroxide exchange polymer which comprises a poly(aryl piperidinium) backbone free of ether linkages, and has a peak power density of at least 350 mW/cm$^2$ when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm$^2$, and test conditions being hydrogen and oxygen flow rates of 0.6 L/min, back pressure of 0.1 MPa$_g$, cell temperature of 95° C., and anode and cathode humidifiers at 95° C. and 98° C., respectively. The peak power density can be at least 800 mW/cm$^2$.

The poly(aryl piperidinium) polymer can be an hydroxide exchange polymer which comprises a poly(aryl piperidinium) backbone free of ether linkages, and has a decrease in voltage over 5.5 hours of operation of not more than 20% and an increase in resistance over 5.5 hours of operation of not more than 20% when the polymer is used as an hydroxide exchange membrane of an hydroxide exchange membrane fuel cell and is loaded at 20% as an hydroxide exchange ionomer in the cathodic and anodic catalyst layers of the fuel cell, the fuel cell having a 50% Pt/C catalyst and catalyst loading of 0.4 mg Pt/cm$^2$, and test conditions being constant current density of 400 mA/cm$^2$, hydrogen and oxygen flow rates of 0.2 L/min, back pressure of 0.05 MPa$_g$, cell temperature of 90° C. and anode and cathode humidifiers at 95° C. and 98° C., respectively.

The poly(aryl piperidinium) polymer can be an hydroxide exchange polymer which comprises a poly(aryl piperidinium) backbone free of ether linkages, and has a decrease in voltage over 60 hours of operation is not more than 20% and an increase in resistance over 60 hours of operation is not more than 20% when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having a 50% Pt/C catalyst and catalyst loading of 0.4 mg Pt/cm$^2$, and test conditions being constant current density of 200 mA/cm$^2$, hydrogen and oxygen flow rates of 0.6 L/min, back pressure of 0.05 MPa$_g$, cell temperature of 90° C., and anode and cathode humidifiers at 95° C. and 98° C., respectively.

Preferably, the aryl linkages of the poly(aryl piperidinium) backbone free of ether linkages comprise p-phenyl, and the piperidinium linkages comprise hydroxide bicarbonate, or carbonate anions, or a combination thereof.

The aryl linkages of the poly(aryl piperidinium) backbone can be derived, for example, from biphenyl, para-terphenyl, meta-terphenyl, para-quaterphenyl, 9,9-dimethyl-9H-fluorene, or benzene monomers.

The piperidinium linkages of the poly(aryl piperidinium) backbone are derived from N,N-dimethyl-4-piperidinium or azoniaspiro salt monomers.

The poly(aryl piperidinium) polymer backbone can further comprise 2,2,2-trifluoroethylbenzene linkages derived from 2,2,2-trifluoroacetophenone monomer, or or trifluoromethyl methylene linkages derived from trifluoromethyl ketone monomer, such as 1,1,1-trifluoropropane linkages derived from 1,1,1-trifluoroacetone.

The piperidone monomer starting material can be N-methyl-4-piperidone or 4-piperidone, or can be functionalized prior to preparing the piperidine polymer. For example, a protected piperidone monomer such as 1-t-butyloxycarbonyl-4-piperidone can be dissolved in organic solvent with slow addition of a hydrogen halide such as hydrogen bromide with stirring at 0° C. and reacted overnight with separation of solid, washing and drying. The resulting 4-piperidone monohydrate hydrobromide can be dissolved in organic solvent and added to an alkylating agent such as an alkyl halide (e.g., 1,10-dibromodecane) and stirred overnight at room temperature. After removal of solvent and column chromatography, N-decylbromo-4-piperidone is obtained. Such a piperidone monomer can be used to alkylate the 1-position of the piperidone monomer before reacting with the nitrogen-containing heterocycle.

The alkylating agent used in forming the piperidone monomer can comprise an alkyl halide such as methyl iodide, iodoethane, 1-iodopropane, 1-iodobutane, 1-iodopentane, 1-iodohexane, 1,10-dibromodecane, methyl bromide, bromoethane, 1-bromopropane, 1-bromobutane, 1-bromopentane, 1-bromohexane, methyl chloride, chloroethane, 1-chloropropane, 1-chlorobutane, 1-chloropentane, 1-chlorohexane, methyl trifluoromethanesulfonate, methyl methanesulfonate, methyl fluorosulfonate, 1,2-dimethylhydrazine, trimethyl phosphate, dimethyl sulfate, or a combination thereof.

The piperidine-functionalized polymer can be prepared by a method which comprises reacting the piperidone monomer or salt or hydrate thereof, the optional 2,2,2-trifluoromethyl ketone monomer, the optional azoniaspiro salt monomer, and the aromatic monomer in the presence of an organic solvent and a polymerization catalyst.

The piperidinium-functionalized polymer can be prepared by a method which comprises reacting the piperidine-functionalized polymer and the quaternary ammonium or phosphonium compound or the nitrogen-containing heterocycle in the presence of an organic solvent.

The poly(aryl piperidinium) polymers can be prepared by a method which comprises reacting the piperidone monomer or salt or hydrate thereof, the optional trifluoromethyl ketone monomer, the optional azoniaspiro salt monomer, and the aromatic monomer in the presence of an organic solvent and a polymerization catalyst to form a piperidine-functionalized intermediate polymer; reacting the piperidine-functionalized polymer with the quaternary ammonium or phosphonium compound or the nitrogen-containing heterocycle in the presence of an organic solvent to form the piperidinium-functionalized polymer; and reacting the piperidinium-functionalized intermediate polymer with a base to form the poly(aryl piperidinium) polymer.

For example, a piperidone monomer such as N-methyl-4-piperidone or 4-piperidone, an optional trifluoromethyl ketone monomer such as 2,2,2-trifluoroacetophenone or 1,1,1-trifluoroacetone, and an aromatic monomer such as benzene, biphenyl, p-terphenyl, m-terphenyl or p-quaterphenyl can be placed in a stirred container and dissolved or dispersed into an organic solvent. A polymerization catalyst in a solvent can then be added dropwise over up to 60 minutes at −78 to 60° C. Thereafter, the reaction is continued at this temperature for about 1 to about 120 hours. The resulting solution is poured slowly into an aqueous solution of ethanol. The solid obtained is filtered, washed with water and immersed in 1 M K2CO3 at room temperature for about 1 to 48 hours. Finally, the product is filtered, washed with water and dried completely under vacuum to form a piperidine-functionalized intermediate polymer.

Next, the piperidine-functionalized polymer is dissolved into an organic solvent in a stirred container. The quaternary ammonium or phosphonium compound or the nitrogen-containing heterocycle is added quickly. The solution is stirred over about 1 to 48 hours at 0 to 100° C. The resulting viscous solution is poured slowly into ether, washed and dried completely to form the piperidinium-functionalized polymer.

The piperidinium-functionalized polymer is then subjected to anion exchange, for example in 1 M KOH for hydroxide exchange, at about 20 to 100° C. for about 12 to 48 hours, followed by washing and immersion in DI water for about 12 to 48 hours under an oxygen-free atmosphere to remove residual KOH.

The poly(aryl piperidinium) polymers can be made into hydroxide exchange membranes. Such hydroxide exchange polymer membranes can be prepared by a method which comprises reacting the piperidone monomer or salt or hydrate thereof, the optional trifluoromethyl ketone monomer, the optional azoniaspiro salt monomer, and the aromatic monomer in the presence of an organic solvent and a polymerization catalyst to form a piperidine-functionalized intermediate polymer; reacting the piperidine-functionalized polymer and the quaternary ammonium or phosphonium compound or the nitrogen-containing heterocycle in the presence of an organic solvent to form a piperidinium-functionalized intermediate polymer; dissolving the piperidinium-functionalized intermediate polymer in a solvent to form a polymer solution; casting the polymer solution to form a polymer membrane; and exchanging anions of the polymer membrane with hydroxide ions to form the hydroxide exchange polymer membrane.

The poly(aryl piperidinium) polymers can be made into reinforced hydroxide exchange membranes as described below. Such reinforced hydroxide exchange membranes can be prepared by a method which comprises wetting a porous substrate in a liquid to form a wetted substrate; dissolving the poly(aryl piperidinium) polymer in a solvent to form a homogeneous solution; applying the solution onto the wetted substrate to form the reinforced membrane; drying the reinforced membrane; and exchanging anions of the reinforced membrane with hydroxide ions to form the reinforced hydroxide exchange polymer membrane. The solution can be applied to the wetted substrate by any known membrane formation technique such as casting, spraying, or doctor knifing.

The resulting reinforced membrane can be impregnated with the poly(aryl piperidinium) polymer multiple times if desired by wetting the reinforced membrane again and repeating the dissolving, casting and drying steps.

The polymerization catalyst used in forming the piperidine-functionalized intermediate polymer can comprise trifluoromethanesulfonic acid, pentafluoroethanesulfonic acid, heptafluoro-1-propanesulfonic acid, trifluoroacetic acid, perfluoropropionic acid, heptafluorobutyric acid, or a combination thereof.

Each of the organic solvents used in the above methods can be independently selected from polar aprotic solvents (e.g., dimethyl sulfoxide, 1-methyl-2-pyrrolidinone, 1-methyl-2-pyrrolidone, 1-methyl-2-pyrrolidone, or dimethylformamide) or other suitable solvents including, but are not limited to, methylene chloride, trifluoroacetic acid, trifluoromethanesulfonic acid, chloroform, 1,1,2,2-tetrachloroethane, dimethylacetamide or a combination thereof.

The solvent in the dissolving step can comprise methanol, ethanol, n-propanol, isopropanol, n-butanol, sec-butanol, tert-butanol, a pentanol, a hexanol, dimethyl sulfoxide, 1-methyl-2pyrrolidone, dimethylformamide, chloroform, ethyl lactate, tetrahydrofuran, 2-methyltetrahydrofuran, water, phenol, acetone, or a combination thereof.

The liquid used to wet the porous substrate can be a low boiling point solvent such as a lower alcohol (e.g., methanol, ethanol, propanol, isopropanol) and/or water. Preferably, the liquid is anhydrous ethanol.

An anion exchange membrane such as a hydroxide exchange membrane is also provided. The membrane is configured and sized to be suitable for use in a fuel cell and comprises any of the poly(aryl piperidinium) polymers as described herein.

A reinforced electrolyte membrane such as a reinforced hydroxide exchange membrane is also provided to increase the mechanical robustness of the anion exchange membrane for stability through numerous wet and dry cycles (relative humidity cycling) in a fuel cell. The membrane is configured and sized to be suitable for use in a fuel cell, and comprises a porous substrate impregnated with any of the poly(aryl piperidinium) polymers as described herein. Methods for preparing reinforced membranes are well known to those of ordinary skill in the art such as those disclosed in U.S. Pat. Nos. RE37,656 and RE37,701, which are incorporated herein by reference for their description of reinforced membrane synthesis and materials.

The porous substrate can comprise a membrane comprised of polytetrafluoroethylene, polypropylene, polyethylene, poly(ether ketone), polyaryletherketone, poly(aryl piperidinium), poly(aryl piperidine), polysulfone, perfluoroalkoxyalkane, or a fluorinated ethylene propylene polymer, or other porous polymers known in the art such as the dimensionally stable membrane from Giner for use in preparing reinforced membranes for fuel cells. Such porous substrates are commercially available, for example, from W. L. Gore & Associates.

The porous substrate can have a porous microstructure of polymeric fibrils. Such substrates comprised of polytetrafluoroethylene are commercially available. The porous substrate can comprise a microstructure of nodes interconnected by fibrils.

The interior volume of the porous substrate can be rendered substantially occlusive by impregnation with the poly(aryl piperidinium) polymer.

The porous substrate can have a thickness from about 1 micron to about 10, 15, 20, 25, 30, 35, 40, 45, 50, 55, 60, 65, 70, 75, 80, 85, 90, 95 or 100 microns. Preferably, the porous substrate has a thickness from about 5 microns to about 30 microns, or from about 7 microns to about 20 microns.

An anion exchange membrane fuel cell is also provided which comprises any of the poly(aryl piperidinium) polymers as described herein.

The poly(aryl piperidinium) polymers can be used in HEMFCs such as a typical fuel cell 10 as shown in FIG. 1. FIG. 1 illustrates a typical fuel cell 10 with an anode portion 12 (illustrated on the left) and a cathode portion 14 (illustrated on the right) which are separated by an electrolyte membrane 16. The electrolyte membrane 16 can be any membrane comprising any of the poly(aryl piperidinium) polymers as described herein, and can be a reinforced membrane, Supporting members are not illustrated. The anode portion carries out an anode half-reaction which oxidizes fuel releasing electrons to an external circuit and producing oxidized products. The cathode portion carries out a cathode half-reaction which reduces an oxidizer consuming electrons from the external circuit. The gas diffusion layers (GDLs) 18 and 20 serve to deliver the fuel 22 and oxidizer 24 uniformly across the respective catalyst layers 26 and 28. Charge neutrality is maintained by a flow of ions from the anode to the cathode for positive ions and from cathode to anode for negative ions. The dimensions illustrated are not representative, as the electrolyte membrane is usually selected to be as thin as possible while maintaining the membrane's structural integrity.

In the case of the illustrated hydroxide exchange membrane fuel cell (HEMFC), the anode half-reaction consumes fuel and OH⁻ ions and produces waste water (as well as carbon dioxide in the case of carbon containing fuels). The cathode half reaction consumes oxygen and produces OH⁻ ions, which flow from the cathode to the anode through the electrolyte membrane. Fuels are limited only by the oxidizing ability of the anode catalyst and typically include hydrogen gas, methanol, ethanol, ethylene glycol, and glycerol. Preferably, the fuel is H2 or methanol. Catalysts are usually platinum (Pt), silver (Ag), or one or more transition metals, e.g., Ni. In the case of a PEMFC, the anode half-reaction consumes fuel and produces H⁺ ions and electrons. The cathode half reaction consumes oxygen, H⁺ ions, and electrons and produces waste water, and H⁺ ions (protons) flow from the anode to the cathode through the electrolyte membrane.

It can, therefore, be appreciated how an electrolyte membrane made from a poly(aryl piperidinium) polymer significantly improves fuel cell performance. First, greater fuel cell efficiency requires low internal resistance, and therefore, electrolyte membranes with greater ionic conductivity (decreased ionic resistance) are preferred. Second, greater power requires greater fuel cell currents, and therefore, electrolyte membranes with greater ion-current carrying capacity are preferred. Also, practical electrolyte membranes resist chemical degradation and are mechanically stable in a fuel cell environment, and also should be readily manufactured.

Although a principal application for the poly(aryl piperidinium) polymers is for energy conversion such as in use in anion exchange membranes, hydroxide exchange membranes, anion exchange membrane fuel cells, and hydroxide exchange membrane fuel cells, the anion/hydroxide exchange ionomers and membranes can be used for many other purposes such as use in fuel cells (e.g., hydrogen/alcohol/ammonia fuel cells); electrolyzers (e.g., water/carbon dioxide/ammonia electrolyzers), electrodialyzers; ion-exchangers; solar hydrogen generators; desalinators (e.g., desalination of sea/brackish water); demineralization of water; ultra-pure water production; waste water treatment; concentration of electrolyte solutions in the food, drug, chemical, and biotechnology fields; electrolysis (e.g., chlor-alkali production and H2/O2 production); energy storage (e.g., super capacitors, metal air batteries and redox flow batteries); sensors (e.g., pH/RH sensors); and in other applications where an anion-conductive ionomer is advantageous.

Having described the invention in detail, it will be apparent that modifications and variations are possible without departing from the scope of the invention defined in the appended claims.

EXAMPLES

The following non-limiting examples are provided to further illustrate the present invention.

Example 1

A poly(aryl piperidinium) was prepared from N-methyl-4-piperidone, 2,2,2-trifluoroacetophenone and biphenyl (referred to as PAP-1-x, wherein x is the mole ratio of N-methyl-4-piperidone to 2,2,2-trifluoroacetophenone and is from 1 to 100). PAP-1-x was prepared by three major steps: (1) synthesis of a piperidine-functionalized polymer, (2) synthesis of a piperidinium-functionalized polymer, and (3) membrane casting and hydroxide ion exchange. The reaction scheme is depicted below:

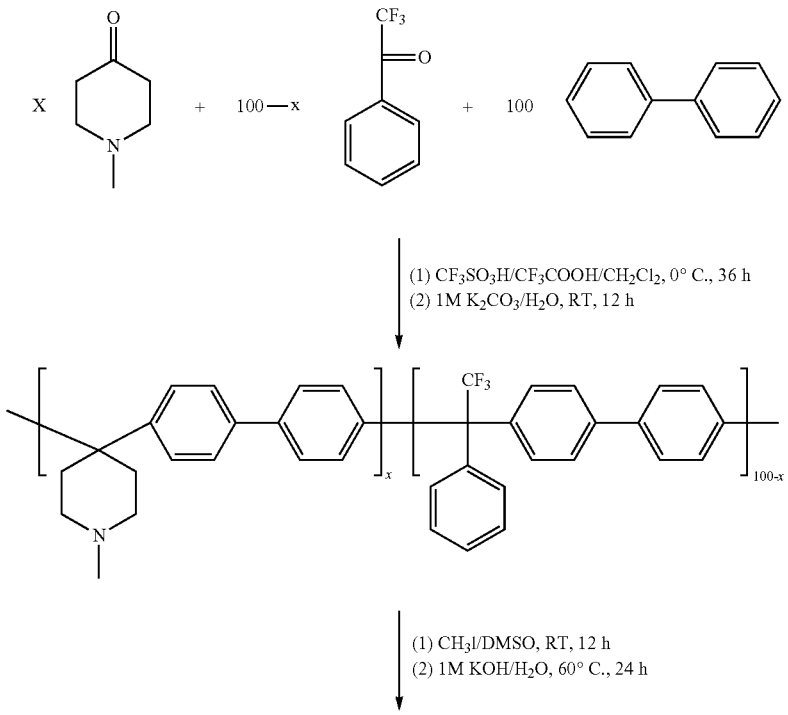

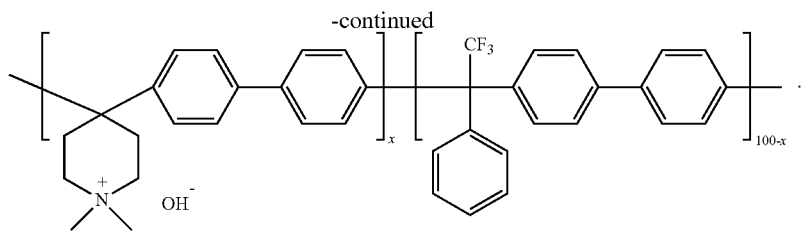

PAP-1-x (x = 1 to 100)

(1) Synthesis of a Piperidine-Functionalized Polymer.

Figure 2:
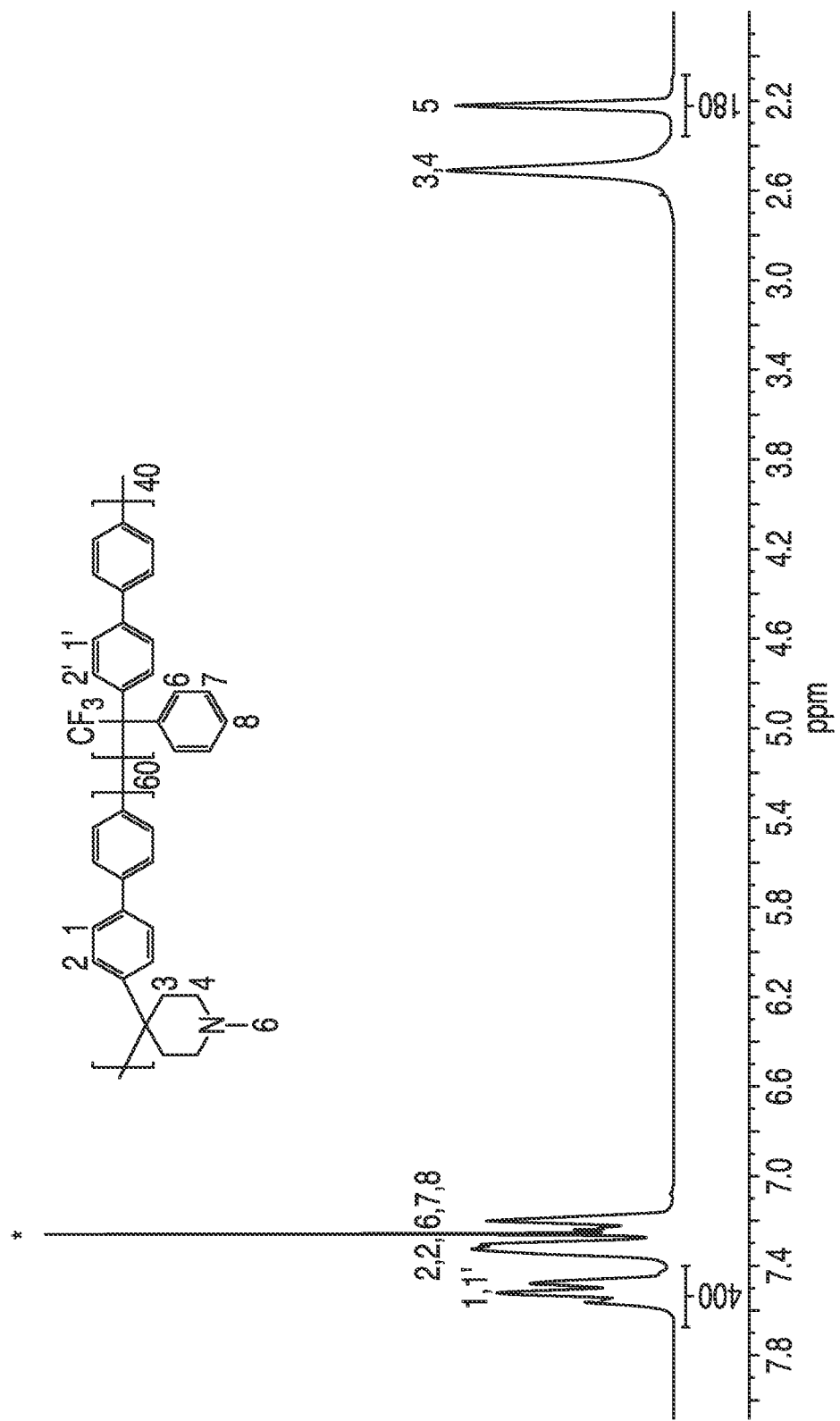
FIG. 2 depicts an $^1$H NMR spectrum of a piperidine-functionalized polymer.

To a 100 mL three-necked flask equipped with overhead mechanical stirrer, N-methyl-4-piperidone (0.6790 g, 6 mmol), 2,2,2-trifluoroacetophenone (0.6965 g, 4 mmol) and biphenyl (1.5421 g, 10 mmol) were dissolved into methylene chloride (10 mL). Trifluoroacetic acid (TFA) (0.5 mL) and trifluoromethanesulfonic acid (TFSA) (10 mL) were then added dropwise over 30 minutes at 0° C. Thereafter, the reaction was continued at this temperature for 36 hours. The resulting viscous, brown solution was poured slowly into an aqueous solution of ethanol. The white fibrous solid was filtered, washed with water and immersed in 1 M $K_2CO_3$ at room temperature for 12 hours. Finally, the white fibrous product was filtered, washed with water and dried completely at 60° C. under vacuum. The yield of the polymer was nearly 100%, $^1$H NMR (CDCl$_3$, δ, ppm): 7.57-7.48 ($H_1$ and $H_{1'}$), 7.34-7.19 ($H_2$, $H_{2'}$, $H_6$, H7 and $H_8$), 2.51 ($H_3$ and $H_4$), and 2.22 ($H_5$) (see FIG. 2).

Figure 3:
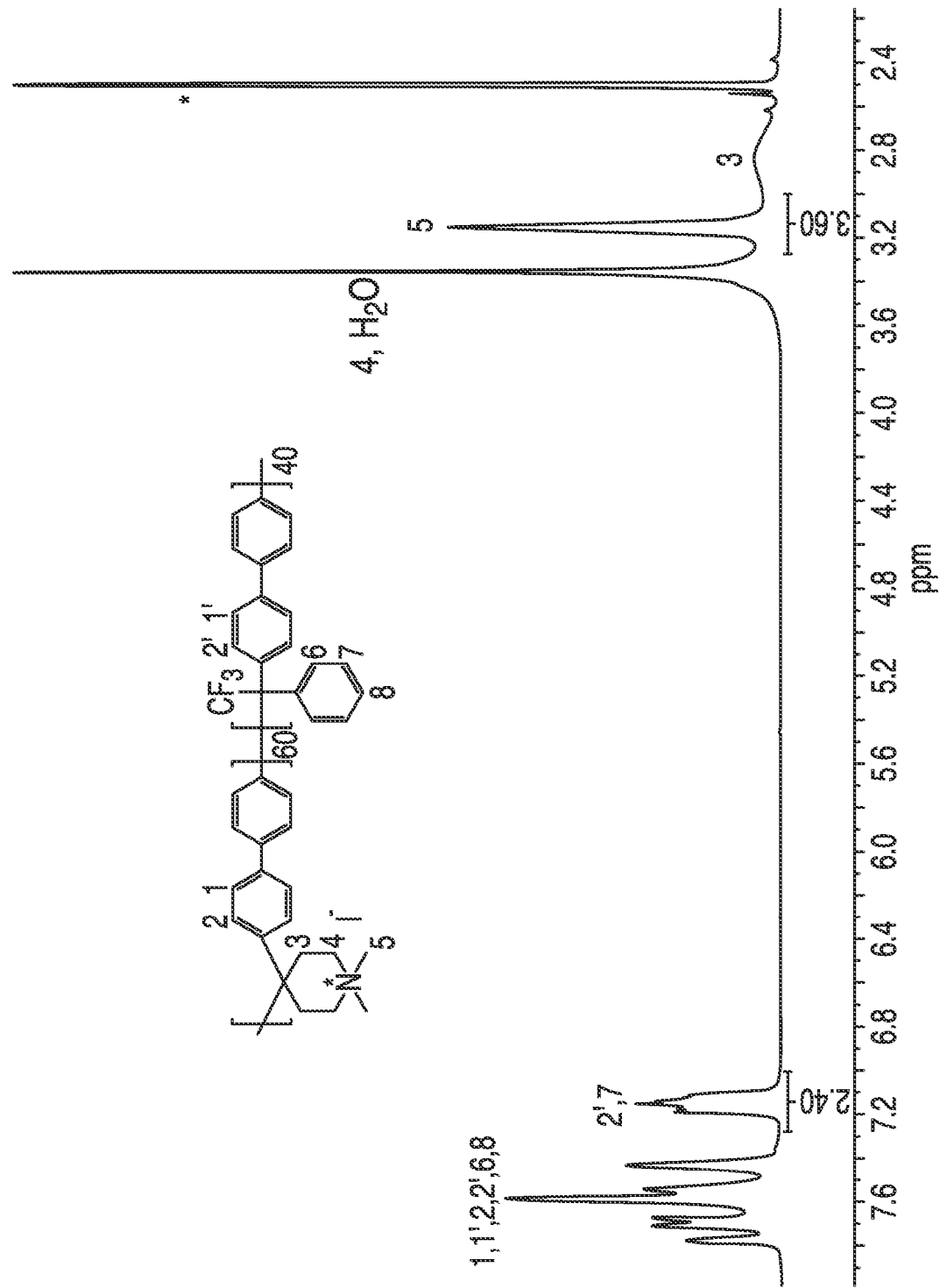
FIG. 3 depicts an $^1$H NMR spectrum of a piperidinium-functionalized polymer (PAP-1-60)

(2) Synthesis of piperidinium-functionalized polymer (PAP-1-60). To a 50 mL one-necked flask equipped with magnetic bar, piperine-functionalized polymer (1.0 g) was dissolved into 1-methyl-2-pyrrolidinone (20 mL). Methyl iodide (1 mL) was added quickly. The solution was stirred over 12 hours at room temperature. The resulting viscous, yellow solution was added dropwise into ether. The yellow solid was filtered, washed with ether and dried completely at 60° C. under vacuum. The yield of the polymer PAP-1-60 was almost 100%. $^1$H NMR (DMSO-d6, δ, ppm): 7.77-7.35 ($H_1$, $H_{1'}$, H2 and $H_{2'}$), 7.18-7.11 ($H_6$, $H_7$ and $H_8$), 3.35 ($H_4$), 3.15 ($H_5$), and 2.85 ($H_3$) (see FIG. 3).

(3) PAP-1-60 Membrane Casting and Hydroxide Exchange.

Membrane was prepared by dissolving the PAP-1-60 polymer (1.0 g) in NMP (20 mL) by casting on a clear glass plate at 80° C. for 8 hours. The membrane (in iodide form) was peeled off from the glass plate in contact with deionized (DI) water. The membrane in hydroxide form were obtained by ion exchange in 1 M KOH at 60° C. for 24 hours, followed by washing and immersion in DI water for 48 hours under argon to remove residual KOH.

Other PAP-1-x membranes were prepared by using different mole ratios of N-methyl-4-piperidone to 2,2,2-trifluoroacetophenone.

(4) Alkaline Stability.

Figure 4:
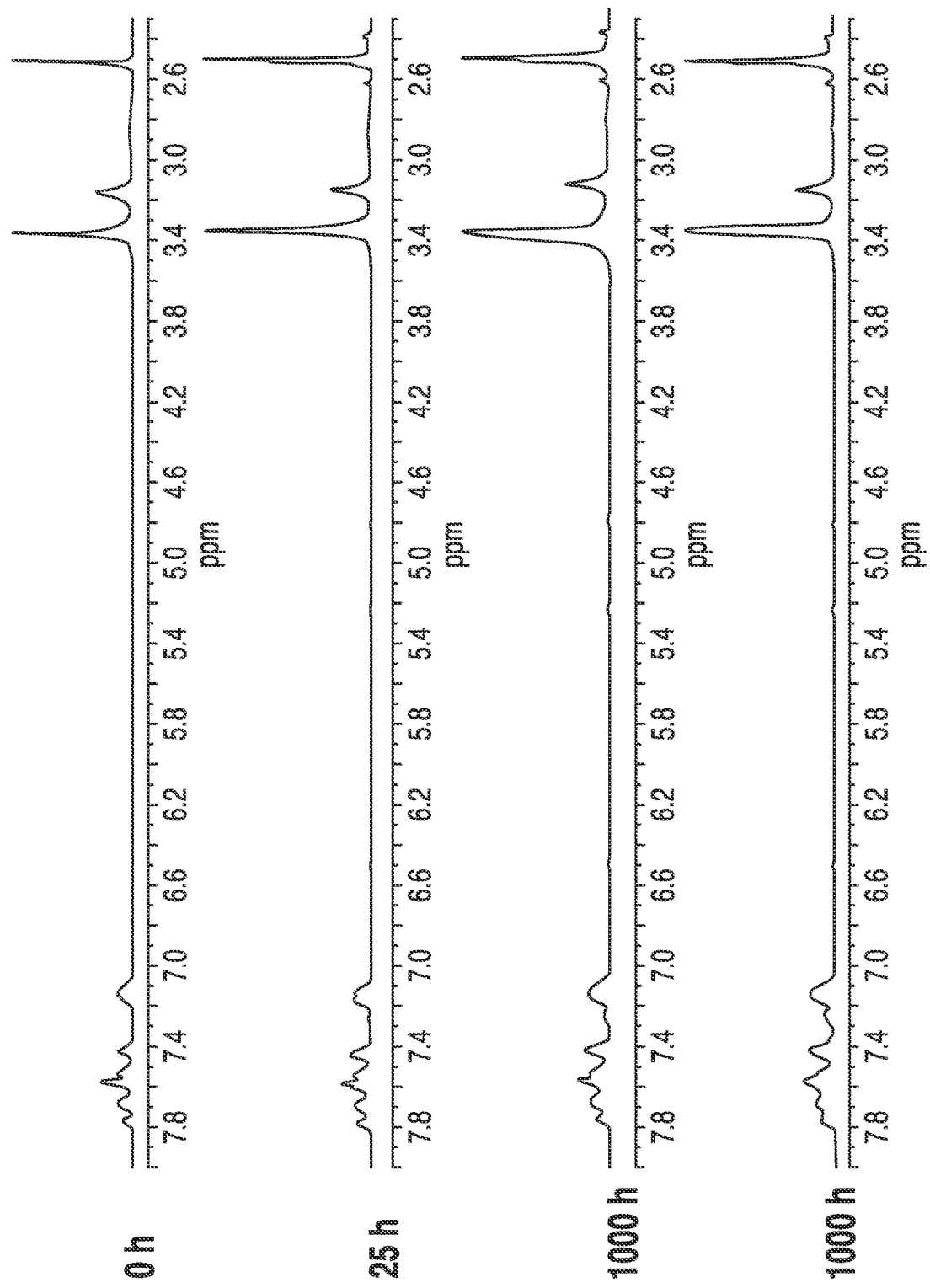
FIG. 4 shows an $^1$H NMR spectra of a piperidinium-functionalized polymer PAP-1-60 (a) before and (b) after a stability test in 1M KOH solution at 100° C.

Alkaline stability of the PAP-1-x polymer was evaluated by immersing the membrane into 1 M KOH water solution at 100° C. The $^1$H NMR spectra of PAP-1-60 before and after the alkaline test for 2000 hours are shown in FIG. 4. No change in chemical shift was observed. This result confirmed that highly alkaline stable piperidinium cation implanted in a rigid aryl polymer backbone structure without ether bonds can afford remarkable chemical stability under alkaline conditions even at high temperature.

(5) Water Uptake and Hydroxide Conductivity.

Figure 5:
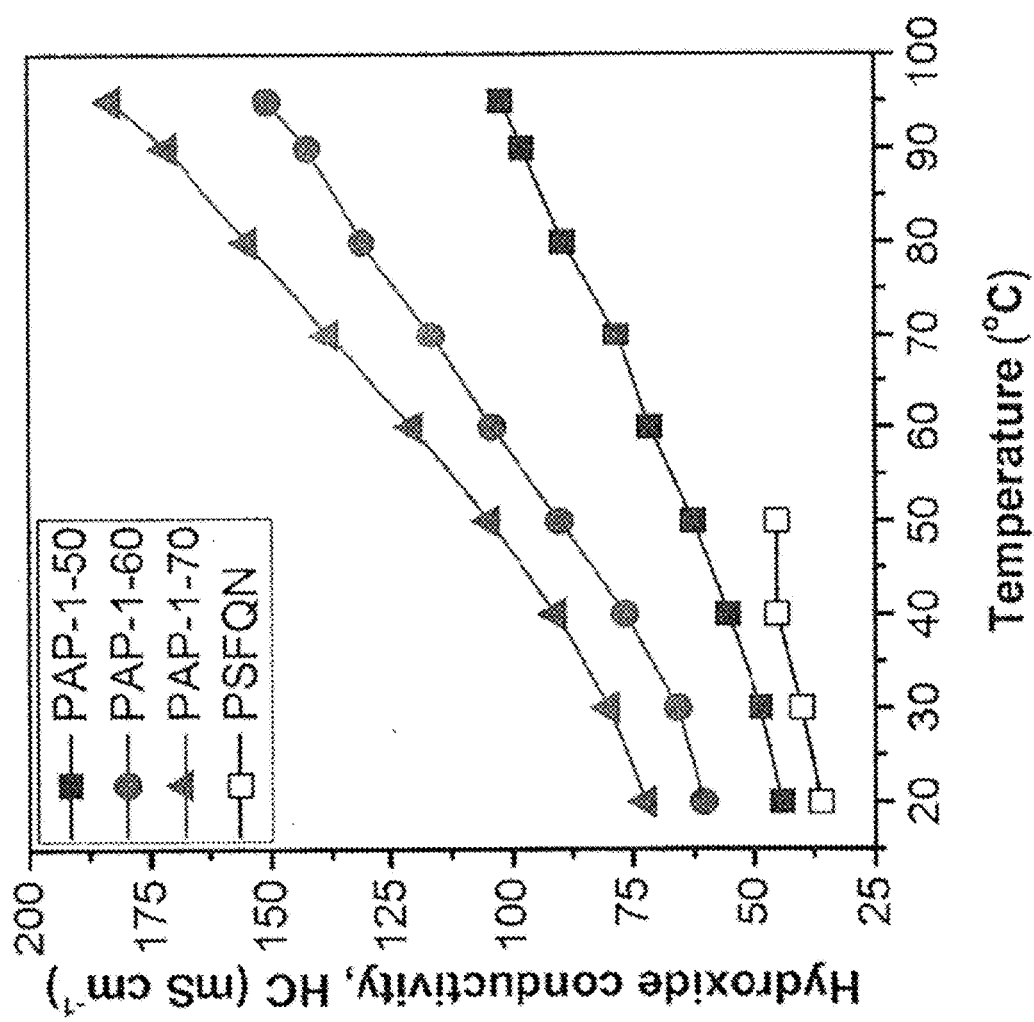
FIG. 5 is a graph of hydroxide conductivity for piperidinium-functionalized polymers PAP-1-50, PAP-1-60, and PAP-1-70 and for PSFQN as a function of temperature.

An ideal material for HEMs/HEIs should have good ion conductivity with low water uptake. All membranes showed very high conductivity in pure water as shown in FIG. 5. For example, at 20° C. the hydroxide conductivity of PAP-1-60 (61 mS/cm) is much greater than PSFQN (the benchmark HEM) which has an IEC value of 36 mS/cm. PSFQN is derived from benzyl trimethyl ammonium polysulfone and has the formula:

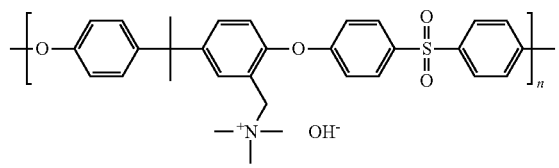

Figure 6:
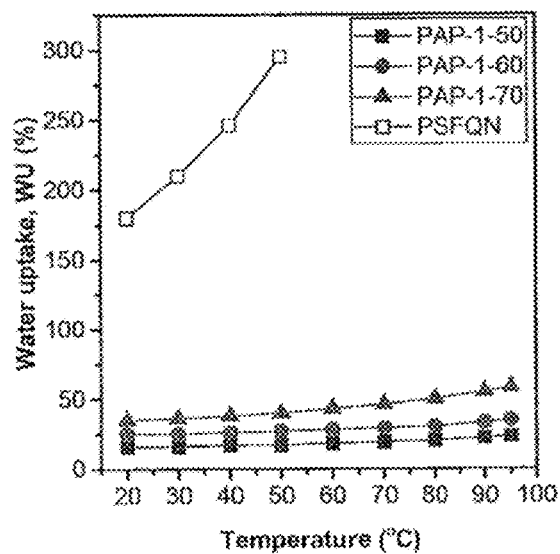
FIG. 6 is a graph of water uptake for piperidinium-functionalized polymers PAP-1-50, PAP-1-60, and PAP-1-70 and for PSFQN as a function of temperature.

Increasing the temperature also enhanced the hydroxide conductivity of the membrane samples. At 95° C., PAP-1-50, PAP-1-60 and PAP-1-70 had hydroxide conductivities of 102, 151 and 183 mS/cm, respectively. PAP-1-x membranes had much lower water uptake value (16% to 35%) when compared with PSFQN (180%) at 20° C. as shown in FIG. 6. Surprisingly, PAP-1-x membranes still maintained very low water uptake at 95° C. (20% to 60%), due to the presence of the rigid aromatic backbone.

(6) Solubility and Mechanical Properties.

Figure 7:
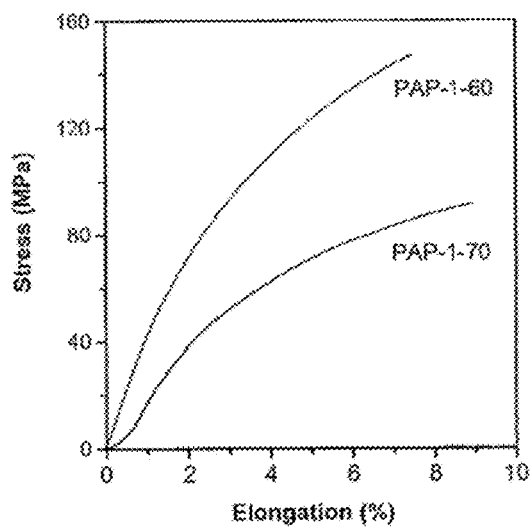
FIG. 7 is a graph depicting tensile stress as a function of elongation for piperidinium-functionalized polymers PAP-1-60 and PAP-1-70.

The PAP-1-x polymers exhibited excellent solubility in dimethylformamide, N-methylpyrrolidone, dimethyl sulfoxide, and isopropanol/water (1/1 weight ratio), but did not dissolve in pure water and isopropanol. The PAP-1-x was insoluble in pure water and isopropanol, even at 100° C., suggesting that it could be used as an ionomer in the catalyst layer without loss arising from water solubility. Therefore, the solvent processability of the PAP-1-x polymers enabled their use not only as HEMs but also as HEIs. The tensile strength and elongation at the break of PAP-1-x were 100-150 MPa and 7-9%, respectively, which meet the requirements for building membrane electrode assemblies (MEAs) in HEMFCs (see FIG. 7).

(7) Hydroxide Exchange Membrane Fuel Cell (HEMFC) Performance.

Although PAP-1-x membranes have been shown to have superior chemical stability, hydroxide conductivity, low water uptake, good solubility and mechanical properties, the most practical evaluation of these materials is their performance in HEMFC single cells as an HE in the catalyst layer and as the HEM. Membrane-electrode assemblies (MEAs) were fabricated by depositing 5 cm$^2$ electrode onto both sides of a PAP-1-60 membrane with a robotic sprayer (Sono-Tek ExactaCoat). The electrode ink was prepared by adding 250 mg of catalyst (Tanaka Kikinzoku Kogyo, or TKK, 50% Pt on high-surface-area C) and a desired amount of ionomer (PAP-1-x, prepared by dissolving the PAP-1-x polymer in a water and isopropanol mixture) to 10 g of water and 10 g of isopropanol, followed by sonicating for 1 hour. The catalyst loading was 0.4 mg Pt/cm$^2$. The sandwich was completed by adding a rubber gasket, a GDL (SGL25CC), and a graphite flow field (ElectroChem) to each side of the MEA. Performance was characterized with a fuel cell test system equipped with a back pressure module (Scribner 850e). Normally, the cell was activated for 30 minutes at 100 mA/cm$^2$ and another 30 minutes at 200 mA/cm$^2$. After activation, performance was recorded by scanning current.

Figure 8:
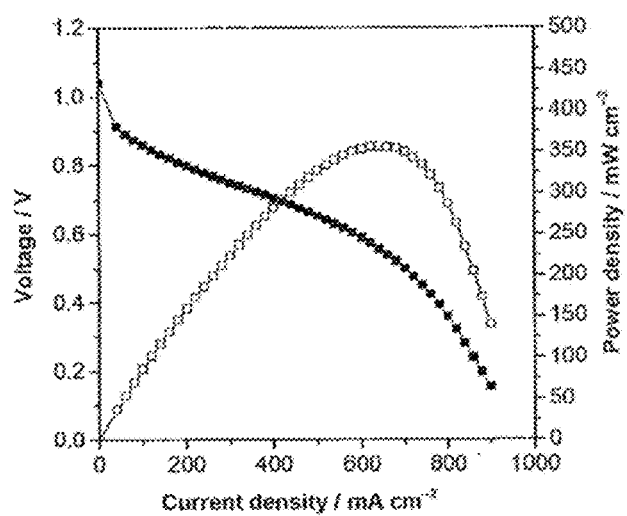
FIG. 8 illustrates Polarization (voltage as a function of current density) and power density (power density as a function of current density) curves of an HEMFC at 95° C. Materials: PAP-1-60 membrane, ionomer loading of 20% PAP-1-70, catalyst loading of 0.4 mg Pt/cm$^2$ TKK 50% Pt/C. Test conditions: anode and cathode humidifier at 95° C. and 98° C., respectively, H$_2$ and O$_2$ flow rates of 0.6 L/min and back pressures of 0.1 MPa$_g$.
Figure 9:
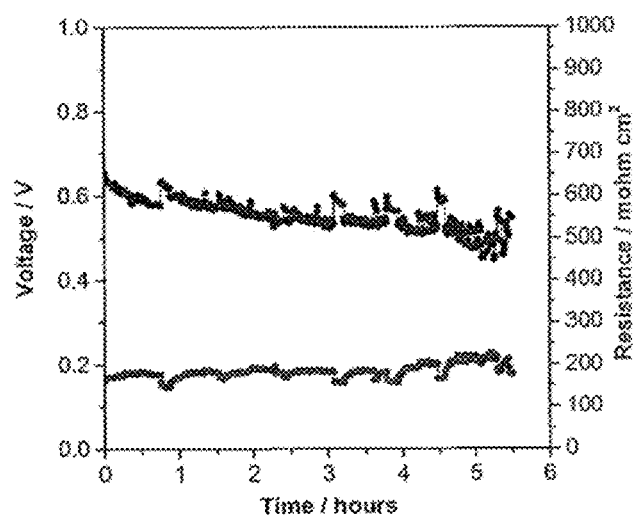
FIG. 9 depicts voltage as a function of time and resistance as a function of time (a lifetime test) for an HEMFC at 95° C. Materials: PAP-1-60 membrane, ionomer loading of 20% PAP-1-70, catalyst loading of 0.4 mg Pt/cm$^2$ TKK 50% Pt/C. Test conditions: constant current density of 400 mA/cm$^2$, anode and cathode humidifier at 95° C. and 98° C., respectively, H$_2$ and O$_2$ flow rates of 0.2 L/min and back pressures of 0.05 MPa$_g$.

FIG. 8 shows the polarization curves of an H$_2$/O$_2$ HEMFC with PAP-1-60 as the membrane and PAP-1-70 as the ionomer at 95° C. The open circuit voltages (OCVs) were close to the theoretical value of about 1.1 V, indicating that the PAP-1-70 ionomer did not affect the catalyst function of Pt significantly and the PAP-1-60 membrane separated the fuels very well. The HEMFC showed very high peak power density (356 mW/cm$^2$) and high stability at 95° C. as shown in FIGS. 8 and 9.

Example 2

Another example of a poly(aryl piperidinium) is based on N-methyl-4-piperidone, 2,2,2-trifluoroacetophenone and p-terphenyl (PAP-2-x, x is the mole ratio of N-methyl-4-piperidone to 2,2,2-trifluoroacetophenone, x=1 to 100). The reaction scheme for preparing the polymer is as follows:

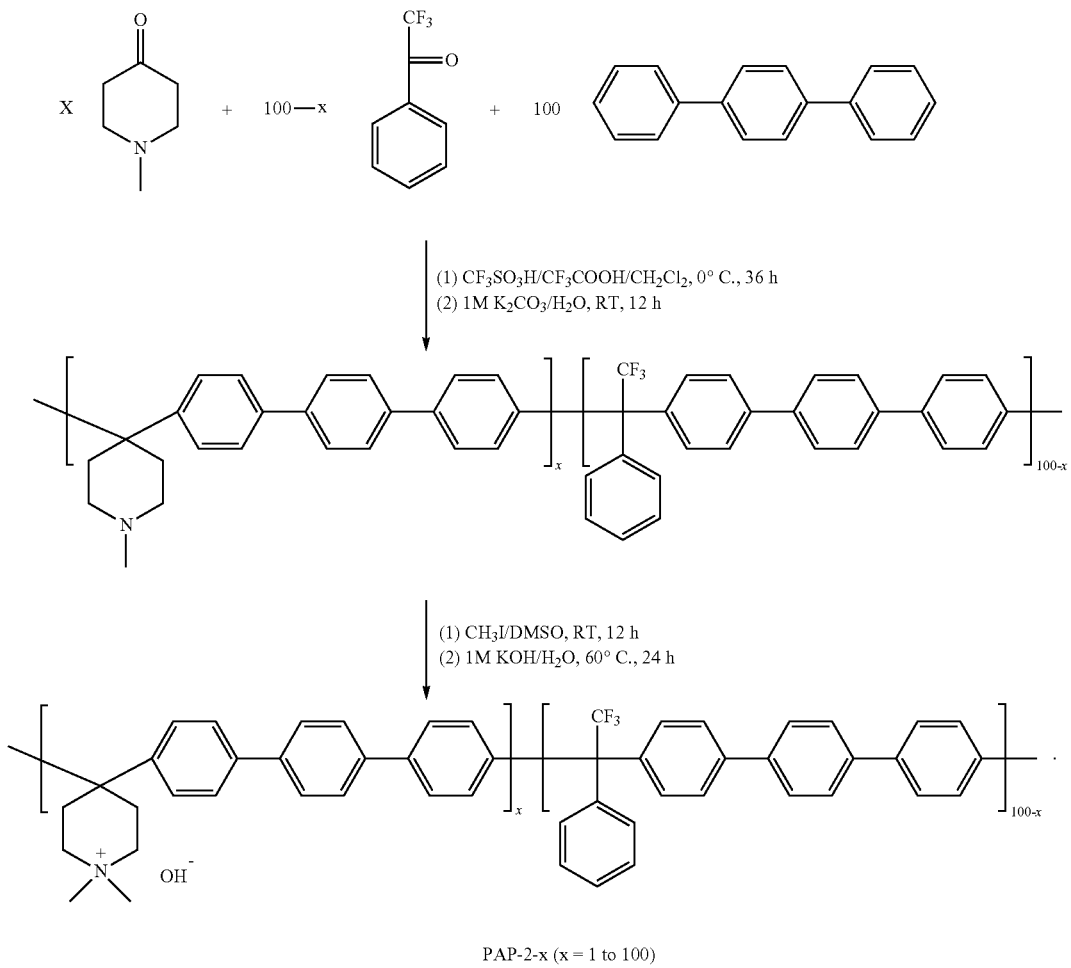

PAP-2-x (x = 1 to 100)

(1) Synthesis of Piperidine-Functionalized Polymer.

Figure 10:
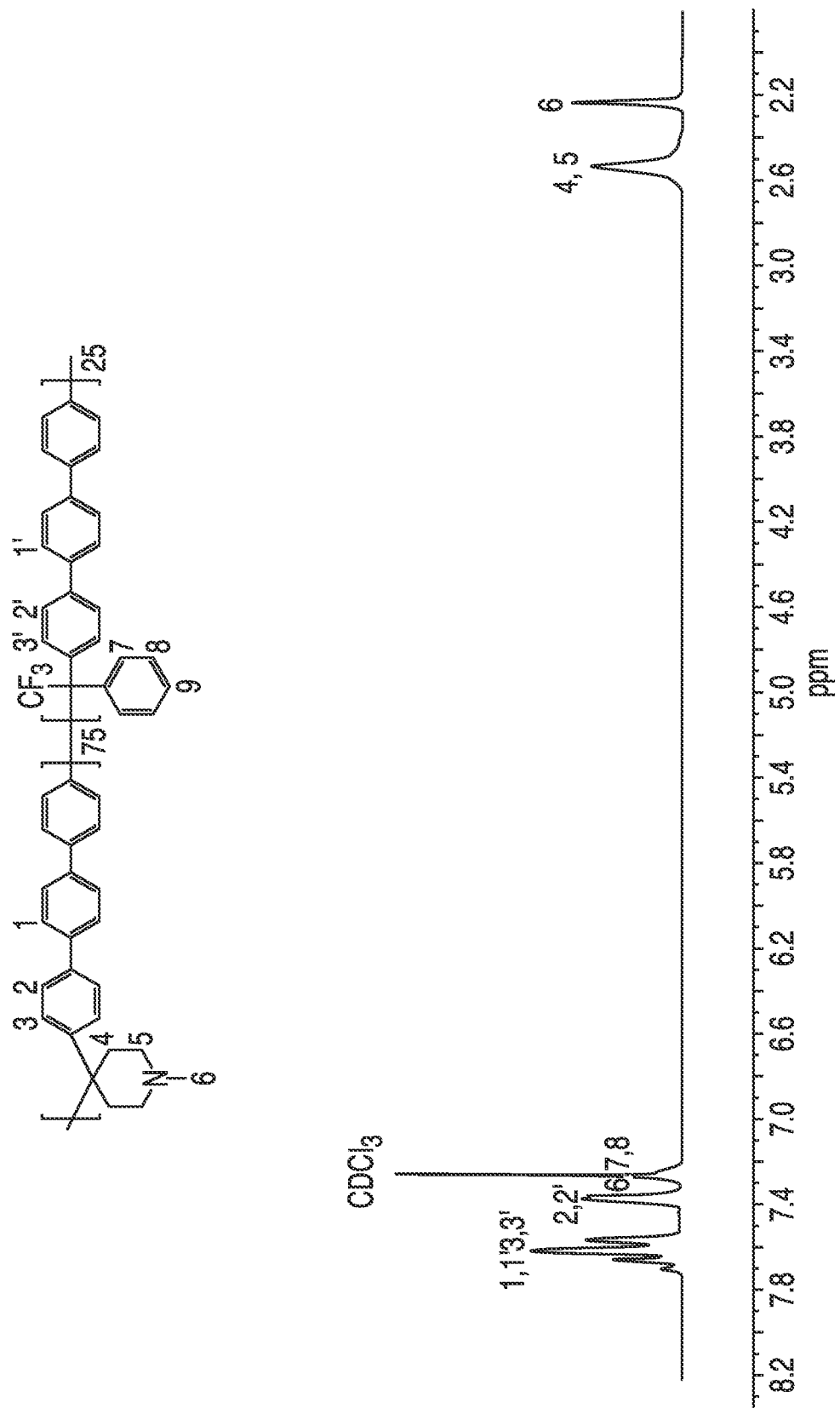
FIG. 10 shows an $^1$H NMR spectrum of a piperidine-functionalized polymer used in making PAP-2-75.

To a 100 mL three-necked flask equipped with overhead mechanical stirrer, N-methyl-4-piperidone (0.8487 g, 7.5 mmol), 2,2,2-trifluoroacetophenone (0.4353 g, 2.5 mmol) and biphenyl (1.5421 g, 10 mmol) were dissolved into methylene chloride (10 mL). TFA (0.5 mL) and TFSA (10 mL) were then added dropwise over 30 minutes at 0° C. Thereafter, the reaction was continued at this temperature for 36 hours. The resulting viscous, brown solution was poured slowly into ethanol. The white fibrous solid was filtered, washed with water and immersed in 1 M K$_2$CO$_3$ at room temperature for 12 hours. Finally, the white fibrous product was filtered, washed with water and dried completely at 60° C. under vacuum. The yield of the polymer was nearly 100%. $^1$H NMR (CDC, δ, ppm): 7.70-7.56 (H$_1$, H$_{1'}$, H$_3$ and H$_{3'}$), 7.37-7.19 (H$_2$, H$_{2'}$, H$_6$, H$_7$ and H$_8$), 2.54 (H$_4$ and H$_5$), and 2.24 (H$_6$) (FIG. 10).

(2) Synthesis of Piperidinium-Functionalized Polymer (PAP-2-75).

Figure 11:
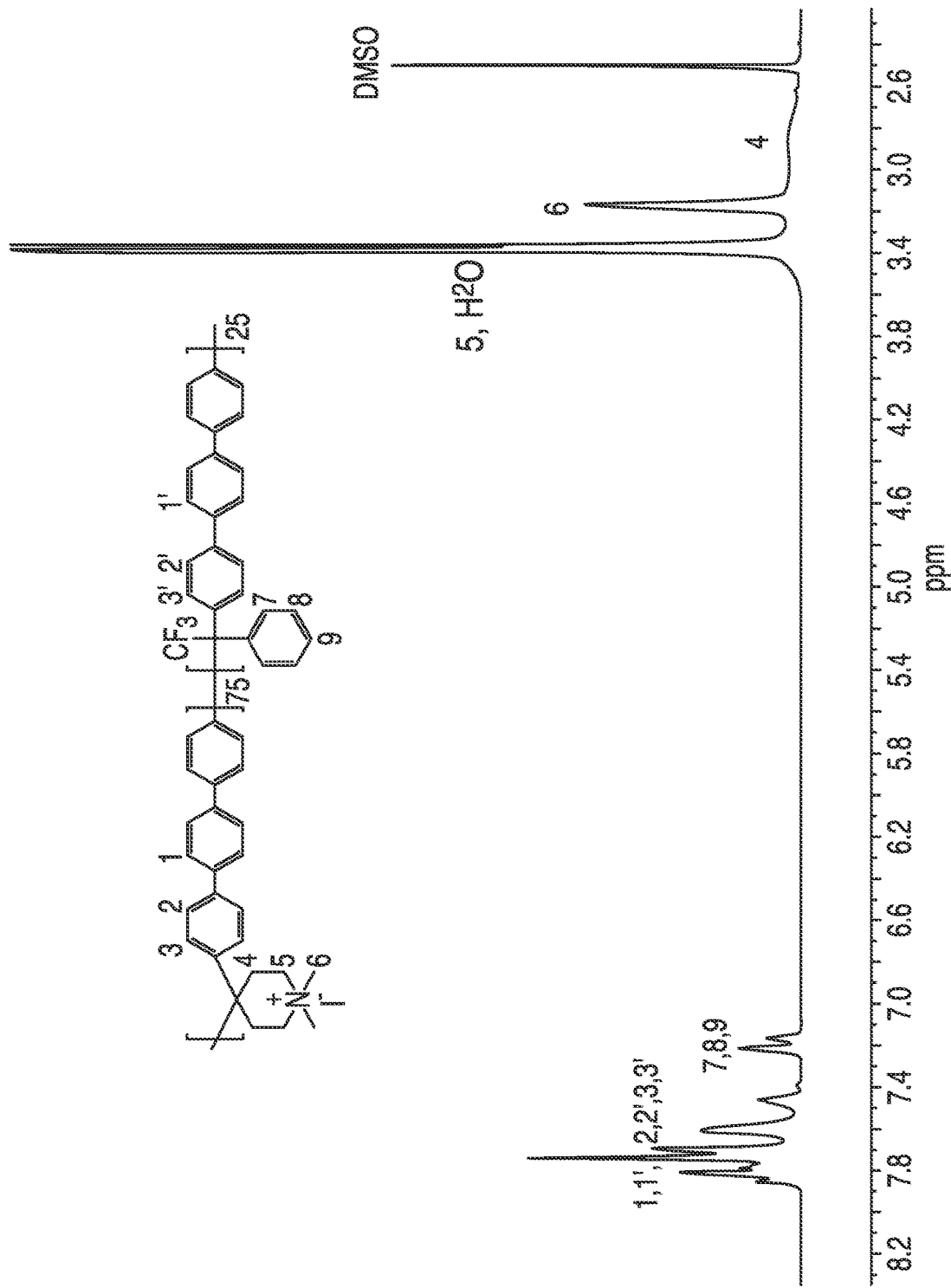
FIG. 11 shows an $^1$H NMR spectrum of a piperidinium-functionalized polymer PAP-2-75.

To a 50 mL one-necked flask equipped with magnetic bar, the piperidine-functionalized polymer (1.0 g) was dissolved into DMSO (20 mL). Methyl iodide (1 mL) was added quickly. The solution was stirred over 12 hours at room temperature. The resulting viscous, yellow solution was added dropwise into ether. The yellow solid was filtered, washed with ether and dried completely at 60° C. under vacuum. The yield of the polymer PAP-2-75 was almost 100%. $^1$H NMR (DMSO-d6, δ, ppm): 7.98-7.46 ($H_1$, $H_{1'}$, $H_2$, $H_{2'}$, $H_3$ and $H_{3'}$), 7.22-7.17 ($H_7$, $H_8$ and $H_9$), 3.38 ($H_5$), 3.17 ($H_6$), and 2.85 ($H_4$) (FIG. 11).

(3) PAP-2-75 Membrane Casting and Hydroxide Exchange.

Membrane was prepared by dissolving the PAP-2-75 polymer (1.0 g) in DMSO (30 mL) and casting on a clear glass plate at 80° C. for 8 hours. The membrane (in iodide form) was peeled off from a glass plate in contact with deionized (DI) water. The membrane in hydroxide form was obtained by ion exchange in 1 M KOH at 60° C. for 24 hours, followed by washing and immersion in DI water for 48 hours under argon to remove residual KOH.

(4) Water Uptake and Hydroxide Conductivity.

Figure 12:
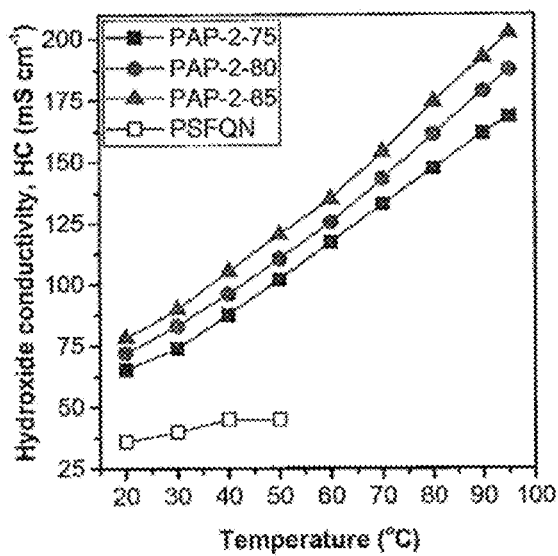
FIG. 12 depicts hydroxide conductivity as a function of temperature for piperidinium-functionalized polymers PAP-2-75, PAP-2-80 and PAP-2-85.
Figure 13:
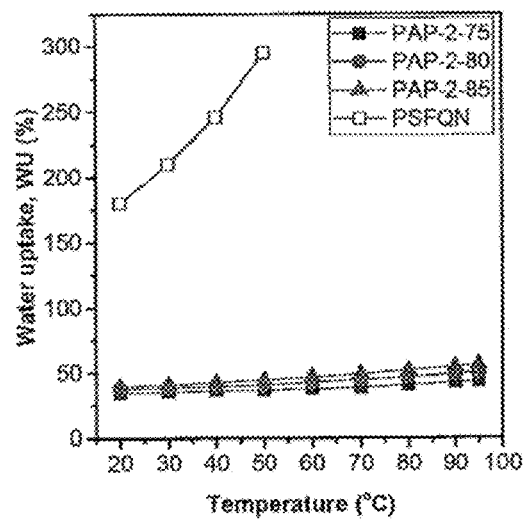
FIG. 13 depicts water uptake as a function of temperature for piperidinium-functionalized polymers PAP-2-75, PAP-2-80 and PAP-2-85.

All membranes showed superior conductivity (as shown in FIG. 12) and low water uptake (as shown in FIG. 13) in pure water from 20° C. to 95° C.

Example 3

Another poly(aryl piperidinium) polymer is based on N-methyl-4-piperidone, 2,2,2-trifluoroacetophenone and p-quaterphenyl (PAP-3-x, wherein x is the mole ratio of N-methyl-4-piperidone to 2,2,2-trifluoroacetophenone, x=1 to 100). The synthesis of PAP-3-x is similar to PAP-1-x and is shown in the reaction scheme below:

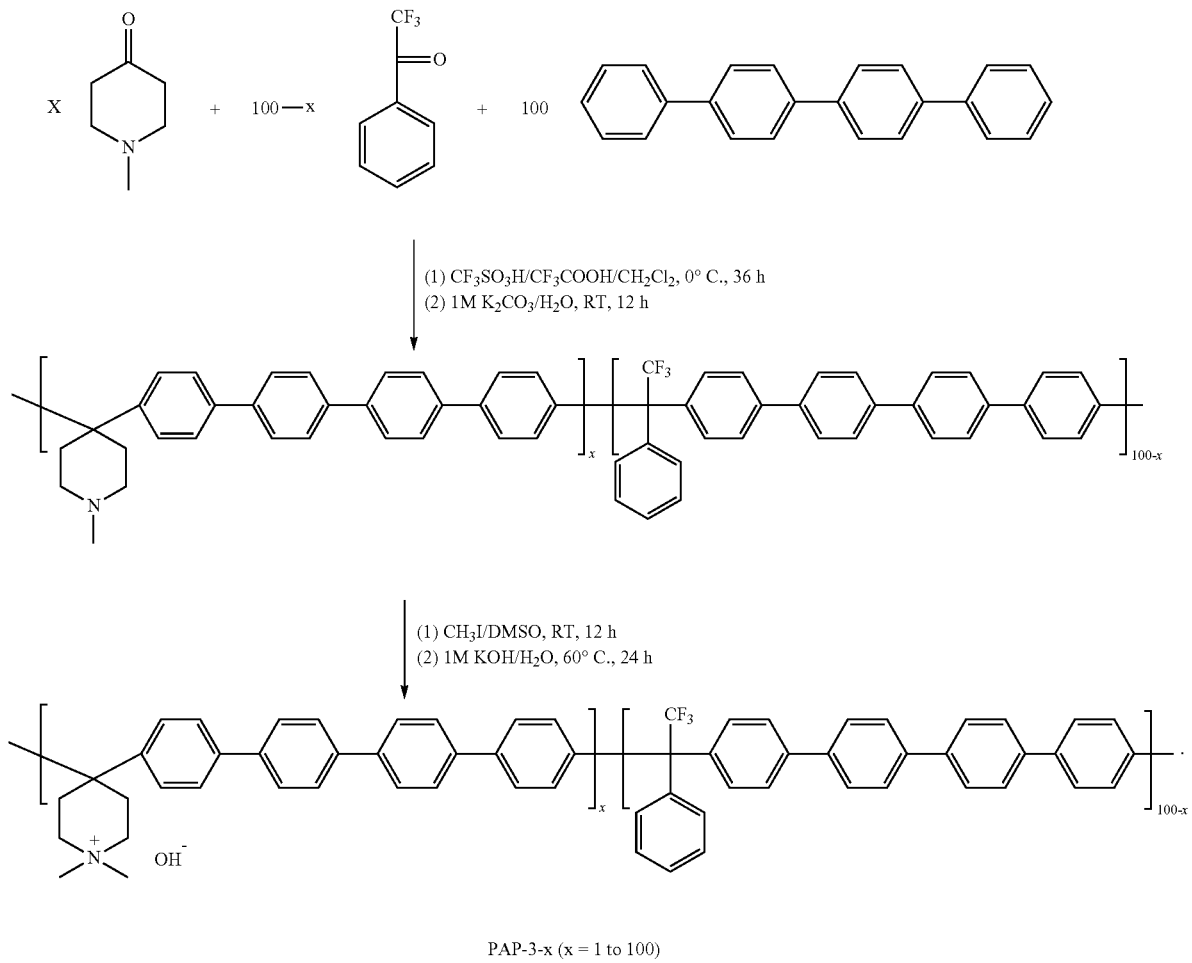

PAP-3-x (x = 1 to 100)

Example 4

Another poly(aryl piperidinium) polymer is based on N-methyl-4-piperidone, 2,2,2-trifluoroacetophenone and benzene (PAP-4-x, x is the mole ratio of N-methyl-4-piperidone to 2,2,2-trifluoroacetophenone, x=1 to 100). The synthesis of PAP-4-x is similar to PAP-1-x and the reaction scheme is shown below:

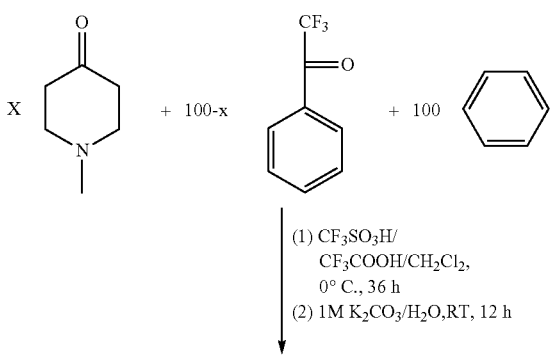

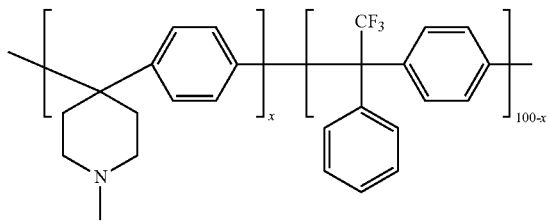

(1) CH₃I/NMP, RT, 12 h
(2) 1M KOH/H₂O, 60° C., 24h

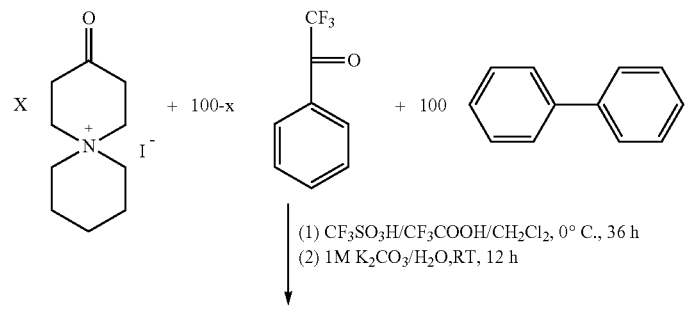

PAP-4-x (x = 1 to 100)

Example 5

Another poly(aryl piperidinium) polymer is based on 3-oxo-6-azoniaspiro[5.5]undecane iodide, 2,2,2-trifluoroacetophenone, and biphenyl (PAP-ASU-1-x, x is the mole ratio of 3-oxo-6-azoniaspiro[5.5]undecane iodide and 2,2,2-trifluoroacetophenone, x=1 to 100). The reaction scheme for the synthesis is as follows:

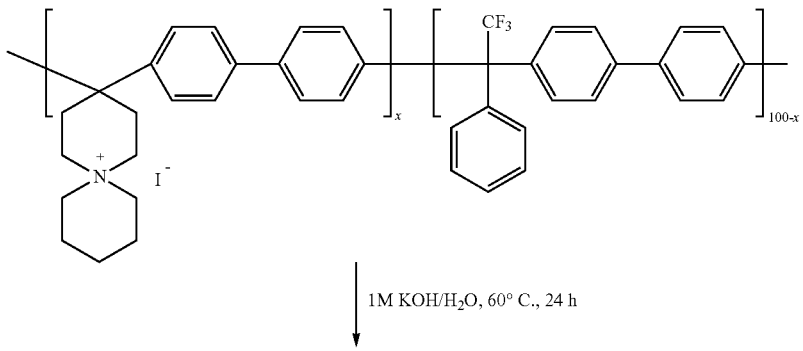

(1) CF₃SO₃H/CF₃COOH/CH₂Cl₂, 0° C., 36 h
(2) 1M K₂CO₃/H₂O, RT, 12 h

1M KOH/H₂O, 60° C., 24 h

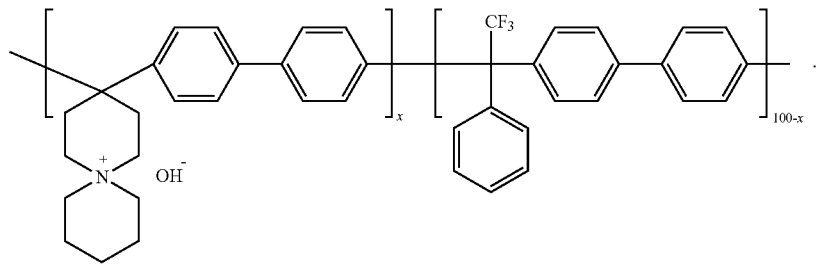

PAP-ASU-1-x (x = 1 to 100)

Example 6

Yet another poly(aryl piperidinium) polymer is based on 3-oxo-6-azoniaspiro[5.5]undecane iodide, 2,2,2-trifluoroacetophenone and p-terphenyl (PAP-ASU-2-x, wherein x is the mole ratio of 3-oxo-6-azoniaspiro[5.5]undecane iodide to 2,2,2-trifluoroacetophenone, x=1 to 100). The reaction scheme for the polymer synthesis is shown below:

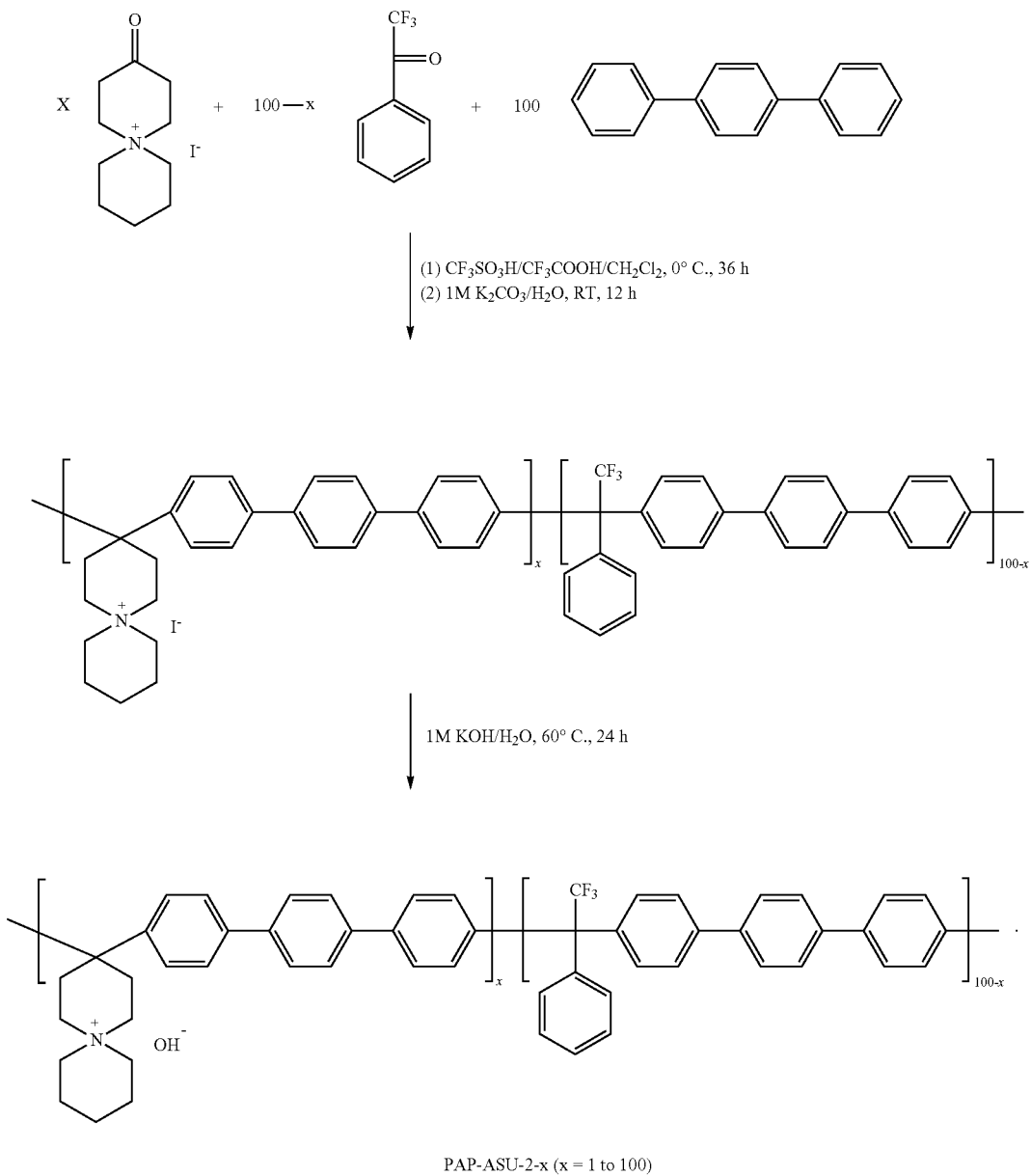

PAP-ASU-2-x (x = 1 to 100)

Example 7

Another poly(aryl piperidinium) polymer is based on 3-oxo-6-azoniaspiro[5.5]undecane iodide, 2,2,2-trifluoroacetophenone and p-quaterphenyl (PAP-ASU-3-x, wherein x is the mole ratio of 3-oxo-6-azoniaspiro[5.5]undecane iodide to 2,2,2-trifluoroacetophenone, x=1 to 100). The polymer synthesis reaction scheme is shown below:

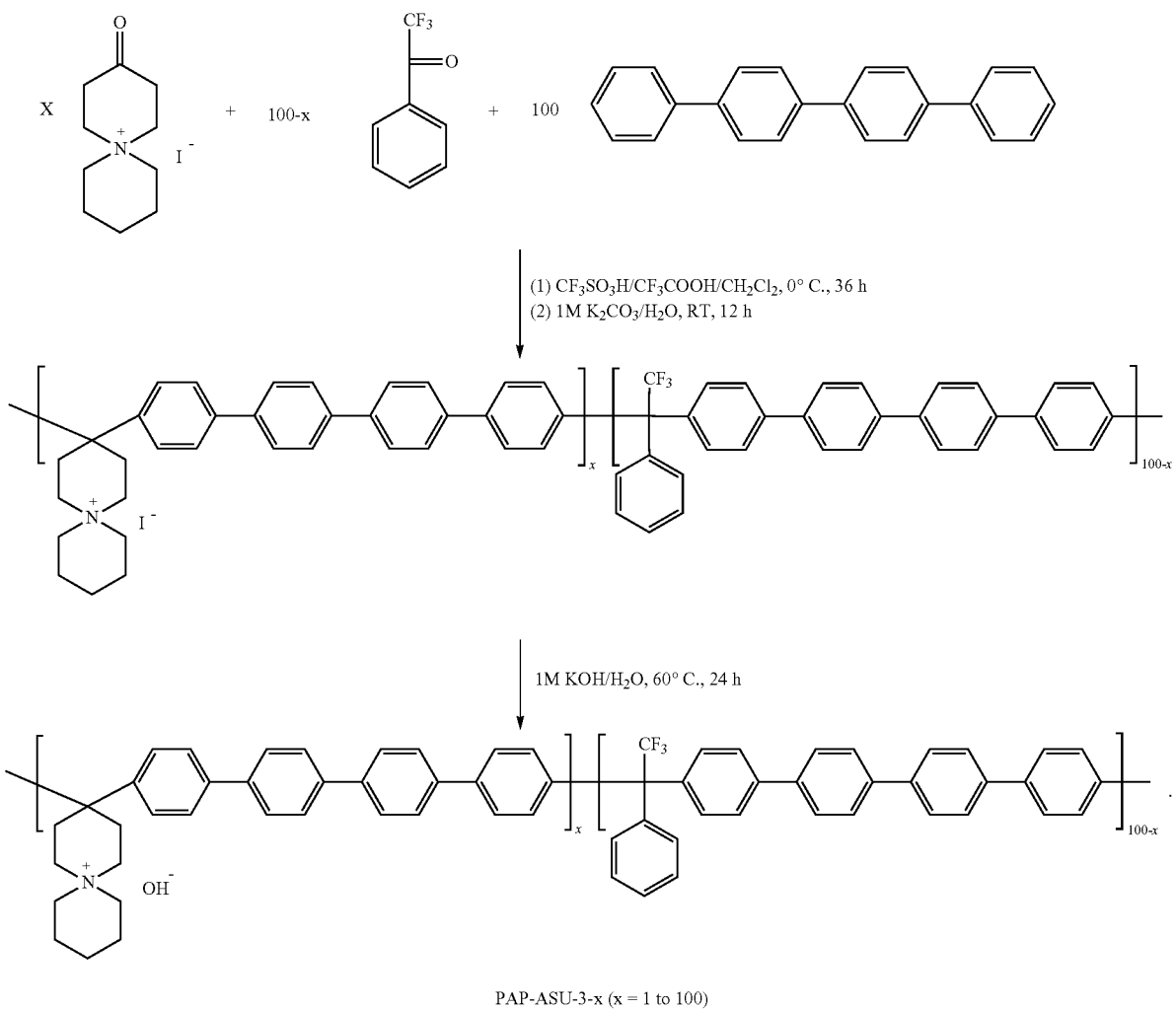
Example 8
Another poly(aryl piperidinium) polymer is based on 3-oxo-6-azoniaspiro[5.5]undecane iodide, 2,2,2-trifluoroacetophenone and benzene (PAP-ASU-4-x, wherein x is the mole ratio of 3-oxo-6-azoniaspiro[5.5]undecane iodide to 2,2,2-trifluoroacetophenone, x=1 to 100). The reaction scheme for the polymer synthesis is shown below:
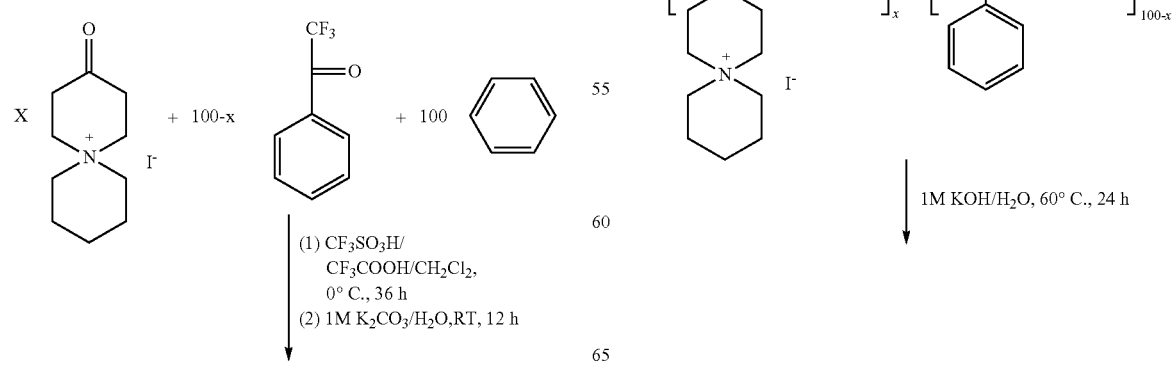

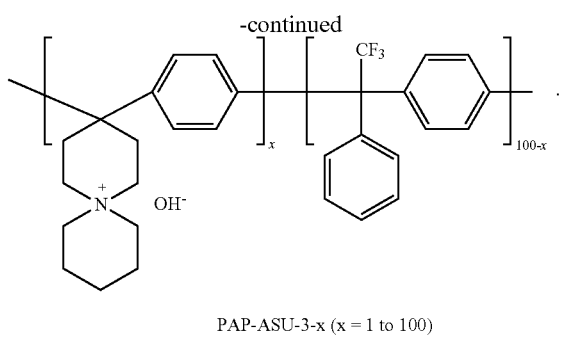

PAP-ASU-3-x (x = 1 to 100)

Example 9

A reinforced membrane was fabricated by the following procedure. First, 0.5 g PAP-2-85 polymer (prepared according to the method of Example 2) in iodine form was dissolved in 25 ml dimethylformamide solvent (DMF) to form a PAP solution. To improve the wettability of a 20 μm polyethylene (PE) substrate in DMF, the porous PE membrane was soaked in anhydrous ethanol for 24 h. Meanwhile, 20 ml of ethanol and 5 ml water were added into the PAP solution and stirred for 24 h to form a homogeneous solution. The homogeneous solution was casted onto the wetted PE membrane to prepare the reinforced membrane. The membrane was heated in an oven at 60° C. for 24 h to remove the solvent, and the resulting reinforced membrane was further dried in a vacuum at 80° C. for 12 h. The conversion from I⁻ form to OH⁻ form was achieved by leaving the membrane in 1 M KOH for 24 h at 60° C. The OH exchanged reinforced PAP/PE membrane was washed with DI water until pH of 7 was reached. The conductivity of the reinforced PAP/PE HEM is 20 mS/cm at 20° C. in DI water, with water content up is about 18%. The thickness of the reinforced PAP/PE HEM is about 30 μm.

Example 10

Another poly(aryl piperidinium) polymer is based on PAP-TP85 and long multi-cation quaternary ammonium side chain. Briefly, PAP-PMDA (also known as PAP-TQN) was prepared by three major steps: (1) Preparation of PAP-TP85 and multi-cation chain (PMDA, also known as DON), (2) quaternization of PAP with PMDA, and (3) membrane casting and hydroxide ion exchange. The reaction scheme for the polymer synthesis is shown below:

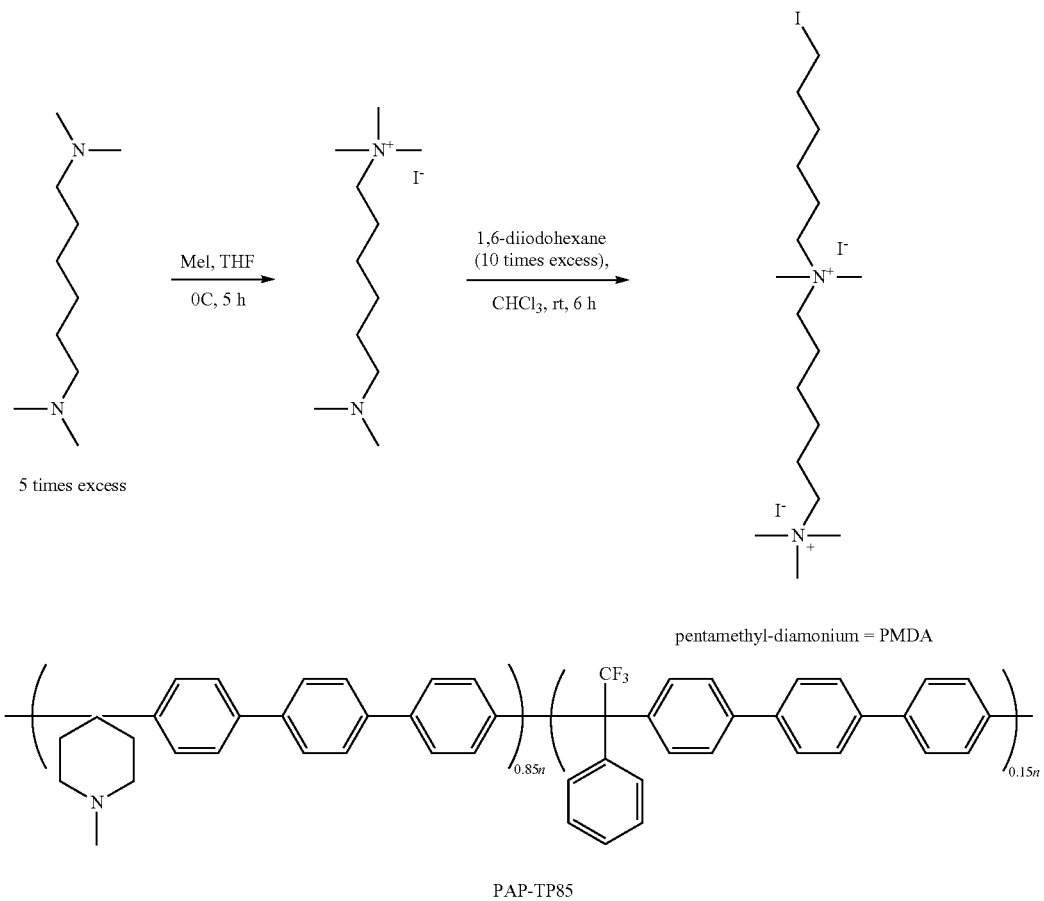

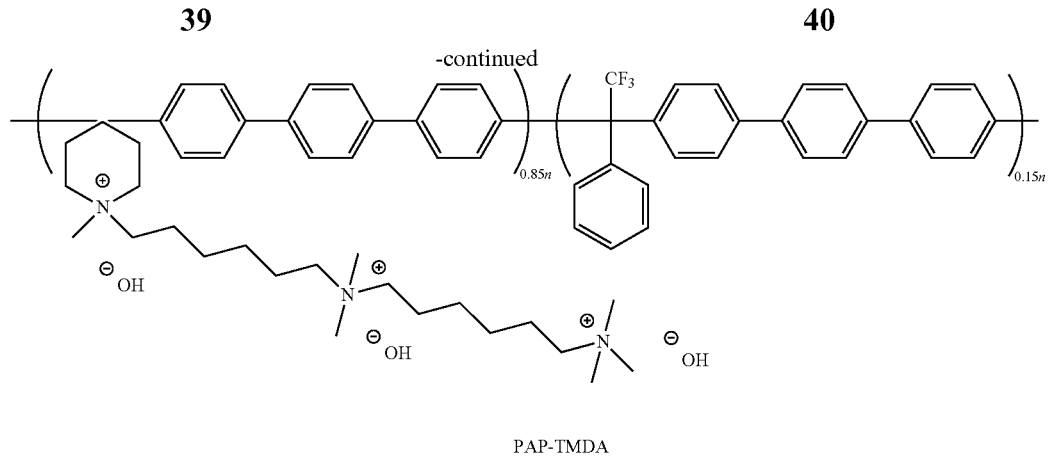

PAP-TMDA (1) Synthesis of Pentamethyl-Diammonium Side-Chain (PMDA).

To a mixture of N, N, N', N'-tetramethyl-1,6-hexadiamine (50 ml, 0.235 mmol) and THF (100 ml), a THF (20 ml) solution of MeI (2.9 ml, 0.047 mol) was added dropwise over 1 h at 0° C. with gentle stirring. Thereafter, the reaction was continued at this temperature for 16 h. The resulting slurry with white precipitate was filtrated and washed with cold THF. The N, N, N, N', N'-pentamethyl-1-amino-hexa-6-ammonium iodide was dried over vacuum and collected with 96% yield as white powder. 1H NMR (400 MHz, DMSO-d6): d=3.28-3.24 (2H, m, —CH2-N+—), 3.03 (9H, s, —N+—CH3), 2.18-2.16 (2H, t, —CH2-N—), 2.10 (6H, s, —N—CH3), 1.70-1.64 (2H, m, —CH2-), 1.43-1.38 (2H, m, —CH2-), and 1.37-1.22 ppm (4H, m, —CH2-).

A CHCl3 (80 ml) solution of N, N, N, N', N'-pentamethyl-1-amino-hexa-6-ammonium iodide (6.74 g, 0.021 mol) was added into a mixture of 1,6-diiodohexane (35 ml, 0.215 mol) and CHCl3 (160 ml) dropwise over 1 h at 0° C. Thereafter, the reaction was allowed to worm up to room temperature and continued for 16 h. The resulting slurry with white precipitate was filtrated and washed with THF. The final product was dried over vacuum and collected with 80% yield as white powder. 1H NMR (400 MHz, DMSO-d6): d=3.31-3.20 (8H, m, —CH2-N+—, —CH2-I), 3.06-3.01 (15H, m, —N+—CH3), 1.79-1.73 (2H, m, —CH2-), 1.72-1.61 (6H, m, —CH2-), and 1.45-1.25 ppm (8H, m, —CH2).

(2) Synthesis of PAP-TP85.

Figure 14:
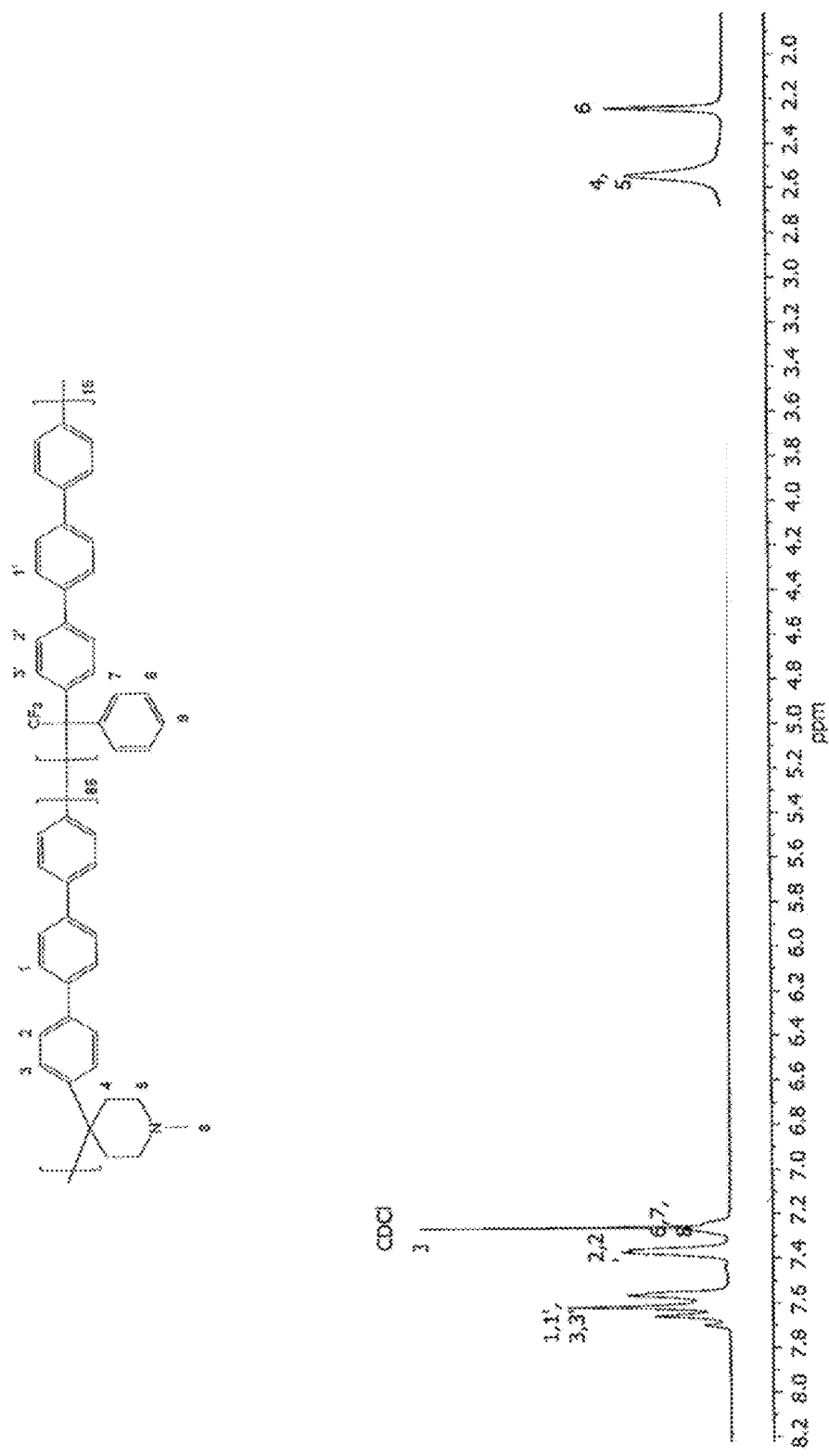
FIGS. 14-20 show an $^1$H NMR spectrum of a piperidinium-functionalized polymer PAP-2-85; a piperidinium-functionalized polymer PAP-2-75; N-decylbromo-4-piperidone in CDCl$_3$; PAP-decylBr polymer in CHCl$_3$; MQN-I; MQN-Br; and PAP-2-85-MQN-I, respectively.

To a 100 mL three-necked flask equipped with overhead mechanical stirrer, N-methyl-4-piperidone (0.9618 g, 8.5 mmol), 2,2,2-trifluoroacetophenone (0.2611 g, 1.5 mmol) and terphenyl (1.5421 g, 10 mmol) were dissolved into methylene chloride (10 mL). TFA (0.5 mL) and TFSA (10 mL) were then added dropwise over 30 min at 0° C. Thereafter, the reaction was continued at this temperature for 36 h. The resulting viscous, brown solution was poured slowly into ethanol. The white fibrous solid was filtered, washed with water and immersed in 1 M KOH at room temperature for 12 h. Finally, the white fibrous product was filtered, washed with water and dried completely at 60° C. under vacuum. The yield of the polymer was mostly 100%. 1H NMR (CDCl3, δ, ppm): 7.70-7.56 (H1, H1', H3' and H3'), 7.37-7.19 (H2, H2', H6, H7 and H8), 2.54 (H4 and H5), and 2.24 (H6) (FIG. 14).

(3) Synthesis of PAP-PMDA.

Figure 15:
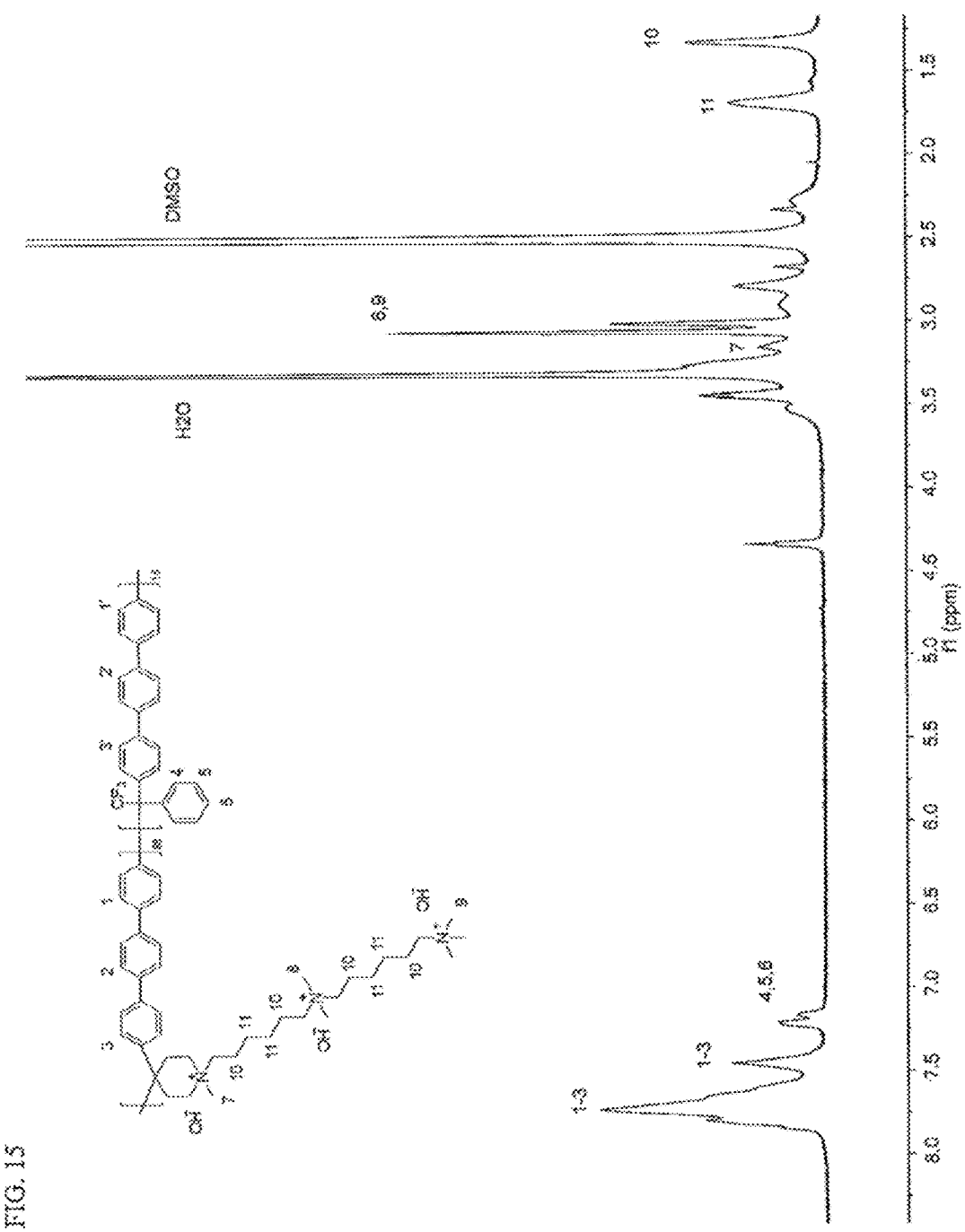

To a 50 mL one-necked flask equipped with magnetic bar, PAP-TP85 (3.3 g) was dissolved into DMSO (20 mL). PMDA (6.5 g) was added quickly. The solution was stirred over 12 h at room temperature. The resulting viscous, yellow solution was casted into membrane. The yellow membrane was washed with NaS2O2 (aq.) then ethanol and dried completely at 60° C. under vacuum. The yield of the polymer PAP-2-75 was almost 100%. 1H NMR (DMSO-d6, δ, ppm): 7.98-7.46 (H1, H1', H2, H2', H3 and H3'), 7.22-7.17 (H4, H5 and H6), 3.15 (H7), 3.07-3.01 (H8, H9), 1.34 (H10) and 1.68 (H11) (FIG. 15).

(4) PAP-PMDA Membrane Casting and Hydroxide Exchange.

Membrane was prepared by dissolving the PAP-2-85 polymer (1.0 g) in DMSO (30 ml) by casting on a clear glass plate at 80° C. for 8 h. The membrane (in iodide form) was peeled off from the glass plate in contact with deionized (DI) water. The membrane in hydroxide form were obtained by ion exchange in 1 M KOH at 60° C. for 24 h, followed by washing and immersion in DI water for 48 h under Ar to remove residual KOH.

Example 11

Another poly(aryl piperidinium) polymer is based on p-terphenyl and N-decylbromo-4-piperidone that is prepared in two steps from commercial available 1-Boc-4-piperidone. Briefly, PAP-decyl-ImOH will be prepared by three major steps: (1) synthesis of piperidine-functionalized polymers, (2) synthesis of piperidinium-functionalized polymers, and (3) membrane casting and hydroxide ion exchange. The reaction scheme for the polymer synthesis is shown below:

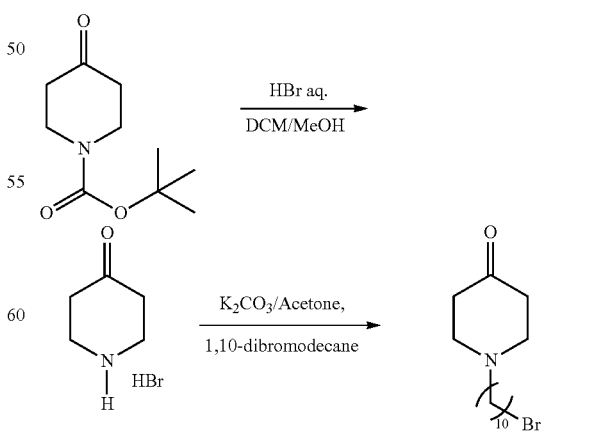

N-decylbromo-4-piperidone

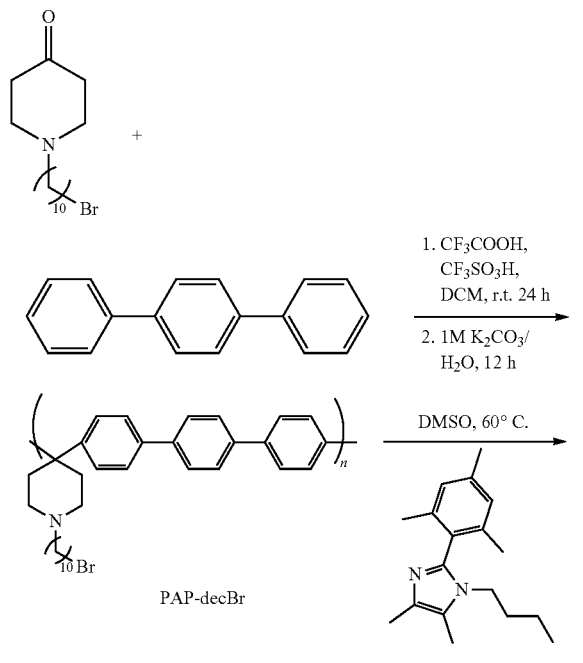
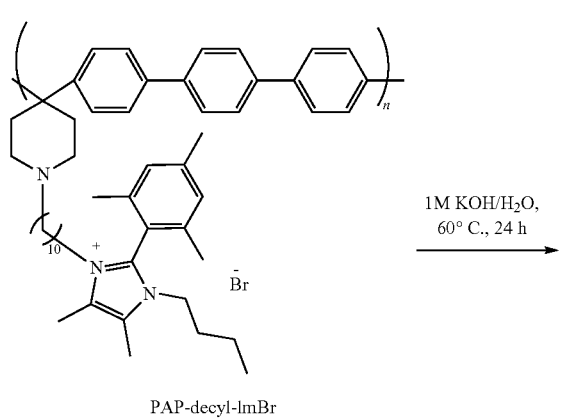
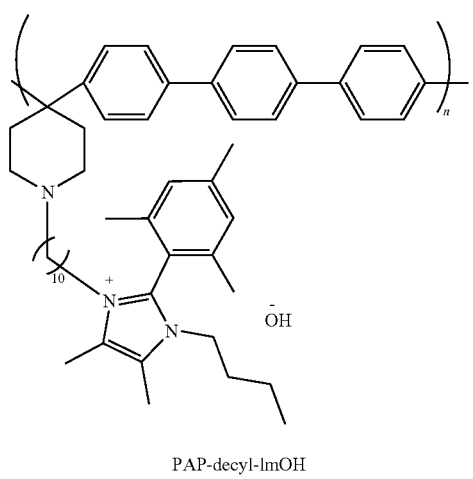

(1) Synthesis of 4-Piperidone Monohydrate Hydrobromide.

To a solution of 1-Boc-4-piperidone (24.4 g, 122.5 mmol) in 50 mL dichloromethane was added HBr (27 mL, 240 mmol) slowly over 30 min at 0° C., then the solution was stirred at r.t. overnight. The solvent was dried and the remaining solid was washed with dichloromethane, dried under high vacuum overnight to afford 20 g (90.9%) product. 1H NMR (D2O, δ, ppm): 3.15 (4H), 1.86 (4H).

(2) Synthesis of N-decylbromo-4-piperidone.

Figure 16:
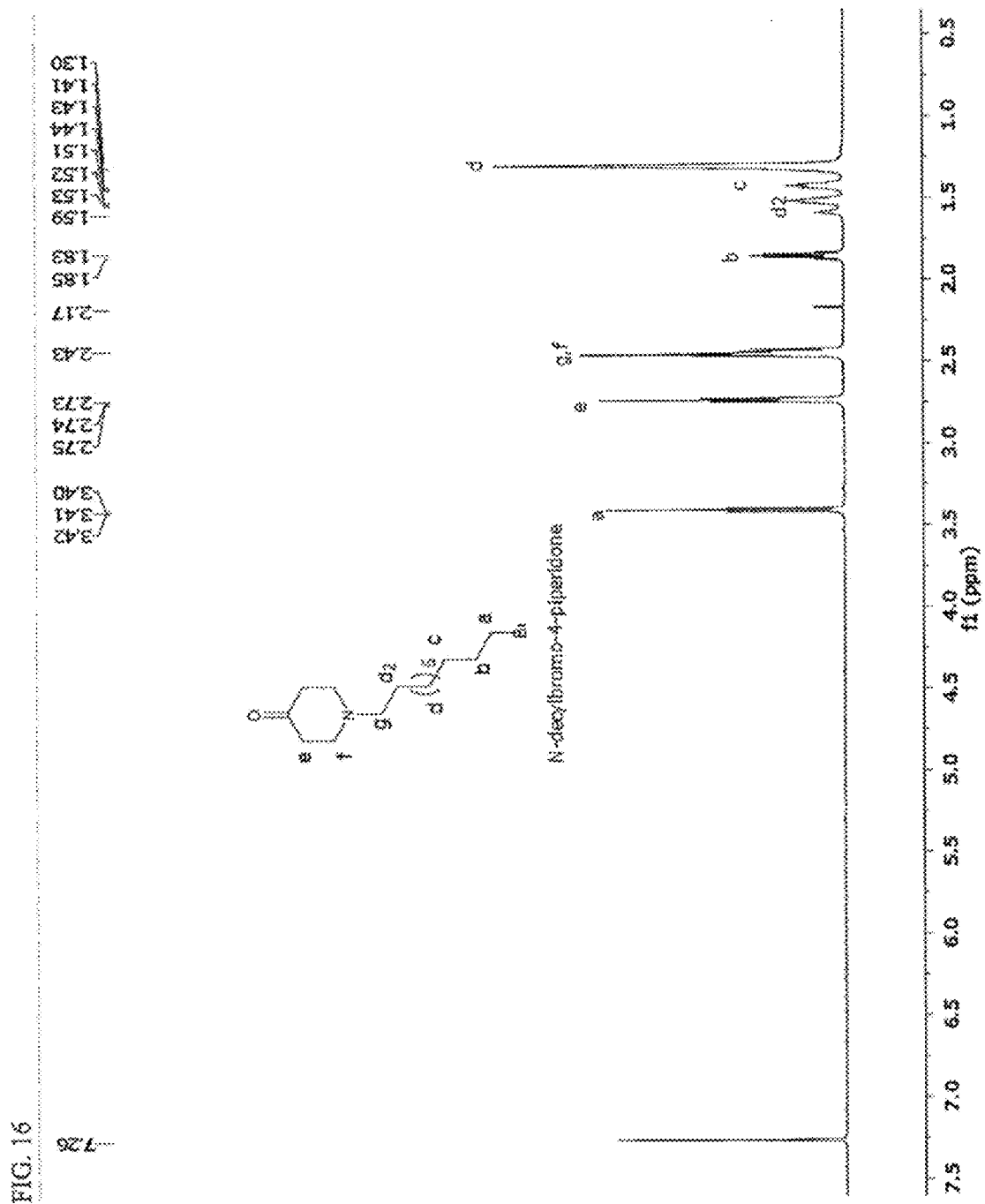

To a mixture of 4-Piperidone hydrobromide (5 g, 27.8 mmol), K2CO3 (7.7 g, 55.8 mmol) in acetone was added 1,10-dibromodecane (33 g, 110.0 mmol), and then the mixture was stirred at r.t. overnight. The solvent was removed and the residue was subjected to column chromatography to afford 5.0 g (56.5%) product. 1H NMR (CDCl3, δ, ppm): 3.41 (Ha, 2H), 2.74 (He, 4H), 2.47-2.43 (Hg and Hf, 6H), 1.85 (Hb, 2H), 1.51 (Hd2, 2H), 1.43 (Hc, 2H) and 1.30 (Hd, 10H) (FIG. 16).

(3) Synthesis of PAP-decylBr Polymer.

Figure 17:
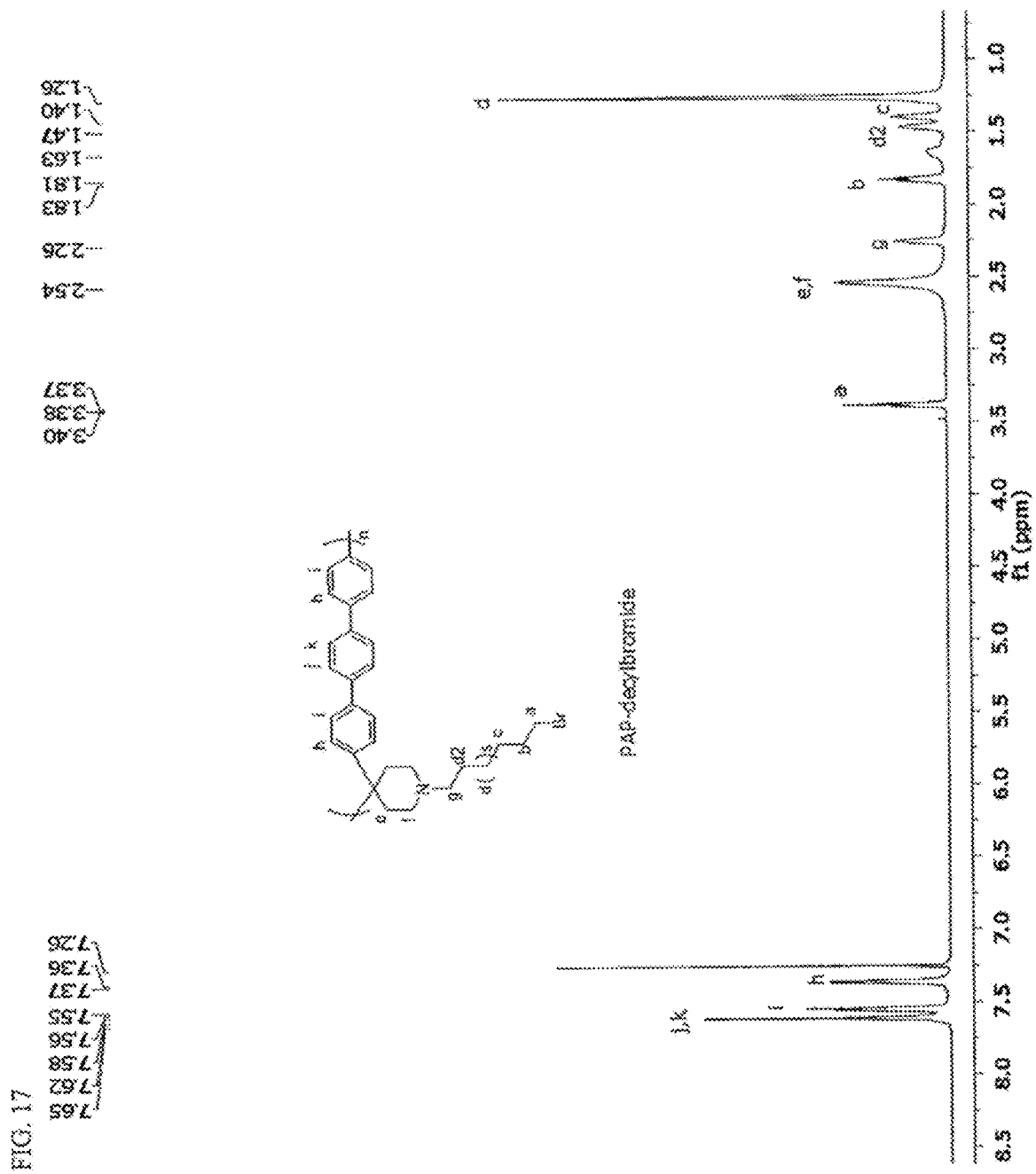

To a 100 mL three-necked flask equipped with overhead mechanical stirrer, N-decylbromo-4-piperidone (3.700 g, 11.62 mmol) and p-Terphenyl (2.677 g, 11.62 mmol) were dissolved into methylene chloride (14 mL). TFA (Trifluoroacetic acid) (0.7 mL) and TFSA (Trifluoromethane sulfonic acid) (14 mL) were then added dropwise over 30 min at 0° C. Then, the reaction was continued at this temperature for 36 h. The resulting viscous, brown solution was poured slowly into an aqueous solution of ethanol. The white fibrous solid was filtered, washed with water and immersed in 1 M K2CO3 at room temperature for 12 h. Finally, the white fibrous product was filtered, washed with water and dried completely at 60° C. under vacuum. The yield of the polymer was 96%. 1H NMR (CDCl3, δ, ppm): 7.65 (Hj and Hk), 7.55 (Hi), 7.37 (Hh), 3.38 (Ha), 2.54 (He and Hf), 2.26 (Hg), 1.82 (Hb), 1.47 (Hd2), 1.40 (Hc) and 1.26 (Hd) (FIG. 17).

(4) Synthesis of PAP-decyl-ImBr.

To a 50 mL one-necked flask equipped with magnetic bar, PAP-decBr will be dissolved into DMSO. 1-Butyl-2-mesityl-4,5-dimethyl-1H-imidazole-imidazole ("Imidazole-1") will be added quickly. The solution will be stirred over 24 h at 60° C. to yield PAP-decyl-ImBr.

(5) Synthesis of PAP-decyl-ImOH.

An aqueous solution of IM potassium hydroxide will be mixed with the PAP-decyl-ImBr stirred over 24 hr at 60° C. to yield PAP-decyl-ImOH. The resulting viscous PAP-decyl-ImOH solution will be casted into membrane. The membrane will be washed with NaS2O2 (aq.) then ethanol and dried completely at 60° C. under vacuum.

Example 12

Another poly(aryl piperidinium) polymer is based on N-decylbromo-4-piperidone, 2,2,2-trifluoroacetophenone and p-terphenyl (PAP-decyl-Im-x, x is the mole ratio of N-decylbromo-4-piperidone to 2,2,2-trifluoroacetophenone, x=1 to 100. The reaction scheme for the polymer synthesis is shown below:

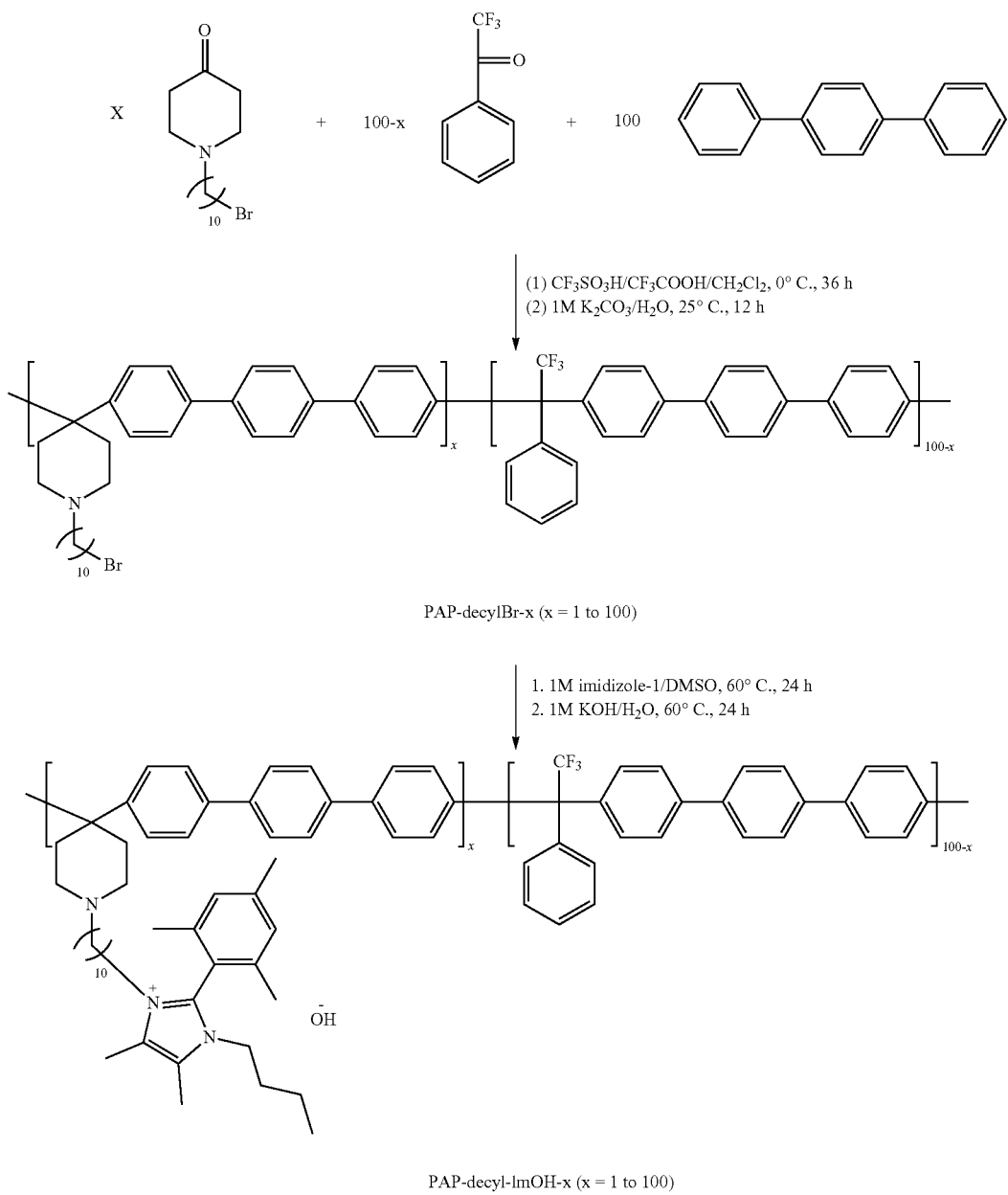

PAP-decylBr-x (x = 1 to 100)

PAP-decyl-ImOH-x (x = 1 to 100)

(1) Synthesis of Piperidine-Functionalized Polymer PAP-decylBr-80.

To a 100 mL three-necked flask equipped with overhead mechanical stirrer, N-decylbromo-4-piperidone (5.508 g, 17.37 mmol), 2,2,2-trifluoroacetophenone (0.7556 g, 4.34 mmol) and p-terphenyl (5.000 g, 21.71 mmol) were dissolved into methylene chloride (27 mL). TFA (1.15 ml) and TFSA (27 mL) were then added dropwise over 30 min at 0° C. Then, the reaction was continued at this temperature for 36 h. The resulting viscous, brown solution was poured slowly into an aqueous solution of ethanol. The white fibrous solid was filtered, washed with water and immersed in 1 M K2CO3 at room temperature for 12 h. Finally, the white fibrous product was filtered, washed with water and dried completely at 60° C. under vacuum. The yield of the polymer was 94%.

(2) Synthesis of PAP-decyl-ImBr-80.

To a 50 mL one-necked flask equipped with magnetic bar, PAP-decBr-80 will be dissolved into DMSO. 1-Butyl-2-mesityl-4,5-dimethyl-1H-imidazole-imidazole ("Imidazole-1") will be added quickly. The solution will be stirred over 24 h at 60° C. to yield PAP-decyl-ImBr-80.

(3) Synthesis of PAP-decyl-ImOH-80.

An aqueous solution of 1M potassium hydroxide will be mixed with the PAP-decyl-ImBr-80 and stirred over 24 hr at 60° C. to yield PAP-decyl-ImOH. The resulting viscous PAP-decyl-ImOH-80 solution will be casted into membrane. The membrane will be washed with NaS2O2 (aq.) then ethanol and dried completely at 60° C. under vacuum.

Example 13

Figure 20:
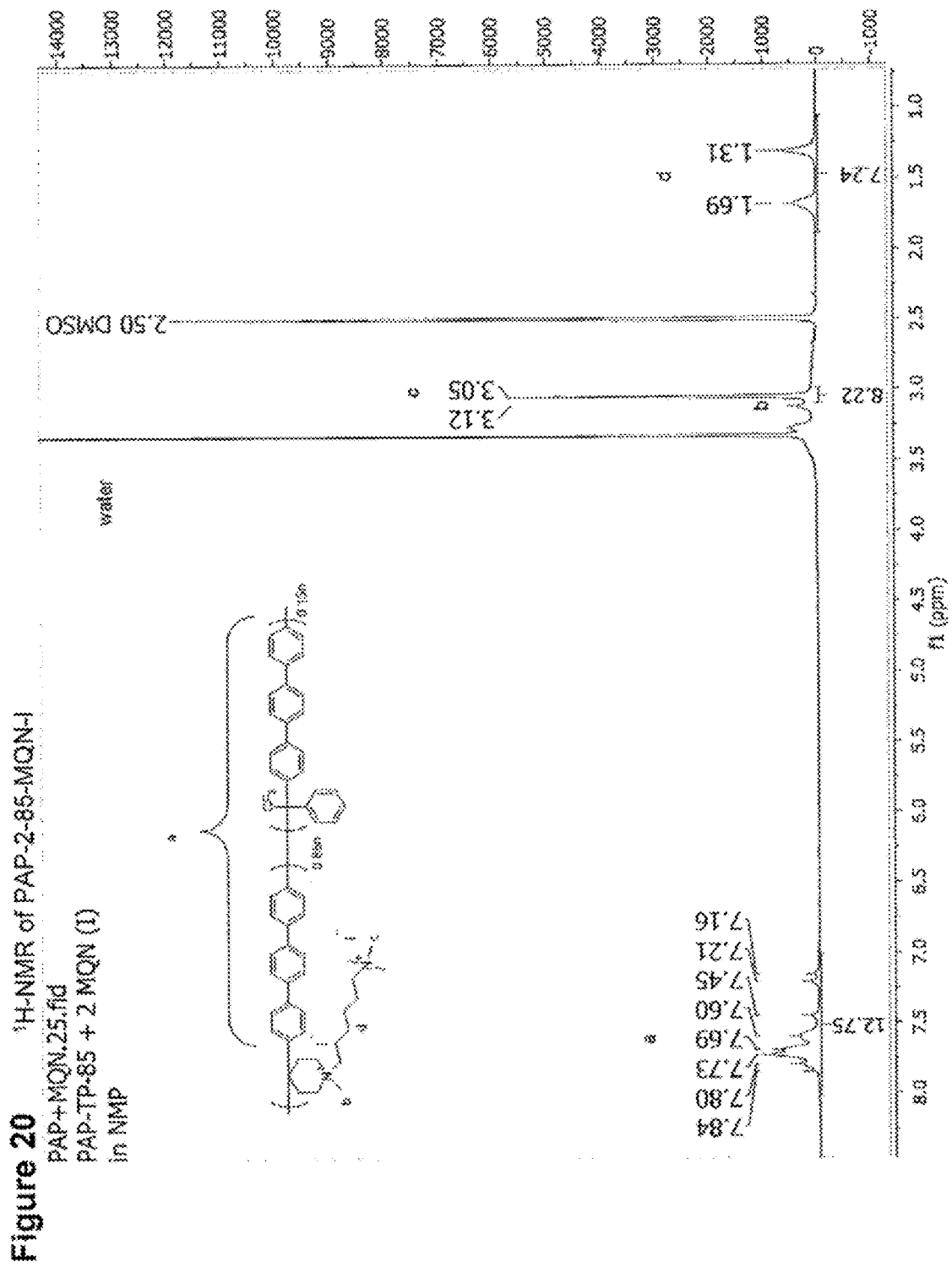

Another poly(aryl piperidinium) polymer is based on PAP-2-85 and a long multi-cation quaternary ammonium side chain. Briefly, PAP-MQN was prepared by three major steps: (1) Preparation of PAP-2-85 and multi-cation chain (MQN), (2) quaternization of PAP with MQN, and (3) membrane casting and hydroxide ion exchange. The reaction scheme for the polymer synthesis is shown below:

with 3×10 ml acetone and drying at 120° C. overnight to obtain the final PAP-2-85-MQN(I) polymer (2 g, 90% yield, 100% quaternization yield). 1H NMR (400 MHz, CDCl3) (FIG. 20), δ (ppm)=7.79-7.16 (Ar, 12.75H), 3.13, 3.06, 1.69, 1.31.

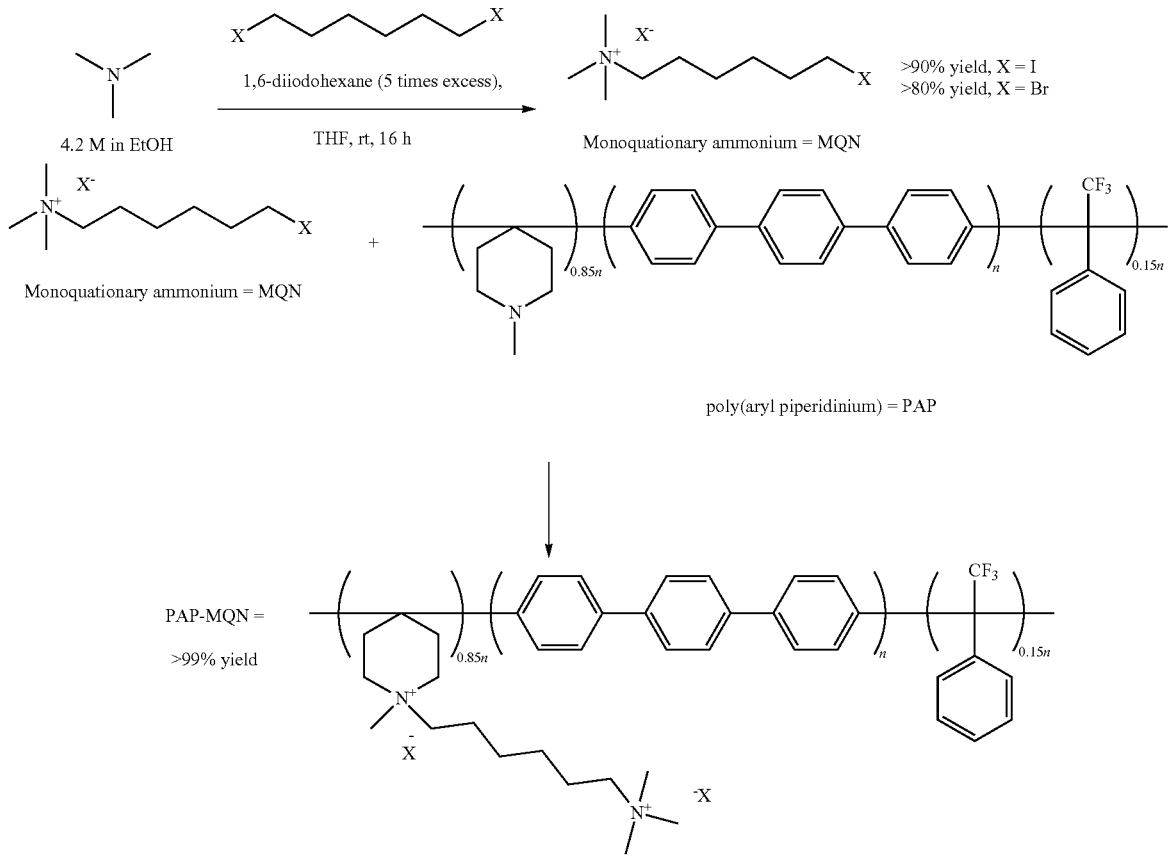

(1) Synthesis of MQN-I.

Figure 18:
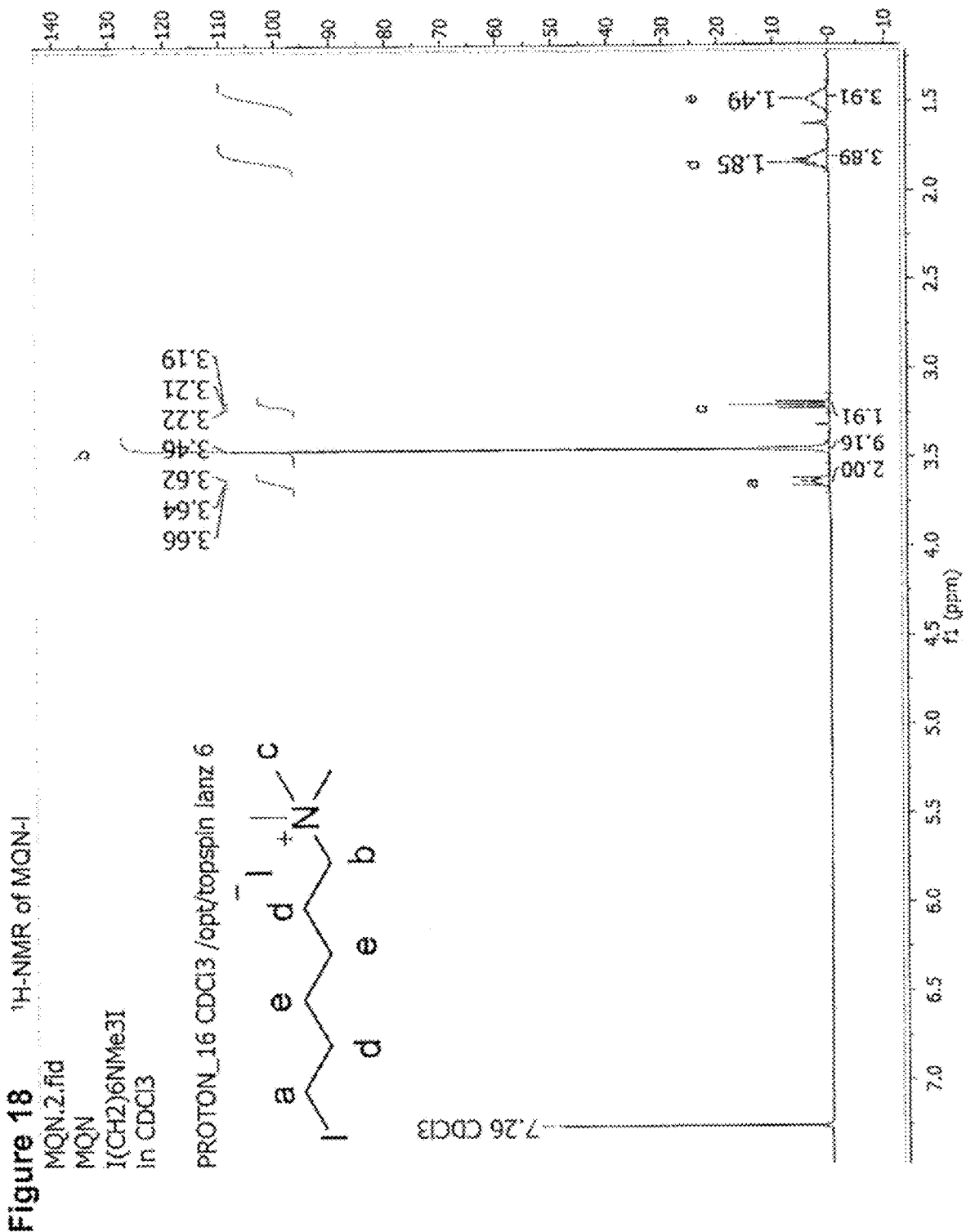

To a 200 ml THF solution of 1,6-diiodohexane (50 g, 0.15 mol, 5 eq.), a mixture of THF (100 ml) and trimethylamine solution in ethanol (7.1 ml, 4.2 M, 1 eq.) was added dropwise. The mixture was stirred for 16 h after the addition. A white solid was formed slowly. The white precipitate was filtered and washed with cold THF. MQN-1 (10.8 g, 90% yield) was obtained as a white or light yellow powder after dried over vacuum. 1H NMR (400 MHz, CDCl3) (FIG. 18), δ (ppm)=3.64 (m, 2H), 3.46 (s, 9H), 3.21 (t, J=6.8 Hz, 2H), 1.85 (m, 4H), 1.49 (m, 4H).

(2) Synthesis of MQN-Br.

Figure 19:
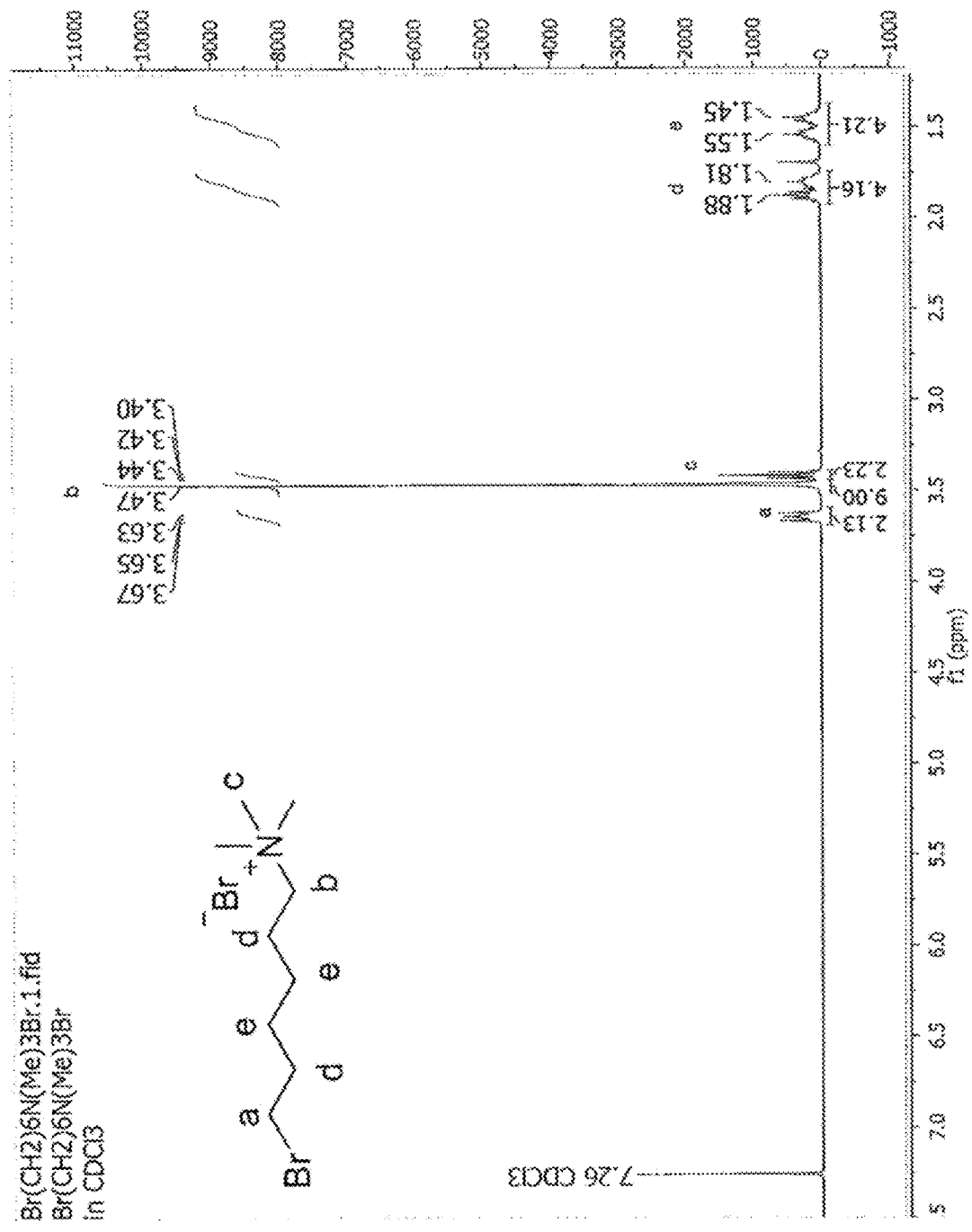

MQN-Br (7.3 g, 80% yield) was obtained by the same procedure described in (1) above except for substitution of 1,6-dibromohexane (36 g, 0.15 mol, 5 eq.) and trimethylamine ethanol solution (7.1 ml, 4.2 M, 1 eq.). 1H NMR (400 MHz, CDCl3) (FIG. 19), δ (ppm)=3.65 (m, 2H), 3.47 (s, 9H), 3.42 (t, J=6.6 Hz, 2H), 1.88 (m, 4H), 1.55 (m, 4H).

(3) Synthesis of PAP-2-85-MQN-I.

A mixture of 10 ml NMP, 1 g PAP-2-85-N polymer and 1.2 g MQN-1 (1.2 eq.) was stirred for 16 h at 100° C. The reaction mixture proceeded from a solid-liquid mixture to a clear yellow solution then to a dark red NMP solution with crude PAP-2-85-MQN(I) product as light yellow powder or small chunks. To the resulting dark red NMP solution slurry was added 10 ml acetone, followed by filtering, washing (4) Synthesis of PAP-2-85-MQN-Br.

PAP-2-85-MQN-Br was obtained by the same procedure described in (3) above except with substitution of 1 PAP-2-85-N polymer and 0.92 g MQN-Br (1.2 eq.). 1H NMR (400 MHz, CDCl3) (FIG. ???), δ (ppm)=7.79-7.15 (Ar, 12.75H), 3.12, 3.05, 1.67, 1.30.

(5) Membrane Casting.

2 g of PAP-2-85-MQN-Br was dissolved in 10 ml DMSO at 80° C. The yellow DMSO solution was filtered through a small piece of medical cotton. The filtered polymer solution was deposited on a clean glass plate and casted into a thin film with a Mayer bar. The film on the glass plate was immediately transferred into a 40° C. oven to remove most of the DMSO solvent for 4 h, following a 16 h annealing at 120° C. Afterwards, the glass plate with membrane film was placed into DI water to peel off the film. The final membrane was obtained after drying under ambient temperature and removing defected edges.

(6) Ion Exchange.

The membranes (Br form) were immersed into a 1 M NaHCO3 aqueous solution (2:30 eq. to repeating units) at 80° C. for 1 h. After each exchange, the NaHCO3 solution was replaced with fresh solution. This procedure was repeated 4 times and then the bromide/bromine concentration on the membrane was observed by X-ray fluorescence spectrometer (XRF) (typically less than 0.1 wt % bromide/ bromine remained). Hydroxide ion exchange can be done by the same method except substituting 1 M NaOH aqueous solution and repeating 5 times.

(7) Ionomer Preparation.

1 g of PAP-2-85-MQN-HCO3 was dissolved into a solvent mixture of 9.5 g D water and 9.5 g n-propanol. The ionomer was obtained by filtering the yellow solution through a small piece of medical cotton.

(8) Properties of PAP-2-85-MQN.

PAP-2-85-MQN has the formula and properties as shown below.

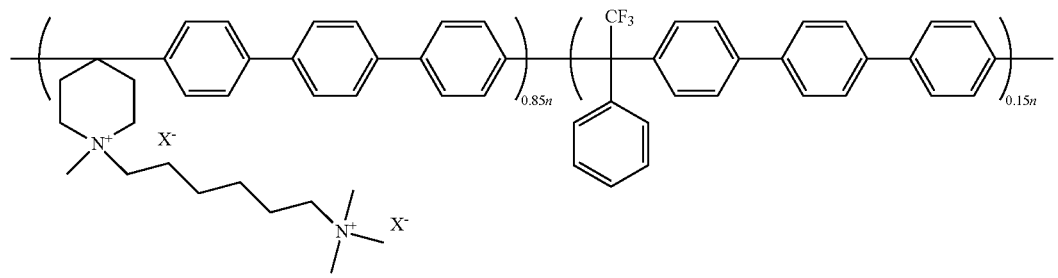

TABLE 1

Temperature dependent properties

| Temp. (° C.) | Conductivity (mS/cm) | Water uptake (wt %) | Swelling ratio (%) |
|---|---|---|---|
| 20 | 150 | 99.0 | 22.2 |
| 30 |  | 103.2 | 24.4 |
| 40 |  | 111.5 | 24.4 |
| 50 |  | 119.6 | 27.8 |
| 60 |  | 127.7 | 28.9 |
| 70 |  | 137.0 | 31.1 |
| 80 |  | 139.7 | 33.3 |
| 90 |  | 145.3 | 35.6 |
| 95 |  | 187.0 | 38.9 |

Figure 21:
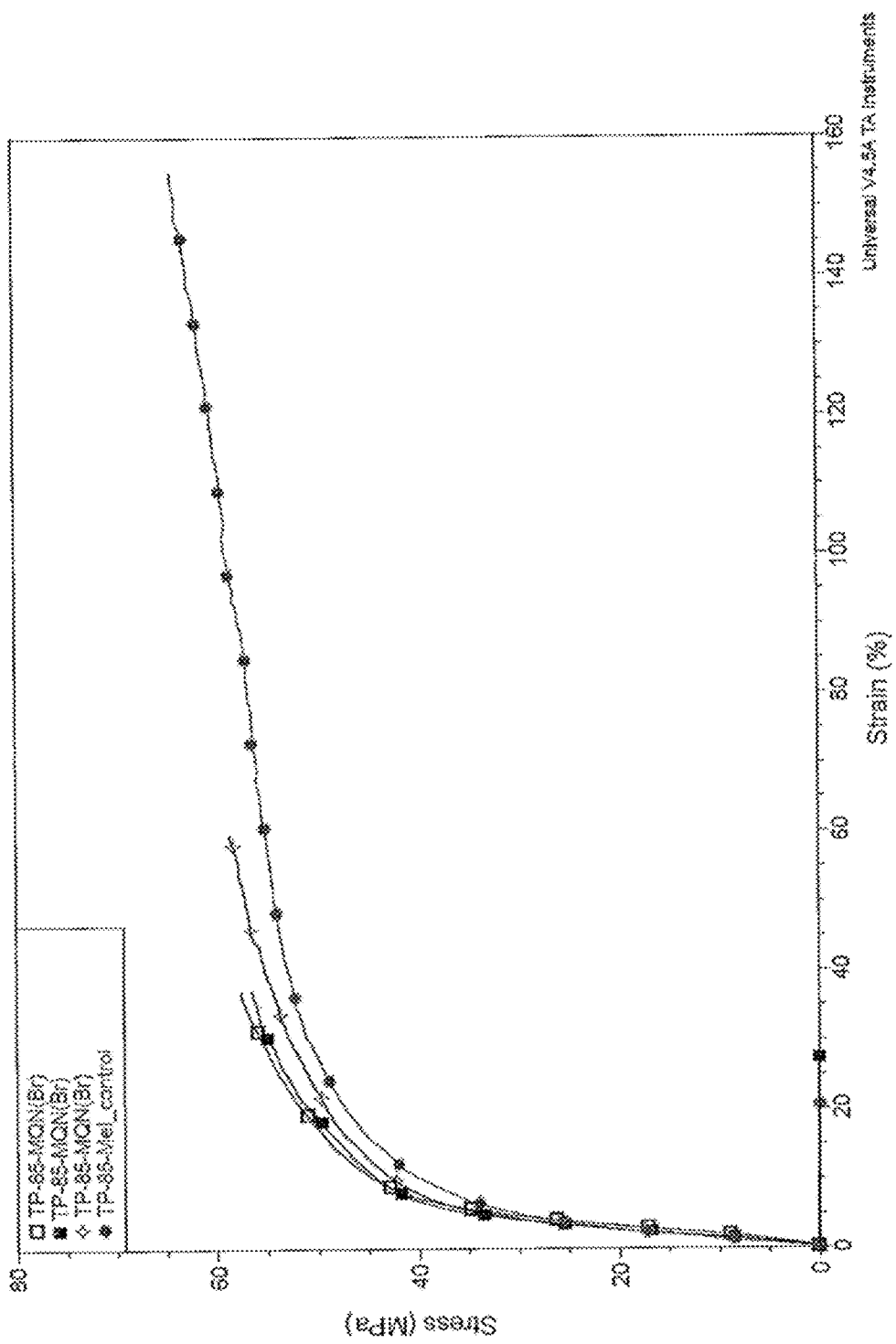
FIG. 21 depicts a stress-strain test for PAP-2-85-MQN-HCO3.
Figure 22:
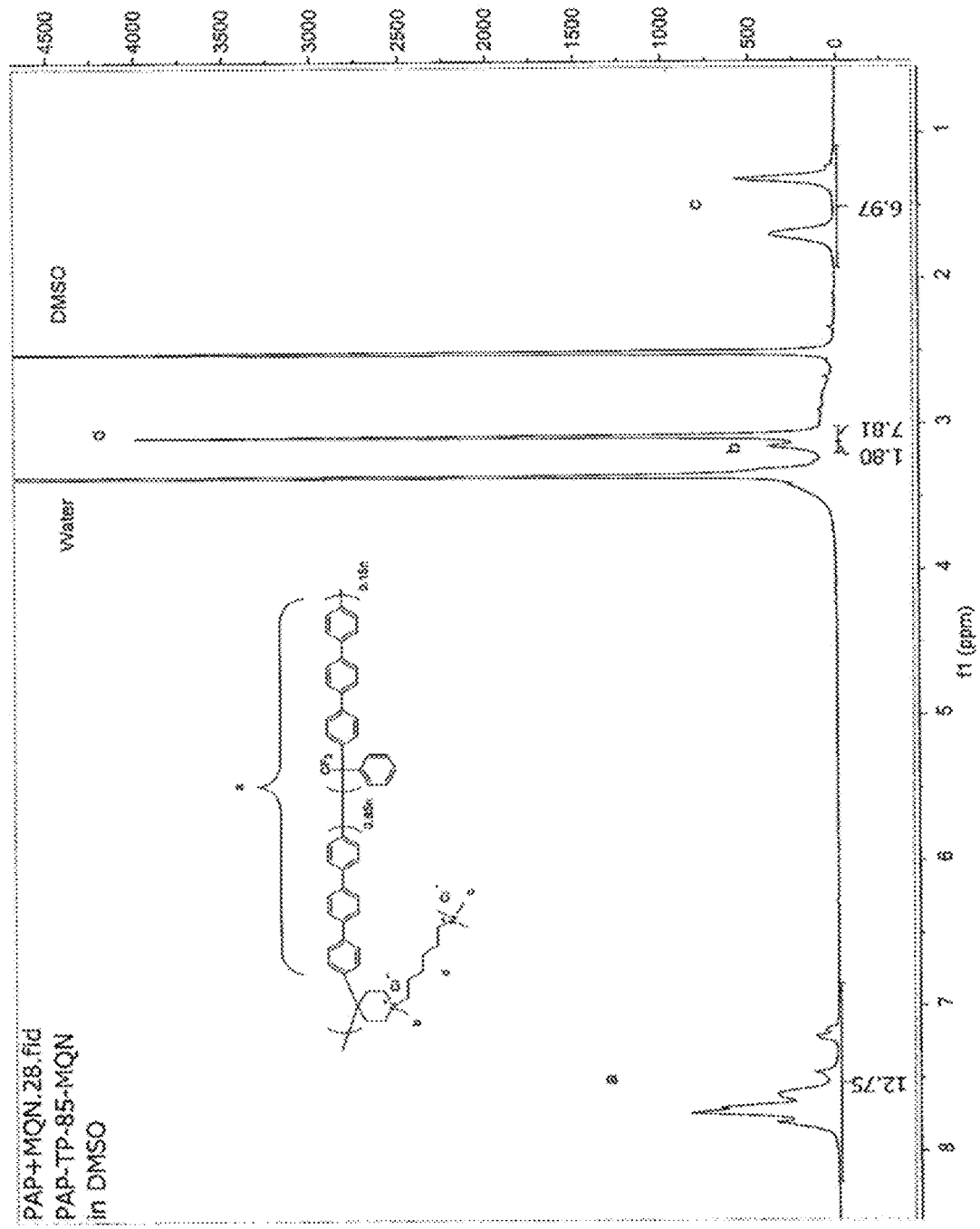
FIGS. 22-25 show an 1H NMR spectrum of PAP-2-85-MQN-Cl before alkaline test, after 120 h alkaline test, after 240 h alkaline test, and after 720 h alkaline test, respectively.

* X— = OH—
Mechanical property: Strain at break = 40% (elongation), Stress at break = 60 MPa (FIG. 21; X— = HCO3—, room temperature, average number)
IEC (ion exchange capacity) = 3.1 mmol/g (X— = Cl—, theoretical)
IEC (ion exchange capacity) = 2.9 mmol/g (X— = Cl—, measured)
Crystallinity: none (will be measured again by wide angle x-ray scattering)

Example 14: Alkaline Stability Test

Methods.

In a Parr bomb with PTFE liner (Parr Instrument Company, Model 4744 General Purpose Acid Digestion Vessel, 45 mL) was charged 40 ml 1 M KOH aqueous solution (40 mmol OH−) and 450 mg of PAP-2-85-MQN (HCO3) membranes (1.36 mmol N+) to ensure no change of OH− concentration due to water evaporation or OH− consumption (membrane degradation). The Parr bomb was then sealed and heated to 90° C. A piece of membrane (>60 mg) was taken after 120 h, 240 h and 720 h at 90° C. A small portion of each membrane (~10 mg) was treated with 0.1 M HCl aqueous solution for more than 30 min and then washed repeatedly with DI water. After washing, the small membranes (Cl— form) were dried and dissolved in DMSO-d6 for 1H-NMR measurements (see FIGS. 22-26). The larger portion of the membranes (~50 mg) were ion-exchanged with 20 ml 1 M NaCl aqueous solution at 80° C. five times and then washed with DI water repeatedly to prevent contamination of free Cl— ions (after-washing water was detected by AgNO3). The larger membranes were then dried and weighed for titration. The Cl— titration was done by auto-titrator (Hanna Instruments, HI 901 Color) with 0.02 M AgNO3 aqueous solution (Hanna Instruments, HI 70448).

Results.

NMR results showed no degradation after 240 h in 1 M KOH (aq.) at 90° C. and very little change after 720 h. The Cl— titrations showed no change of all samples before (IEC=2.9 mmol/g, Cl— form) and after (IEC=2.9 mmol/g, Cl— form) the alkaline test. The degradation after 120 h was due to Hofmann elimination with unquenched OH− during the drying process. The unexpected result provided an excellent example to study decompose mechanisms.

Discussion.

Figure 23:
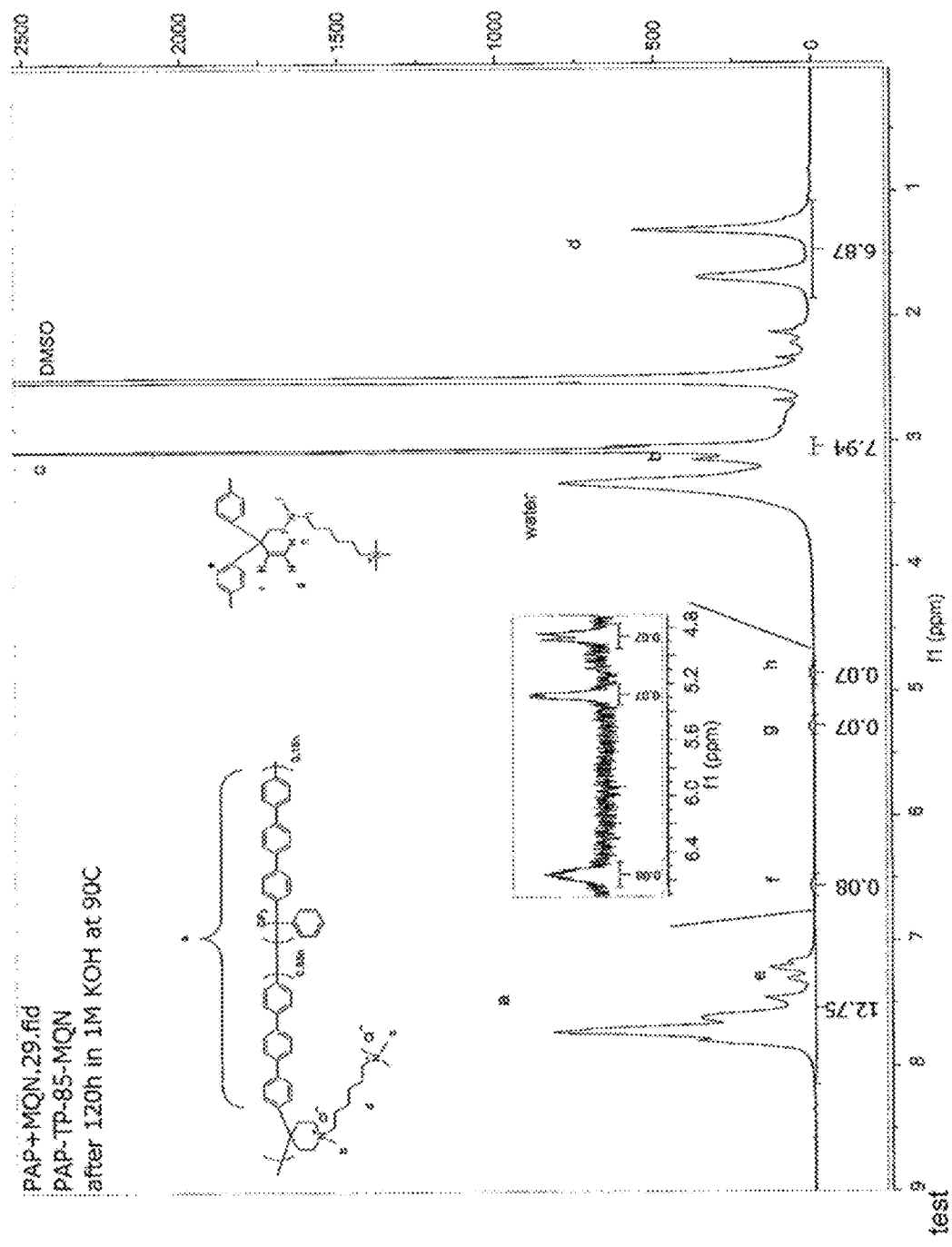
Figure 24:
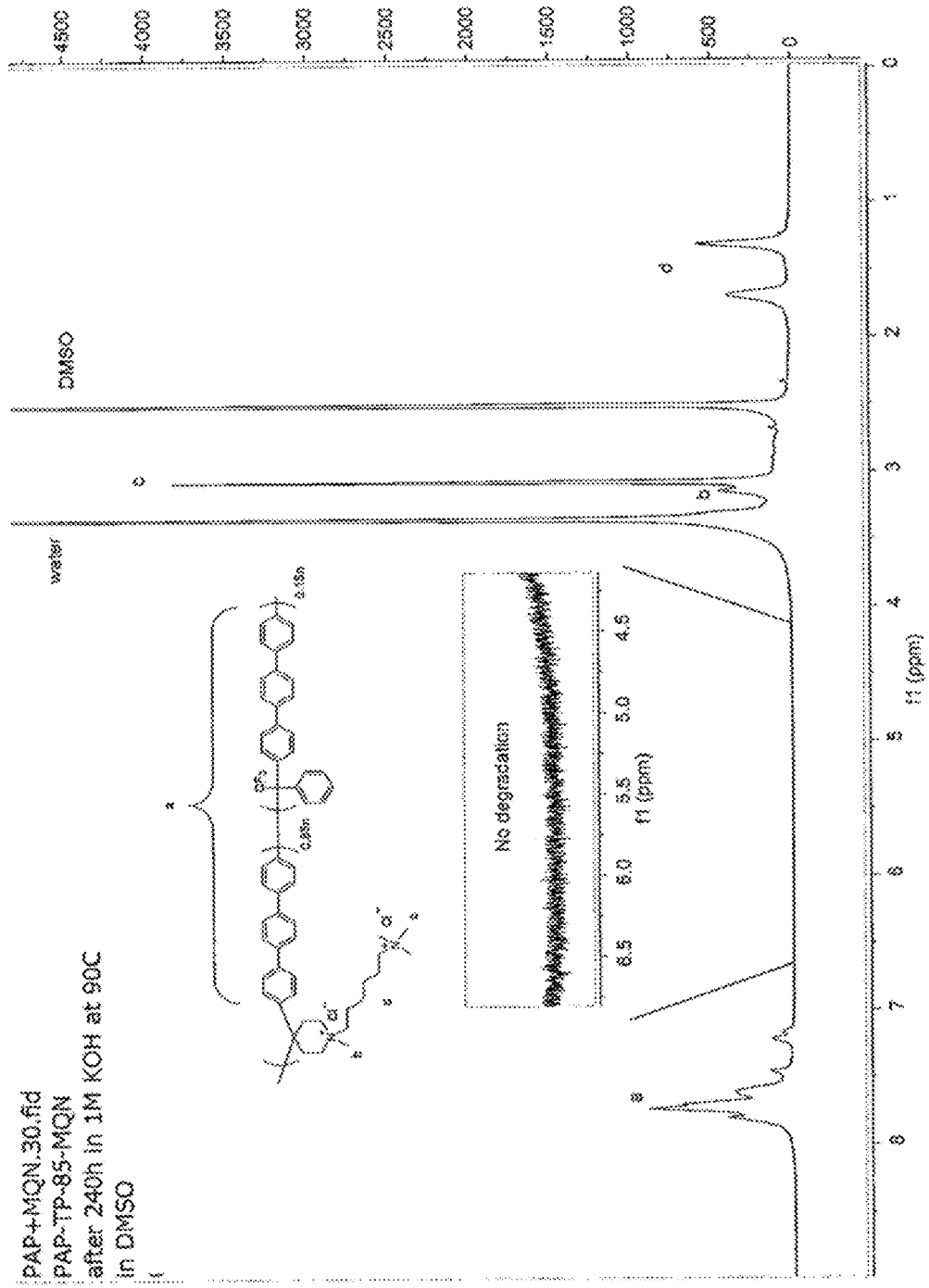
Figure 25:
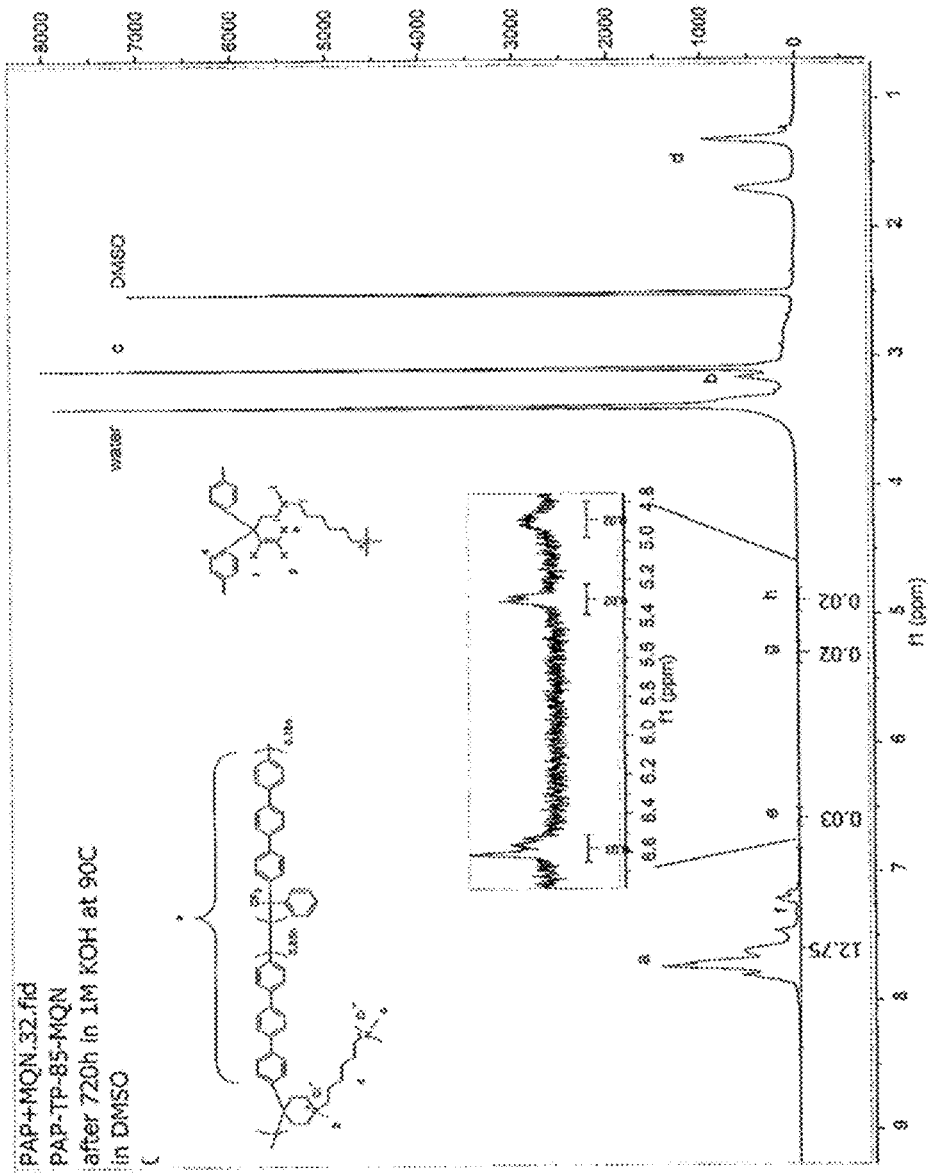
Figure 26:
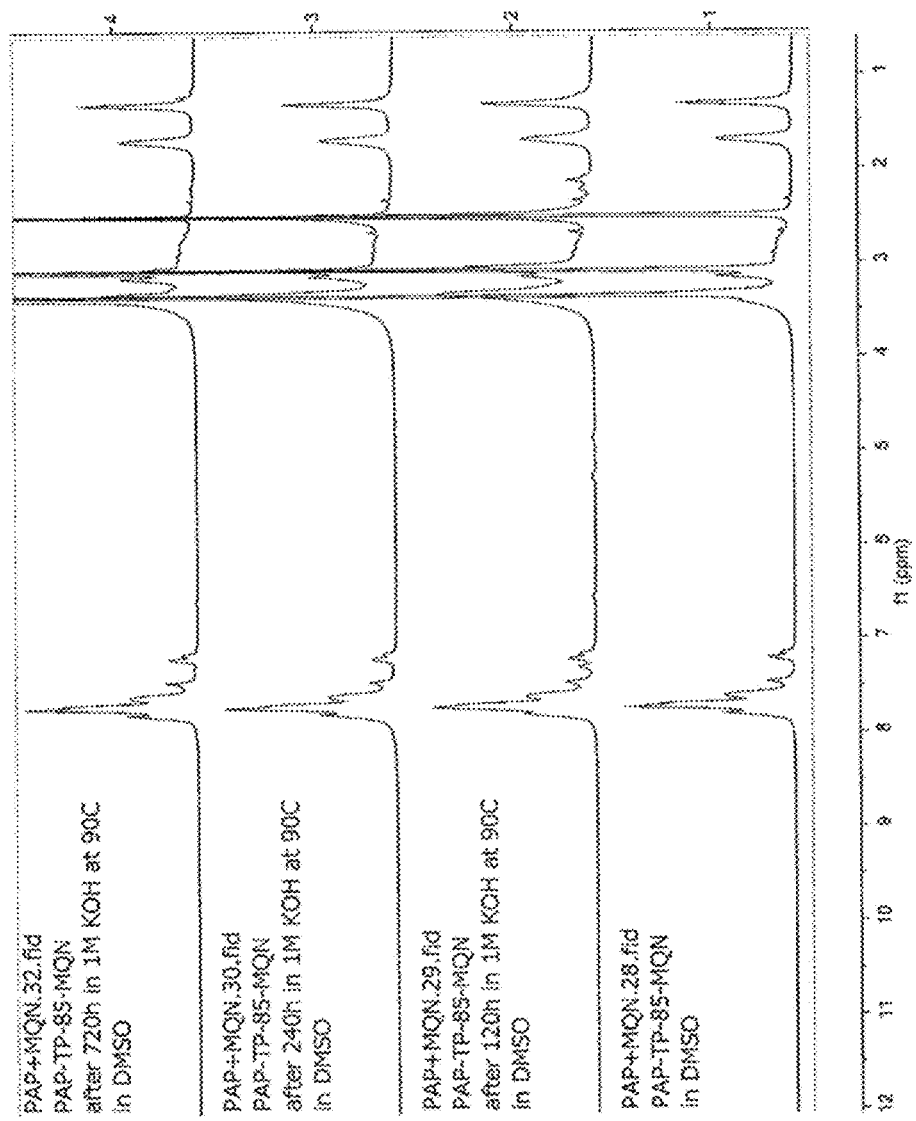
FIG. 26 depicts a comparison of the 1H NMR spectrum of a PAP-2-85-MQN-Cl over time.
Figure 27:
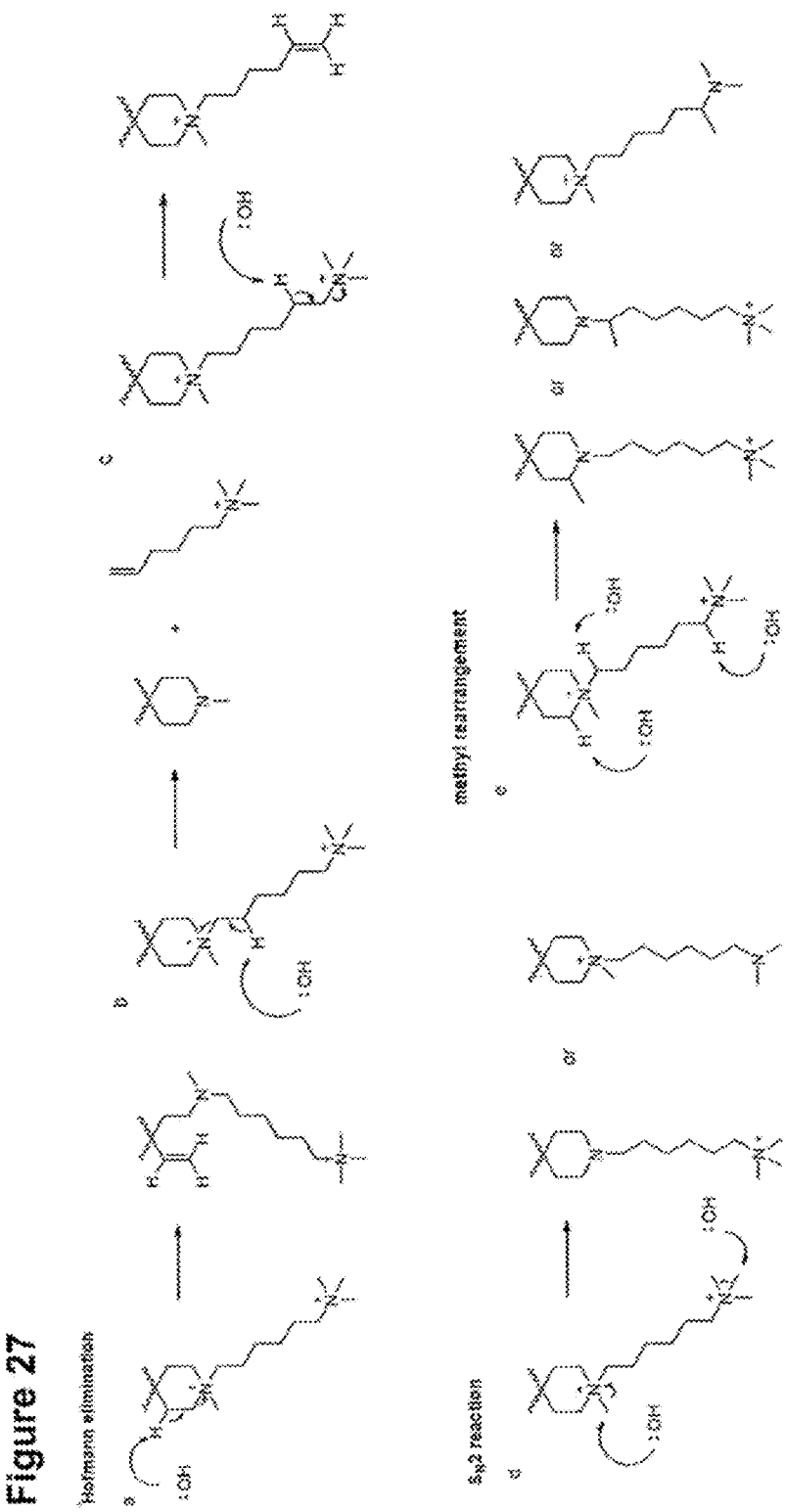
FIG. 27 is a scheme of possible decomposition pathways for PAP-2-85-MQN-Cl.

No IEC loss was detected by Cl— titration, but 1H-NMR measurement revealed some degradation. FIG. 27 shows some possible decomposition paths. The Hofmann elimination on the piperidium ring (scheme a of FIG. 27) was observed by 1H-NMR as shown in FIGS. 23 and 25 (terminal alkene signals at 6.6, 5.3, 4.9 ppm, new aryl signal at 7.3 ppm and new aliphatic signals at 2.2, 2.1 ppm). Evidence of Hofmann eliminations on the aliphatic chain (Scheme b and c of FIG. 27) were not found on NMR spectra. The SN2 reactions of nucleophilic attachment by OH− on ammonium methyl (Scheme d of FIG. 27) were neither thermodynamically favorable nor observed by NMR. Similarly, the α-H eliminations followed by methyl rearrangements were unlikely (Scheme e of FIG. 27) and did not show on 1H-NMR spectra.

The preference of Hofmann elimination on the piperidium ring over the aliphatic chain is unclear as of yet. The degradation only resulted in neutralization of piperidium ammonium and ring-opening instead of chain cleavage. Thus each elimination only caused half the IEC loss. For example, as shown in FIG. 25, the sample has about 2.3% (0.02/0.85=0.023) piperidium ring undergo Hofmann elimination after 720 h alkaline test with no other degradation detected. Therefore, the sample only suffered about 1.15% IEC loss as the terminal ammoniums remained intact.

In conclusion, the alkaline stability test has shown performance far exceeded the milestone requirement with less than 2% IEC loss in 1 M KOH (aq.) at 90° C. for 720 h based on 1H-NMR.

Example 15

Synthesis of PAP-TP70-NH.

Figure 28:
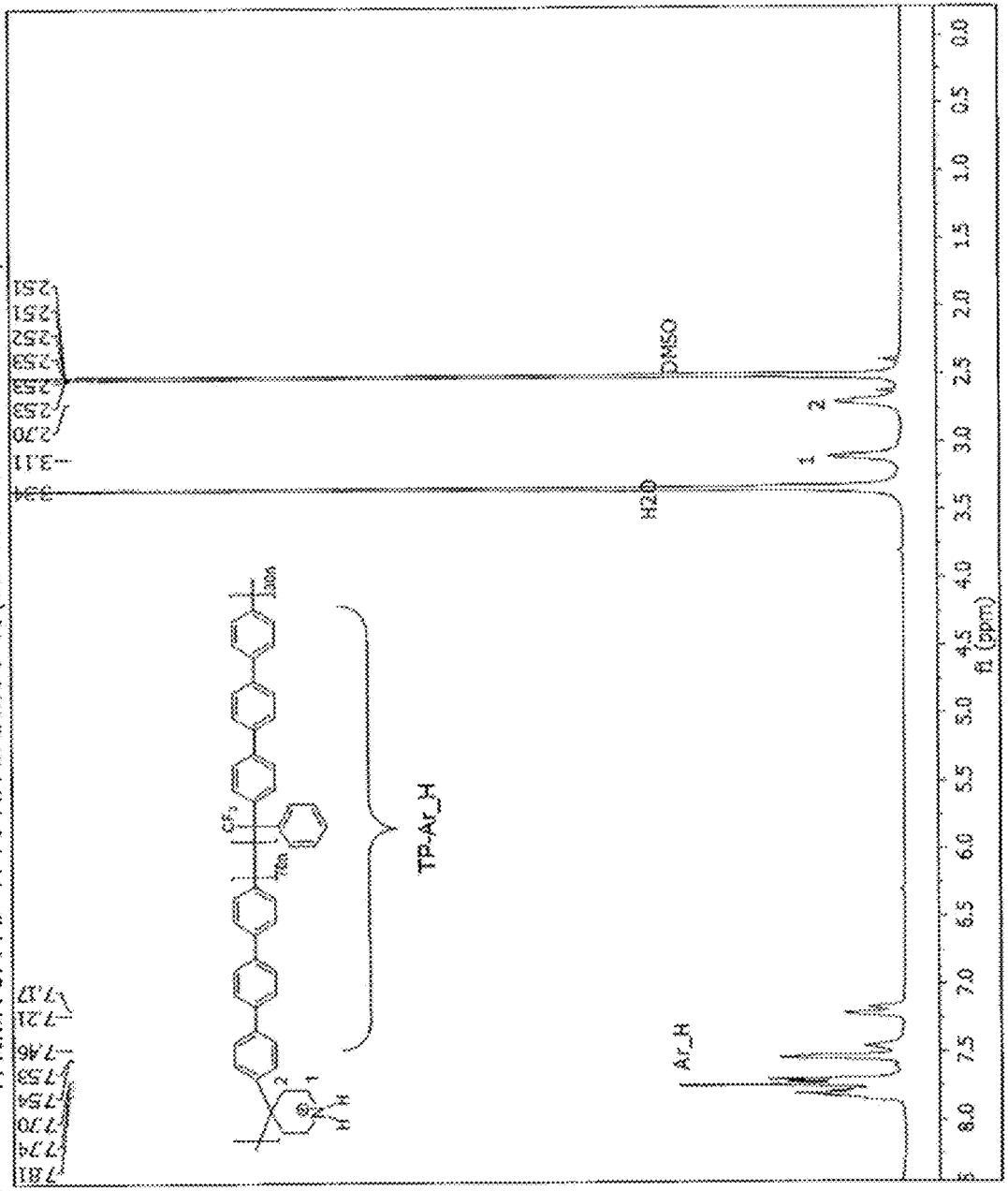

A mixture of 4-piperidone monohydrate hydrochloride (8.2 g, 53.5 mmol), trifluoroacetophenone (4.0 g, 22.9 mmol), p-terphenyl (17.6 g, 76.4 mmol), methylene chloride (75 mL) and trifluoromethanesulfonic acid (75 mL) was stirred at 0° C. for 24 hours. The resulting highly viscous reaction mixture was diluted with methylene chloride, and then the mixture was poured slowly into ethanol to obtain a yellow polymer fiber. The polymer fiber was washed thoroughly with alkaline solution and water, and finally dried under vacuum to obtain PAP-TP70-NH (22.7 g, 91.9%). 1H NMR (600 MHz, DMSO) δ (ppm): 7.81-7.17 (m, 19.4H), 3.11 (s, 4H), 2.70 (s, 4H). (see FIG. 28). The reaction scheme is shown in the first reaction below. Synthesis of PAP-TP85-NH was completed using similar procedures.
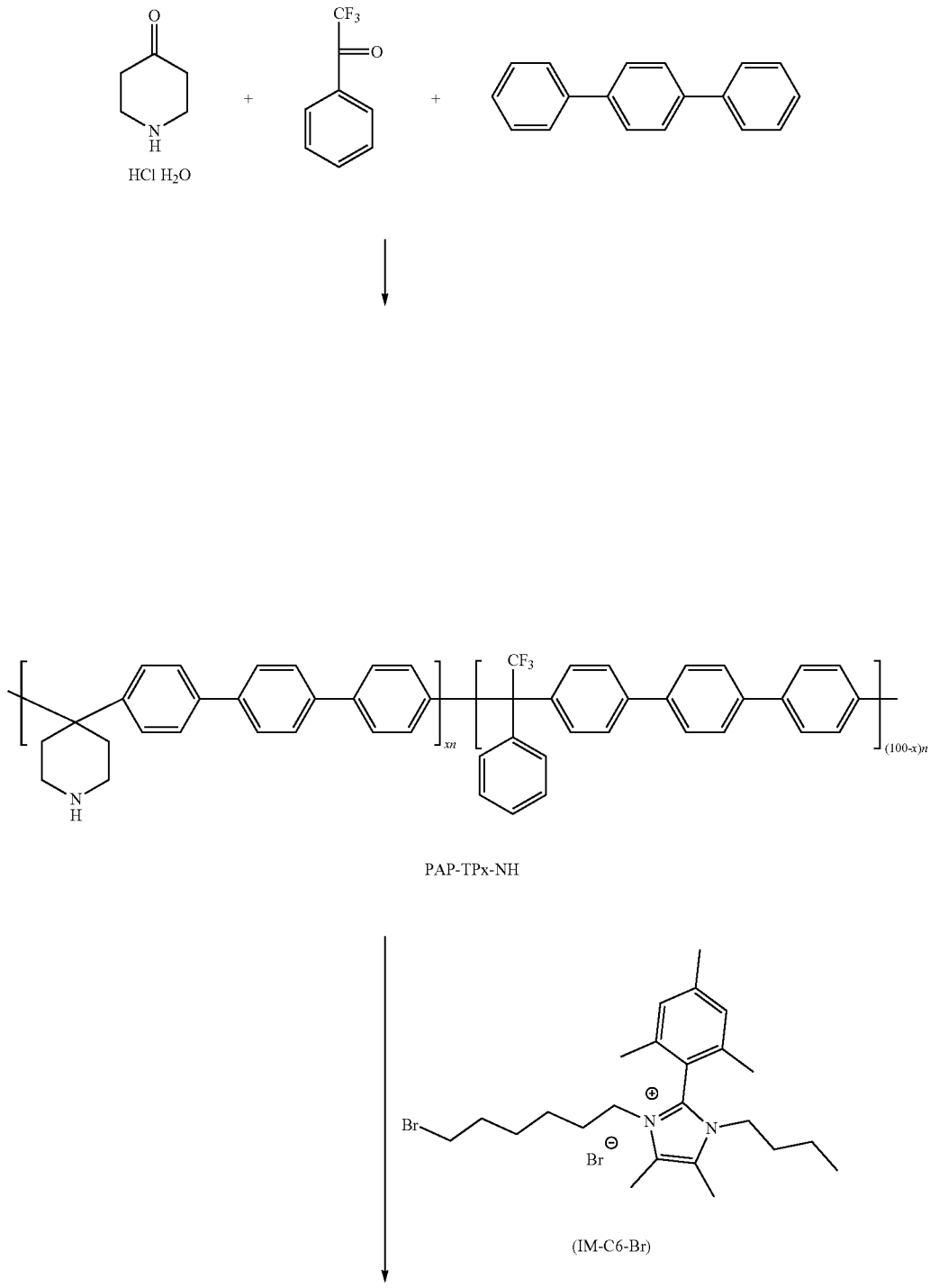

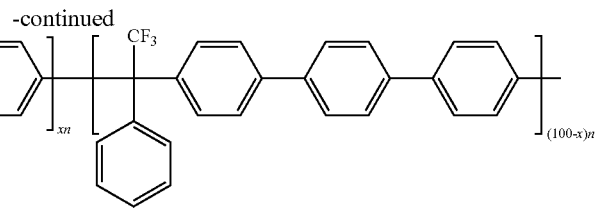
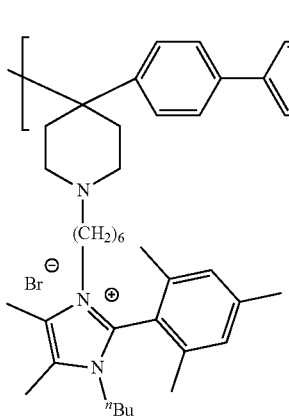

x= 70, PAP-TP70-C$_6$-IM x= 85, PAP-TP85-C$_6$-IM

Synthesis of PAP TP70-C6-IM.

A mixture of PAP-TP70-NH (5.0 g, 15.0 mmol), K2CO3 (6.3 g, 45.5 mmol), and IM-C6-Br (8.5 g, 16.5 mmol) was stirred in NMP for 24 hours. The viscous solution was precipitated slowly to ethylacetate, and the resulting solid was dried under vacuum for 24 hours to afford PAP TP7-C6-IM (5.1 g, 40.1%). 1H NMR (600 MHz, DMSO) δ (ppm): 7.79-7.16 (m, 23.9H, the aromatic protons), 3.74 (s, 4H), 2.36-2.32 (m, 12H), 1.98 (s, 6H), 1.42 (m, 4H), 1.15-1.13 (m, 8H), 0.73 (t, 3H, J3HH=6.0 Hz). (FIG. 29). The reaction scheme is shown above.

Synthesis of PAP-TP85-C6-IM.

Synthesis of PAP-TP85-C6-IM has similar procedures as the synthesis of PAP-TP70-C6-IM. 1H NMR (600 MHz, DMSO) δ (ppm): 7.80-7.17 (m, 17.2H, the aromatic protons), 3.75 (s, 4H), 2.36-2.33 (m, 12H), 1.99 (s, 6H), 1.42 (m, 4H), 1.26-1.13 (m, 8H), 0.73 (t, 3H, J3HH=6.0 Hz). (see FIG. 30).

Synthesis of PAP-TP85-C10-IM.

Synthesis of PAP-TP85-C10-IM has similar procedures as the synthesis of PAP-TP70-C6-IM. The reaction scheme is shown below.

Synthesis of PAP-TP70-IM.

Synthesis of PAP-TP70-IM had similar procedures as the synthesis of PAP-TP70-C6-IM.

Synthesis of PAP-TP85-C10-IM

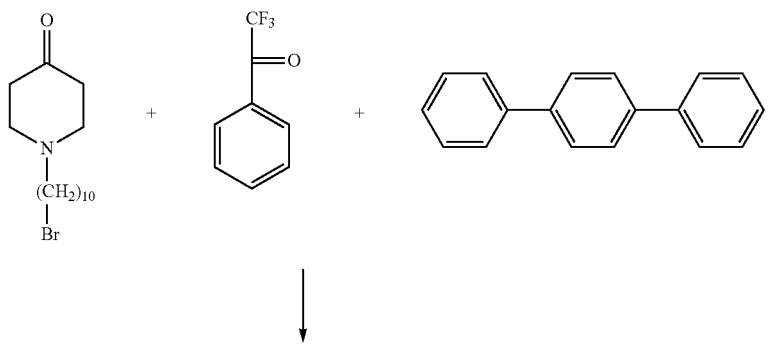

Figure 31B:
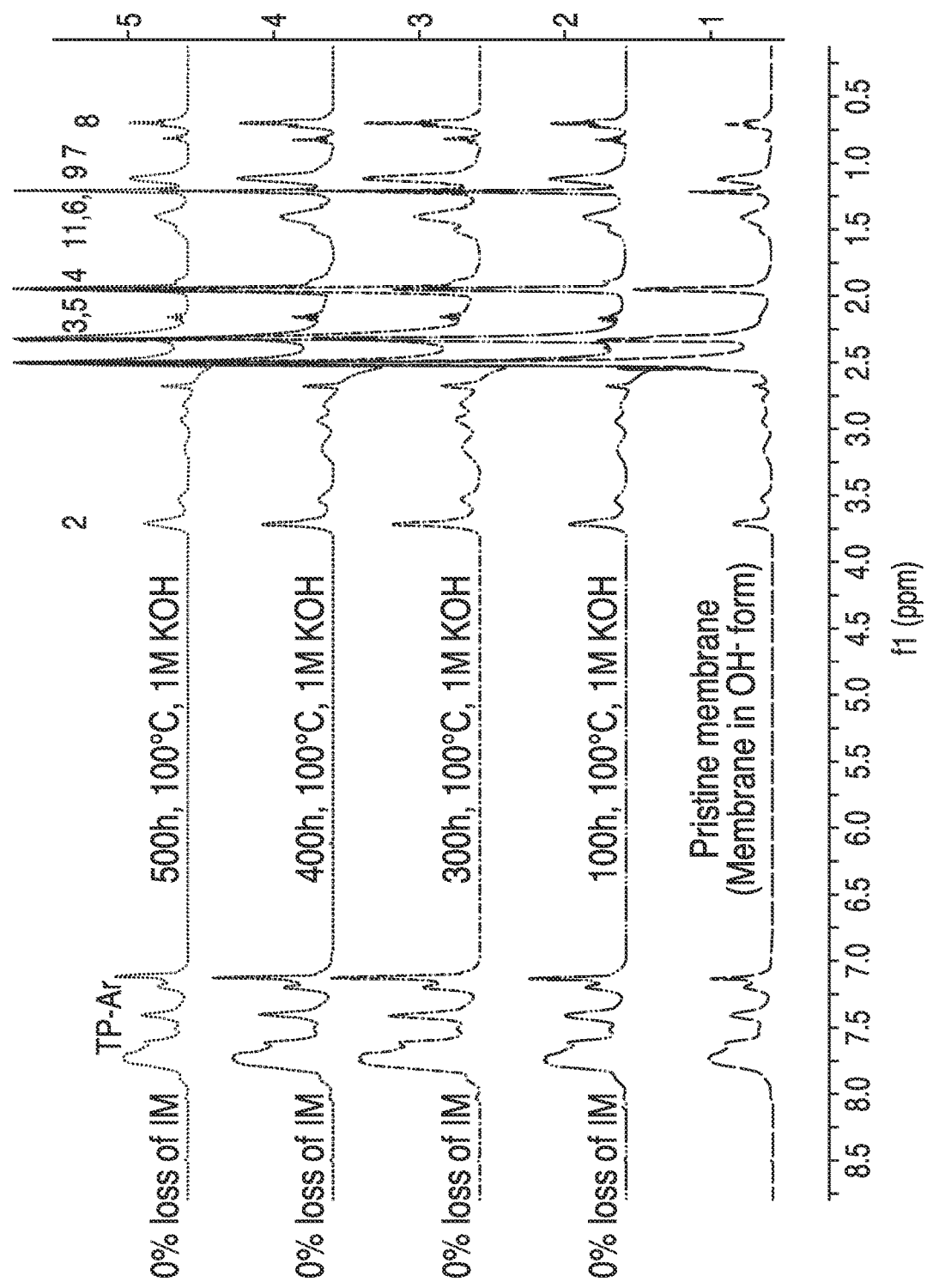
FIG. 31 depicts 1H NMR spectra of PAP-TP70-IM-OH- after immersion in 1M KOH at 100° C. up to 500 h.

-continued
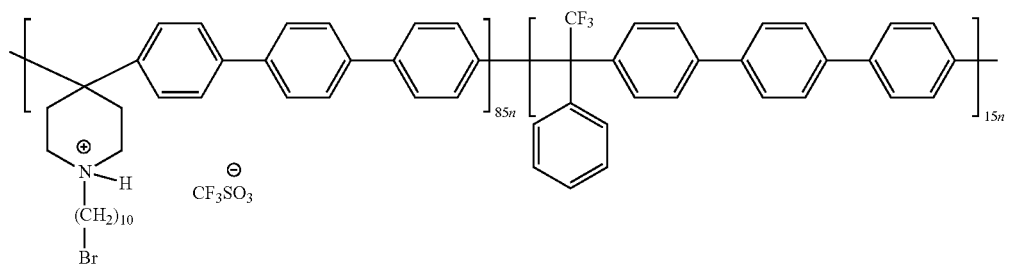
PAP-TP85-C$_{10}$-Br
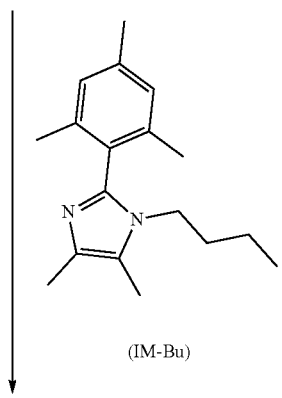
(IM-Bu)
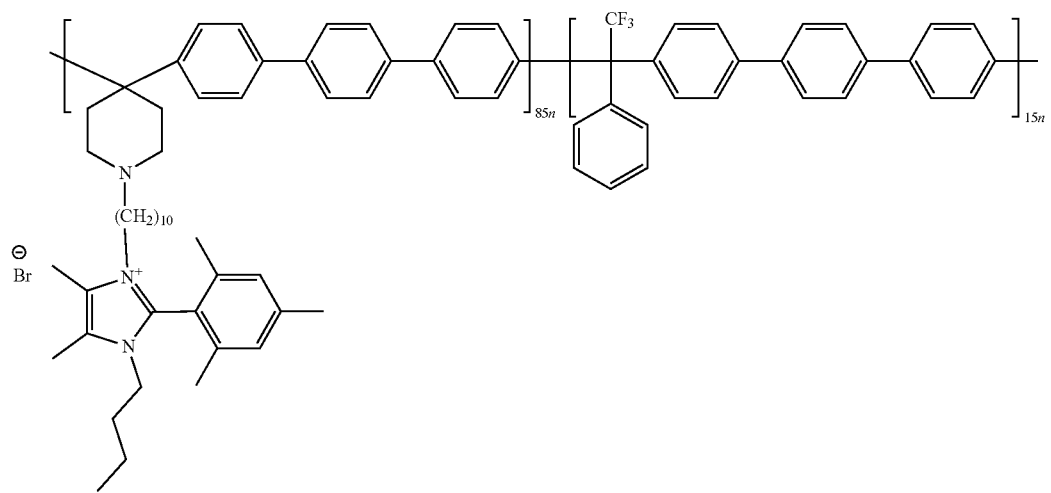
PAP-TP85-C$_{10}$-IM PAP-TP70-IM OH− membrane that is in hydroxide form showed no degradation after immersion in 1 M KOH at 100° C. up to 500 h as no changes of 1H NMR spectra of the membrane was observed (See FIG. 31).

Water uptake of PAP-TP70-IM-HCO3- is 16% at 25° C. and it increases up to 20.8% at 60° C. and then leveled off as shown in FIG. 32. The dimensional swelling ratio of PAP-TP70-IM-HCO3- is 7.6% at 25° C. and it increases up to 8.6% at 40° C. and then leveled off shown in FIG. 33.

Example 16

Synthesis of 3-oxo-6-azaspiro[5.6]dodecan-6-ium Bromide.

A mixture of K2CO3 (23.0 g, 166.6 mmol), 1,6-dibromohexane (40.6 g, 166.6 mmol) and 4-piperidone hydrobromide (10 g, 55.5 mmol) was stirred in 500 mL acetone for 24 hours. Solvent was then removed, and the crude product was then diluted with 300 mL acetonitrile and heated at 70° C. for 15 hours to afford 3-oxo-6-azaspiro[5.6]dodecan-6-ium bromide as the solid. The product was filtrated and dried under vacuum. 1H NMR (600 MHz, DMSO) δ (ppm): 3.75 (t, 4H, J3HH=6.0 Hz), 3.65 (m, 4H), 2.71 (t, 4H, J3HH=6.0 Hz), 1.88-1.89 (m, 4H), 1.63 (t, 4H, J3HH=6.0 Hz), (FIG. 34). The reaction scheme is shown below.

Synthesis of PAP-TPx-Spiro-Br.

Synthesis of PAP-TPx-Spiro-Br has similar procedures as the synthesis of PAP-TP70-C6-IM. The reaction scheme is shown below. Anion exchange with hydroxide is also depicted.

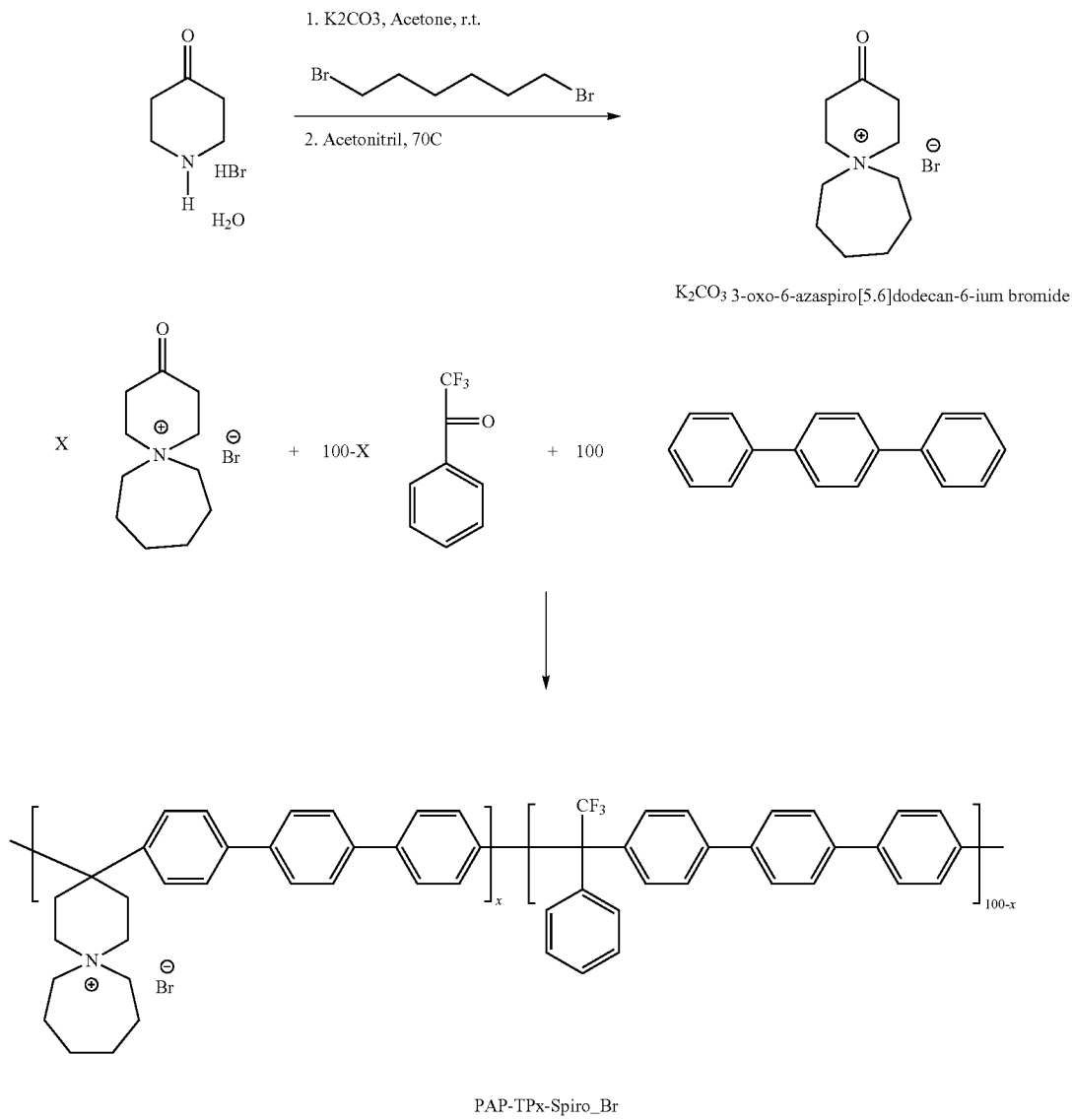

-continued

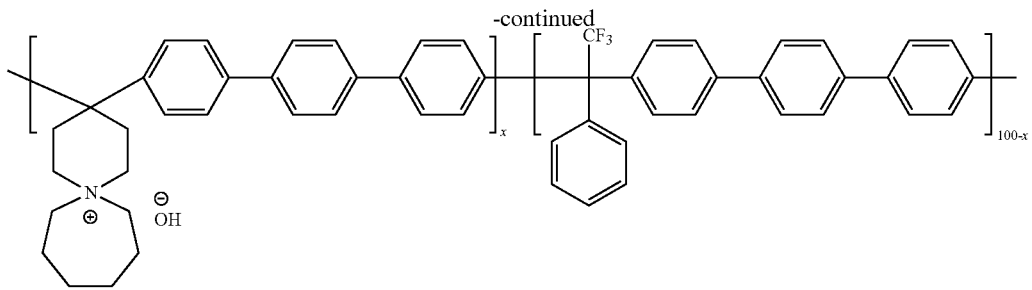

PAP-TPx-Spiro_OH

Example 17

Figure 35:
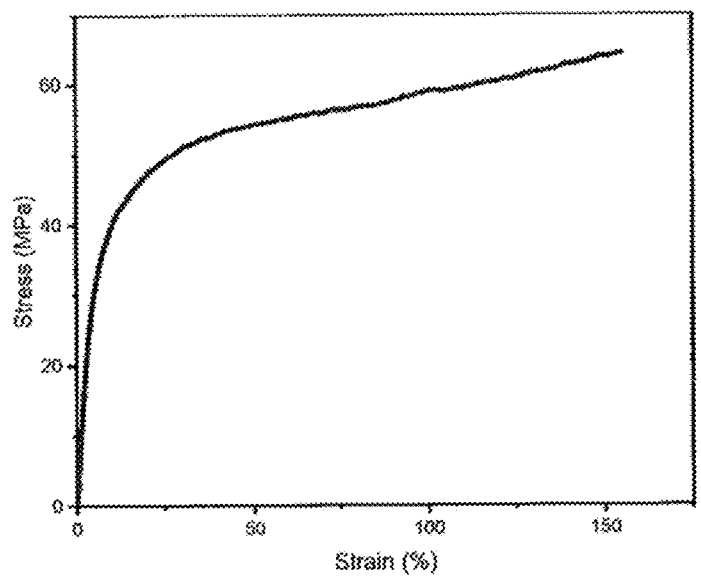
FIG. 35 depicts a stress-strain graph for the PAP-TP-85 polymer with 22 microns thickness with bicarbonate as an anion at 25° C. and 50% RH with a 10%/min strain rate.

A stress-strain curve for the PAP-TP-85 polymer with 22 microns thickness with bicarbonate as an anion was tested at 25° C. and 50% RH with a 10%/min strain rate. (FIG. 35).

Figure 36:
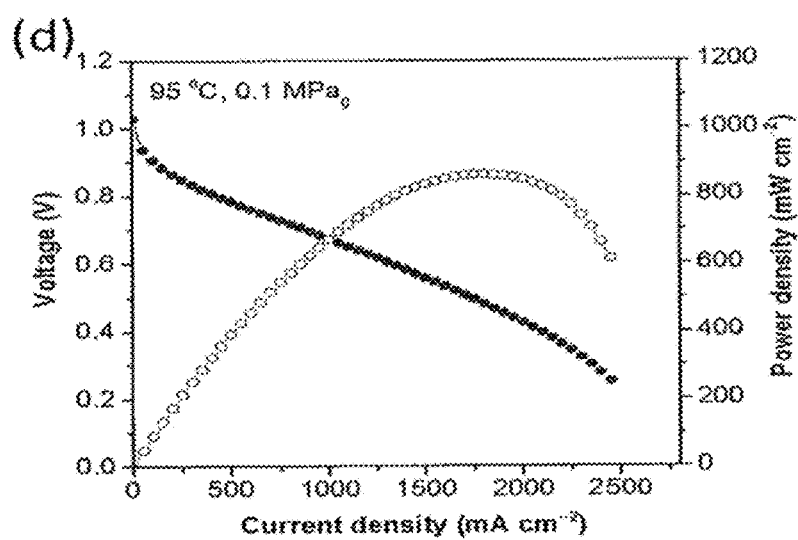
FIG. 36 depicts a graph of PAP HEMFC performance (PAP-TP-85 membrane, 5 μm and PAP-BP-60 ionomer) when tested at 95° C. under these test conditions: PAP ionomer (20 wt %), 0.4 mg Pt cm−2 on both anode and cathode, humidifier temperatures of 95° C. and 97° C. for H2 and O2, respectively, gas flow rate of 0.6 L min−1 and back pressure of 0.1 MPag.

PAP HEMFC performance (PAP-TP-85 membrane, 5 μm and PAP-BP-60 ionomer) was tested at 95° C. under these test conditions: PAP ionomer (20 wt %), 0.4 mg Pt cm−2 on both anode and cathode, humidifier temperatures of 95° C. and 97° C. for H2 and O2, respectively, gas flow rate of 0.6 L min−1 and back pressure of 0.1 MPag. (FIG. 36).

Figure 37:
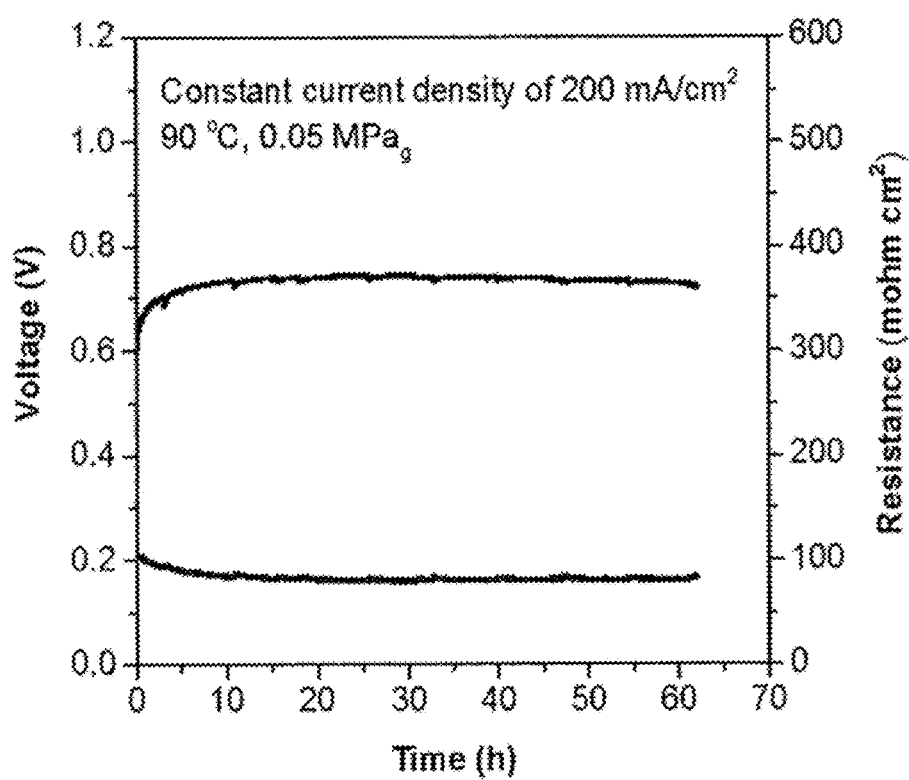
FIG. 37 shows a graph of PAP HEMFC durability (PAP-TP-85 membrane, 5 μm and PAP-BP-60 ionomer) performed at constant current density of 200 mA cm−2 at 90° C. Test conditions: PAP ionomer (20 wt %), 0.4 mg Pt cm−2 on both anode and cathode, humidifier temperatures of 95° C. and 95° C. for H2 and O2, respectively, gas flow rate of 0.6 L min−1 and back pressure of 0.1 MPag.

A PAP HEMFC durability test (PAP-TP-85 membrane, 5 μm and PAP-BP-60 ionomer) was performed at constant current density of 200 mA cm−2 at 90° C. Test conditions: PAP ionomer (20 wt %), 0.4 mg Pt cm−2 on both anode and cathode, humidifier temperatures of 95° C. and 95° C. for H2 and O2, respectively, gas flow rate of 0.6 L min−1 and back pressure of 0.1 MPag. (FIG. 37).

Definitions

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear, branched or cyclic hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons), and more preferably having 1 to 18 carbon atoms. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents.

The term "alkenyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "aryl" or "ar," as used herein alone or as part of another group (e.g., aralkyl), means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above. The term "aryl" also includes heteroaryl.

"Arylalkyl" or "aralkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1] heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as ethylene (—CH2CH2-) or isopropylene (—CH2(CH3)CH2-). For clarity, addition of the -ene suffix is not intended to alter the definition of the principal word other than denoting a bivalent radical. Thus, continuing the example above, alkylene denotes an optionally substituted linear saturated bivalent hydrocarbon radical.

The term "ether" as used herein represents a bivalent (i.e., difunctional) group including at least one ether linkage (i.e., —O—).

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazoyl), thiadiazoyl (e.g., 1,3,4-thiadiazoyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above. The term "hydrocarbon" as used herein describes a compound or radical consisting exclusively of the elements carbon and hydrogen.

The term "substituted" means that in the group in question, at least one hydrogen atom bound to a carbon atom is replaced with one or more substituent groups such as hydroxy (—OH), alkylthio, phosphino, amido (—CON(RA)(RB), wherein RA and RB are independently hydrogen, alkyl, or aryl), amino (—N(RA)(RB), wherein RA and RB are independently hydrogen, alkyl, or aryl), halo (fluoro, chloro, bromo, or iodo), silyl, nitro (—NO2), an ether (—ORA wherein RA is alkyl or aryl), an ester (—OC(O)RA wherein RA is alkyl or aryl), keto (—C(O)RA wherein RA is alkyl or aryl), heterocyclo, and the like. When the term "substituted" introduces or follows a list of possible substituted groups, it is intended that the term apply to every member of that group. That is, the phrase "optionally substituted alkyl or aryl" is to be interpreted as "optionally substituted alkyl or optionally substituted aryl." Likewise, the phrase "alkyl or aryl optionally substituted with fluoride" is to be interpreted as "alkyl optionally substituted with fluoride or aryl optionally substituted with fluoride."

When introducing elements of the present invention or the preferred embodiments(s) thereof, the articles "a", "an" "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A polymer comprising a reaction product of a polymerization mixture comprising
   (i) a piperidone monomer or salt or hydrate thereof having the formula:

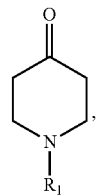

(1)

or an azoniaspiro salt monomer having the formula:

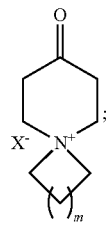

(2)

(ii) an aromatic monomer having the formula:

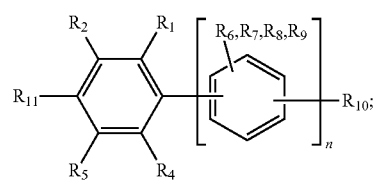

(3)

and (iii) optionally, a trifluoromethyl ketone monomer having the formula:

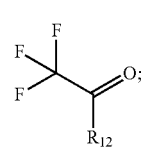

(4)

wherein:
$R_1$, $R_2$, $R_3$, $R_4$, $R_5$, $R_6$, $R_7$, $R_8$, $R_9$, $R_{10}$, $R_{11}$, $R_{13}$, $R_{14}$, $R_{15}$, $R_{16}$ and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or

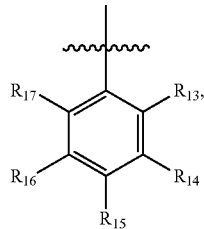

and the alkyl, alkenyl, or alkynyl are optionally substituted with fluoride;
m is 1, 2, 3, 4, 5, 6, 7 or 8;
n is 0, 1, 2 or 3;
$X^{31}$ is an anion; and
wherein in the case that the polymerization mixture comprises the azoniaspiro salt monomer of formula (2), either the polymerization mixture comprises the trifluoromethyl ketone monomer of formula (4), or the monomers used in a polymerization reaction to form the polymer are dissolved in an organic solvent and maintained at a temperature from −78° C. to 0° C. in the presence of a polymerization catalyst for 1 to 121 hours.

2. A polymer comprising a reaction product of an alkylating agent and the polymer of claim 1 comprising the reaction product of the polymerization mixture comprising the piperidone monomer.

3. A polymer comprising a reaction product of a base and the polymer of claim 2.

4. A piperidinium polymer comprising a second reaction product of a second polymerization mixture comprising a neutral piperidine-functionalized polymer and either a quaternary ammonium or phosphonium compound or a nitrogen-containing heterocycle,
the quaternary ammonium or phosphonium compound having the formula:

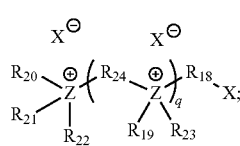

(5)

the nitrogen-containing heterocycle comprising an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;
the piperidine-functionalized polymer comprising the polymer of claim 1 comprising the piperidone monomer or salt or hydrate thereof of formula (1), the aromatic monomer of formula (3) and optionally, the trifluoromethyl ketone monomer of formula (4), wherein:
$R_{18}$ and $R_{24}$ are each independently alkylene;
$R_{19}$, $R_{20}$, $R_{21}$, $R_{22}$, and $R_{23}$ are each independently alkyl, alkenyl, aryl, or alkynyl;
q is 0, 1, 2, 3, 4, 5, or 6;
$X^{31}$ is an anion; and
Z is N or P.

5. An anion exchange polymer comprising a reaction product of a base and the piperidinium polymer of claim 4.

6. The polymer of claim 5, wherein the polymerization mixture further comprises the azoniaspiro salt monomer having the formula (2).

7. The polymer of claim 6, wherein the azoniaspiro salt monomer comprises 3-oxo-6-azoniaspiro[5.5]undecane halide.

8. The polymer of claim 1, wherein:
$R_1$ is alkyl; and $R_2$, $R_3$, $R_4$, $R_5$, $R_6$, $R_7$, $R_8$, $R_9$, $R_{10}$, $R_{11}$, $R_{13}$, $R_{14}$, $R_{15}$, $R_{16}$, and $R_{17}$ are each independently hydrogen, or alkyl optionally substituted with fluoride, and $R_{12}$ is alkyl optionally substituted with fluoride or

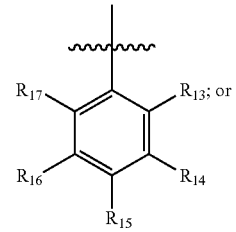

$R_1$ is methyl, ethyl, propyl, butyl, pentyl, or hexyl; and $R_2$, $R_3$, $R_4$, $R_5$, $R_6$, $R_7$, $R_8$, $R_9$, $R_{10}$, $R_{11}$, $R_{13}$, $R_{14}$, $R_{15}$, $R_{16}$, and $R_{17}$ are each independently hydrogen, methyl, ethyl, propyl, butyl, pentyl, or hexyl, or methyl, ethyl, propyl, butyl, pentyl, or hexyl optionally substituted with fluoride, and $R_{12}$ is methyl, ethyl, propyl, butyl, pentyl, or hexyl optionally substituted with fluoride or

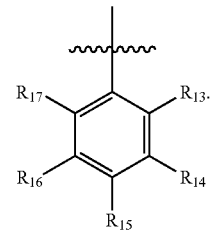

9. The polymer of claim 1, wherein:
the piperidone monomer or salt or hydrate thereof comprises N-methyl-4-piperidone or 4-piperidone; or
the salt of the piperidone monomer comprises hydrochloride, hydrofluoride, hydrobromide, hydroiodide, trifluoroacetate, acetate, triflate, methanesulfonate, sulfate, nitrate, tetrafluoroborate, hexafluorophosphate, formate, benzenesulfonate, toluate, perchlorate, or benzoate, or any hydrate of the salt, or any combination thereof; or
the salt of the piperidone monomer comprises 4-piperidone hydrofluoride, 4-piperidone hydrochloride, 4-piperidone hydrobromide, 4-piperidone hydroiodide, 4-piperidone trifluoroacetate, 4-piperidone tetrafluoroborate, 4-piperidone hexafluorophosphate, 4-piperidone acetate, 4-piperidone triflate, 4-piperidone methanesulfonate, 4-piperidone formate, 4-piperidone benzenesulfonate, 4-piperidone toluate, 4-piperidone sulfate, 4-piperidone nitrate, 4-piperidone perchlorate, 4-piperidone benzoate, N-methyl-4-piperidone hydrofluoride, N-methyl-4-piperidone hydrochloride, N-methyl-4-piperidone hydrobromide, N-methyl-4-piperidone hydroiodide, N-methyl-4-piperidone trifluoroacetate, N-methyl-4-piperidone tetrafluoroborate, N-methyl-4-piperidone hexafluorophosphate, N-methyl-4-piperidone acetate, N-methyl-4-piperidone triflate, N-methyl-4-piperidone methanesulfonate, N-methyl-4-piperidone formate, N-methyl-4-piperidone benzenesulfonate, N-methyl-4-piperidone toluate, N-methyl-4-piperidone sulfate, N-methyl-4-piperidone nitrate, N-methyl-4-piperidone perchlorate, N-methyl-4-piperidone benzoate or any hydrate of the salt, or any combination thereof.

10. The polymer of claim 1, wherein the aromatic monomer comprises biphenyl, para-terphenyl, meta-terphenyl, para-quaterphenyl, 9,9-dimethyl-9H-fluorene, or benzene.

11. The polymer of claim 3, wherein the base comprises a hydroxide-, bicarbonate-, or carbonate-containing base.

12. The polymer of claim 11, wherein the hydroxide-containing base comprises sodium hydroxide or potassium hydroxide; the bicarbonate-containing base comprises sodium bicarbonate or potassium bicarbonate; or the carbonate-containing base comprises sodium carbonate or potassium carbonate.

13. The polymer of claim 6, wherein the piperidone monomer or salt or hydrate thereof comprises N-methyl-4-piperidone or 4-piperidone; the azoniaspiro salt monomer comprises 3-oxo-6- azoniaspiro [5.5] undecane halide; the trifluoromethyl ketone monomer comprises 2,2,2-trifluoroacetophenone or 1,1,1-trifluoroacetone; and the aromatic monomer comprises biphenyl, para-terphenyl, meta-terphenyl, para-quaterphenyl, 9,9-dimethyl-9H-fluorene, or benzene.

14. The polymer of claim 1, wherein at least one of the following:
in the piperidone monomer of formula (1), $R_1$ is hydrogen, halide, or aryl, and the aryl is optionally substituted with halide; or
in the azoniaspiro salt monomer of formula (2), m is 1, 2, 4, 5, 6, 7 or 8; or
in the aromatic monomer of formula (3), at least one of $R_2$, $R_3$, $R_4$, $R_5$, $R_6$, $R_7$, $R_8$, $R_9$, $R_{10}$, and Ru is halide or aryl, and the aryl is optionally substituted with halide; or
in the aromatic monomer of formula (3), $R_3$ and $R_6$ are linked to form a five membered ring optionally substituted with halide or alkyl; or
in the trifluoromethyl ketone monomer of formula (4), $R_{12}$ is alkyl, alkenyl, or alkynyl, and the alkyl, alkenyl, or alkynyl is optionally substituted with fluoride; or
in the trifluoromethyl ketone monomer of formula (4), $R_{12}$ is

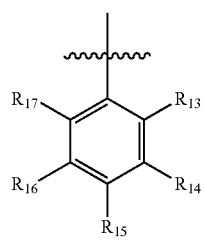

and at least one of $R_{13}$, $R_{14}$, $R_{15}$, $R_{16}$ and $R_{17}$ is halide or aryl, and the aryl is optionally substituted with fluoride.

15. The polymer of claim 4, wherein:
the quaternary ammonium or phosphonium compound of the formula (5) has $R_{18}$ and $R_{24}$ each independently being $C_1$-$C_{22}$ alkylene; $R_{19}$, $R_{20}$, $R_{21}$, $R_{22}$, and $R_{23}$ are each independently $C_1$-$C_6$ alkyl; m is 0, 1, 2, 3, 4, 5, or 6; and Z is N or P; or the quaternary ammonium or phosphonium compound of the formula (5) has $R_{18}$ and $R_{24}$ each independently being $C_1$-$C_6$ alkylene: $R_{19}$, $R_{20}$, $R_{21}$, $R_{22}$, and $R_{23}$ are each independently $C_1$-$C_6$ alkyl; m is 0, 1, 2, or 3; and Z is N or P; or the quaternary ammonium or phosphonium compound of the formula (5) has $R_{18}$ and $R_{24}$ each independently being $C_8$-$C_{22}$ alkylene: $R_{19}$, $R_{20}$, $R_{21}$, $1R_{22}$, and $R_{23}$ are each independently $C_1$-$C_6$ alkyl: m is 0, 1, 2, or 3: and Z is N or P; or the quaternary ammonium or phosphonium compound of the formula (5) has $R_{18}$ and $R_{24}$ each $C_2$-$C_6$ alkylene; $R_{19}$, $R_{20}$, $R_{21}$, $R_{22}$, and $R_{23}$ are each independently methyl; m is 1; and Z is N; or the quaternary ammonium or phosphonium compound of the formula (5) has $R_{18}$ and $R_{24}$ each $C_2$-$C_6$ alkylene: $R_{19}$, $R_{20}$, $R_{21}$, $R_{22}$, and $R_{23}$ are each independently methyl; m is 1; and Z is N; or the quaternary ammonium or phosphonium compound of the formula (5) has $R_{18}$ and $R_{24}$ each n-hexylene: $R_{19}$, $R_{20}$, $R_{21}$, $R_{22}$, and $R_{23}$ are each independently methyl: m is 1: and Z is N.

16. The polymer of claim 4, wherein the nitrogen-containing heterocycle comprises a fully substituted pyrrole, pyrroline, pyrazole, pyrazoline, imidazole, imidazoline, triazole, pyridine, triazine, pyrazine, pyridazine, pyrimidine, azepine, or quinoline, wherein each substituent is independently alkyl or aryl.

17. The polymer of claim 4, wherein the nitrogen-containing heterocycle comprises an imidazole having the formula:

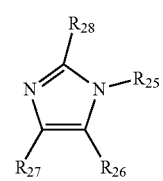

(6)

wherein:
$R_{25}$, $R_{26}$, $R_{27}$, and $R_{28}$ are each independently optionally substituted alkyl, alkenyl, alkynyl, or aryl.

18. The polymer of claim 17, wherein $R_{28}$ is 2,4,6-alkylphenyl, and $R_{25}$, $R_{26}$, and $R_{27}$ are each independently $C_1$-$C_6$ alkyl; or
the imidazole is 1-butyl-2-mesityl-4,5-dimethyl-1H-imidazole which has the formula:

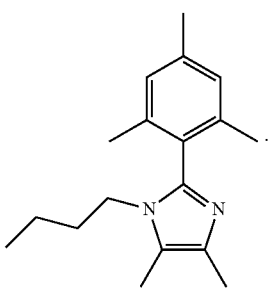

each $R_{10}$ is independently alkyl, alkenyl, alkynyl, or

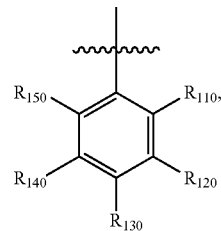

19. The polymer of claim 4, wherein the piperidinium polymer comprises the reaction product of the polymerization mixture further comprising the 2,2,2-trifluoromethyl ketone monomer.

20. The polymer of claim 19, wherein the trifluoromethyl ketone monomer comprises 2,2,2-trifluoroacetophenone or 1,1,1-trifluoroacetone.

21. The polymer of claim 1, wherein $X^-$ comprises a halide, $BF_4^-$, $PF_6^-$, $CO_3^{2-}$ or $HCO_3^-$.

22. A polymer comprising structural units of Formulae 1A or 2A, 3A, and optionally 4A, wherein the structural units of Formulae 1A, 2A, 3A and 4A have the structures:

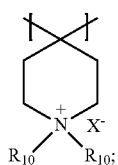 (1A)

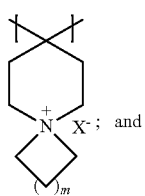 (2A)

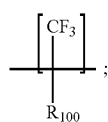 (4A)

wherein:

$R_{10}$, $R_{20}$, $R_{30}$, $R_{40}$, $R_{50}$, $R_{60}$, $R_{70}$, $R_{80}$, $R_{90}$, $R_{110}$, $R_{120}$, $R_{130}$, $R_{140}$, and $R_{150}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

and the alkyl, alkenyl, or alkynyl are optionally substituted with fluoride;

m is 1, 2, 3, 4, 5, 6, 7 or 8;

n is 0, 1, 2 or 3;

$X^{31}$ is an anion; and wherein:

the polymer comprises the structural unit of formula (4A); or the polymer comprises the structural unit of formula (1A) wherein one of the $R_{10}$ groups is hydrogen; or the monomers used in a polymerization reaction to form the polymer are dissolved in an organic solvent and maintained at a temperature from −78° C. to 0° C. in the presence of a polymerization catalyst for 1 to 121 hours.

23. The polymer of claim 22, wherein:

a sum of the mole fractions of the structural unit of Formula 1A or 2A and Formulae 4A in the polymer is about equal to the mole fraction of the structural unit of Formulae 3A in the polymer, and the ratio of the mole fraction of the structural unit of Formula 1 A or 2A in the polymer to the mole fraction of the structural unit of Formula 3A in the polymer is from about 0.01 to 1; or a mole ratio of a sum of the mole fractions of the structural unit of Formula 1A or 2A and Formulae 4A to the mole fraction of Formulae 3A in the polymer is from about 0.95:1 to about 1.4:1, and the ratio of the mole fraction of the structural unit of Formula 1A or 2A to the mole fraction of the structural unit of Formula 3A is from about 0.01 to 1; or the mole ratio of the sum of the mole fractions of the structural unit of Formula 1A or 2A and Formulae 4A to the mole fraction of Formulae 3A in the polymer is from about 1:1 to about 1.2:1.

24. The polymer of claim 22, wherein at least one of the following:

in the structural unit of formula (1A), $R_{10}$ is hydrogen, halide, or aryl, and the aryl is optionally substituted with halide; or in the structural unit of formula (2A), m is 1, 2, 4, 5, 6, 7 or 8; or in the structural unit of formula (3A), at least one of $R_{20}$, $R_{30}$, $R_{40}$, $R_{50}$, $R_{60}$, $R_{70}$, $R_{80}$, and $R_{90}$ is halide or aryl, and the aryl is optionally substituted with halide; or in the structural unit of formula (3A), $R_{30}$ and $R_{60}$ are linked to form a five membered ring optionally substituted with halide or alkyl; or in the structural unit of formula (4A), $R_{100}$ is alkyl, alkenyl, or alkynyl, and the alkyl, alkenyl, or alkynyl is optionally substituted with fluoride; or in the structural unit of formula (4A), $R_{100}$ is

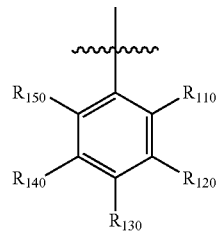

and at least one of $R_{110}$, $R_{120}$, $R_{130}$, $R_{140}$ and $R_{150}$ is halide or aryl, and the aryl is optionally substituted with fluoride.

25. The polymer of claim 3, and having water uptake not more than 60% based on the dry weight of the polymer when immersed in pure water at 95° C., or having hydroxide conductivity in pure water at 95° C. of at least 100 mS/cm, wherein at least one of the following:
the polymer is stable to degradation (as evidenced by no change in the $^1$H NMR spectra) when immersed in 1 M potassium hydroxide at 100° C. for 2,000 hours; or
the polymer has a tensile strength of at least 40 MPa and/or elongation at break of at least 100%; or
the polymer has a tensile strength of at least 60 MPa and/or elongation at break of at least 150%.

26. The polymer of claim 3, and having:
a peak power density of at least 350 mW/cm² when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having a 50% Pt/C catalyst and catalyst loading of 0.4 mg Pt/cm², and test conditions being hydrogen and oxygen flow rates of 0.6 L/min, back pressure of 0.1 MPa$_g$, cell temperature of 95° C., and anode and cathode humidifiers at 95° C. and 98° C., respectively; or
a decrease in voltage over 5.5 hours of operation of not more than 20% and an increase in resistance over 5.5 hours of operation of not more than 20% when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having a 50% Pt/C catalyst and catalyst loading of 0.4 mg Pt/cm², and test conditions being constant current density of 400 mA/cm², hydrogen and oxygen flow rates of 0.2 L/min, back pressure of 0.05 MPa$_g$, cell temperature of 90° C., and anode and cathode humidifiers at 95° C. and 98° C., respectively.

27. A method of making the polymer of claim 3, the method comprising:
reacting the piperidone monomer or salt or hydrate thereof, the optional trifluoromethyl ketone monomer, and the aromatic monomer in the presence of an organic solvent and a polymerization catalyst to form an acidified piperidine-functionalized intermediate polymer;
reacting the acidified piperidine-funtionalized intermediate polymer with a base to form a neutral piperidine-funtionalized intermediate polymer;
alkylating the neutral piperidine-functionalized intermediate polymer in the presence of an organic solvent to form a piperidinium-functionalized intermediate polymer; and
reacting the piperidinium-functionalized intermediate polymer with a base to form the polymer.

28. A method of making an anion exchange polymer membrane comprising the polymer of claim 11, the method comprising:
reacting the piperidone monomer or salt or hydrate thereof, the optional trifluoromethyl ketone monomer, and the aromatic monomer in the presence of an organic solvent and a polymerization catalyst to form an acidified piperidine-functionalized intermediate polymer;
reacting the acidified piperidine-funtionalized intermediate polymer with a base to form a neutral piperidine-funtionalized intermediate polymer;
reacting the neutral piperidine-functionalized intermediate polymer with an alkylating agent in the presence of an organic solvent to form a piperidinium-functionalized intermediate polymer;
dissolving the piperidinium-functionalized intermediate polymer in a solvent to form a polymer solution;
casting the polymer solution to form a polymer membrane; and
exchanging anions of the polymer membrane with hydroxide, bicarbonate, or carbonate ions or a combination thereof to form the anion exchange polymer membrane.

29. A method of making the anion exchange polymer of claim 5, the method comprising:
reacting the piperidone monomer or salt or hydrate thereof, the optional trifluoromethyl ketone monomer, the optional azoniaspiro salt monomer, and the aromatic monomer in the presence of an organic solvent and a polymerization catalyst to form an acidified piperidine-functionalized polymer;
reacting the acidified piperidine-funtionalized intermediate polymer with a base to form a neutral piperidine-funtionalized intermediate polymer;
reacting the neutral piperidine-functionalized polymer and the quaternary ammonium or phosphonium compound or the nitrogen-containing heterocycle in the presence of an organic solvent to form a piperidinium-functionalized polymer; and
reacting the piperidinium-functionalized polymer with a base to form the anion exchange polymer.

30. A method of making an anion exchange polymer membrane comprising the anion exchange polymer of claim 5, the method comprising:
reacting the piperidone monomer or salt or hydrate thereof, the optional trifluoromethyl ketone monomer, the optional azoniaspiro salt monomer, and the aromatic monomer in the presence of an organic solvent and a polymerization catalyst to form an acidified piperidine-functionalized polymer;
reacting the acidified piperidine-funtionalized intermediate polymer with a base to form a neutral piperidine-funtionalized intermediate polymer;
reacting the neutral piperidine-functionalized polymer with the quaternary ammonium or phosphonium compound or the nitrogen-containing heterocycle in the presence of an organic solvent to form the piperidinium-functionalized polymer;
dissolving the piperidinium-functionalized polymer in a solvent to form a polymer solution;
casting the polymer solution to form a polymer membrane; and exchanging anions of the polymer membrane with hydroxide ions to form the anion exchange polymer membrane.

31. An anion exchange membrane configured and sized to be suitable for use in a fuel cell and comprising the polymer of claim 3.

32. An anion exchange membrane fuel cell comprising the polymer of claim 3.

33. A reinforced electrolyte membrane configured and sized to be suitable for use in a fuel cell, the membrane comprising a porous substrate impregnated with the polymer of claim 3.

34. The polymer of claim 1, wherein the polymerization mixture comprises the azoniaspiro salt monomer of formula (2) and the trifluoromethyl ketone monomer of formula (4).

35. The polymer of claim 1, wherein the monomers used in a polymerization reaction to form the polymer are dissolved in the organic solvent and maintained at the temperature from −78° C. to 0° C. in the presence of the polymerization catalyst for 1 to 121 hours.

36. A polymer comprising a reaction product of a base and the polymer of claim 22, wherein the polymer comprises the structural unit of formula (1A) and one of the $R_{10}$ groups is hydrogen.

* * * * *

UNITED STATES PATENT AND TRADEMARK OFFICE
CERTIFICATE OF CORRECTION

PATENT NO. : 11,512,156 B2
APPLICATION NO. : 16/651622
DATED : November 29, 2022
INVENTOR(S) : Yushan Yan et al.

Page 1 of 1

It is certified that error appears in the above-identified patent and that said Letters Patent is hereby corrected as shown below:

In the Claims

Column 61 Line 18 should read – X- is an anion; and –.

Column 62 Line 6 should read – X- is an anion; and –.

Column 63 Line 45 should read – R2, R3, R4, R5, R6, R7, R8, R9, R10, and R11 is halide or –.

Column 66 Line 1 should read – each R100 is independently alkyl, alkenyl, alkynyl, or –.

Column 66 Line 19 should read – X- is an anion; and –.

Signed and Sealed this
Twenty-eighth Day of May, 2024

Katherine Kelly Vidal
*Director of the United States Patent and Trademark Office*